US011049448B2

(12) United States Patent
Knez et al.

(10) Patent No.: US 11,049,448 B2
(45) Date of Patent: Jun. 29, 2021

(54) MEMORY-IN-PIXEL ARCHITECTURE

(71) Applicant: Apple Inc., Cupertino, CA (US)

(72) Inventors: Ivan Knez, San Jose, CA (US);
Tien-Chien Kuo, Sunnyvale, CA (US);
Yingkan Lin, San Jose, CA (US); Bilin Wang, Santa Clara, CA (US);
Kanghoon Jeon, Albany, CA (US);
Mitchell Herman Kline, Alameda, CA (US); Hopil Bae, Palo Alto, CA (US);
Jose Antonio Dominguez-Caballero, San Jose, CA (US); Chun-Yao Huang, San Jose, CA (US); Syed Farhan Mohiuddin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/399,792

(22) Filed: Apr. 30, 2019

(65) Prior Publication Data
US 2019/0347990 A1  Nov. 14, 2019

Related U.S. Application Data

(60) Provisional application No. 62/668,707, filed on May 8, 2018.

(51) Int. Cl.
*G09G 3/3233* (2016.01)
*G06F 1/16* (2006.01)
*G04G 9/10* (2006.01)

(52) U.S. Cl.
CPC .......... *G09G 3/3233* (2013.01); *G04G 9/102* (2013.01); *G06F 1/1637* (2013.01); *G09G 2300/0842* (2013.01)

(58) Field of Classification Search
CPC .... G04G 9/0005; G04G 9/102; G06F 1/1637;
G06F 1/3265; G09G 2300/0819; G09G
2300/0842; G09G 2310/0235; G09G
2310/0251; G09G 2320/045; G09G
3/2022; G09G 3/3233; G09G 5/00
See application file for complete search history.

(56) References Cited

U.S. PATENT DOCUMENTS

| 4,748,442 A | 5/1988 | Allaire |
| 5,712,652 A | 1/1998 | Sato et al. |
| 6,229,508 B1 | 5/2001 | Kane |
| 7,045,821 B2 | 5/2006 | Shih et al. |

(Continued)

OTHER PUBLICATIONS

International Search Report and Written Opinion for PCT Application No. PCT/US2019/030686 dated Jul. 17, 2019; 9 pgs.

(Continued)

*Primary Examiner* — Chun-Nan Lin
(74) *Attorney, Agent, or Firm* — Fletcher Yoder, P.C.

(57) ABSTRACT

An electronic display may include an active area having a first pixel formed in the active area, where the first pixel emits light in response to image data. The electronic display may also include a controller to transmit the image data to the first pixel. The first pixel may include an organic light-emitting diode that emits the light in response to the image data, memory to digitally store the image data received from the controller, and driver circuitry to receive the image data from the memory. The driver circuitry may cause the organic light-emitting diode to emit the light in response to the image data.

20 Claims, 30 Drawing Sheets

(56) References Cited

U.S. PATENT DOCUMENTS

| | | |
|---|---|---|
| 10,606,428 B2 | 3/2020 | Fukushima |
| 2002/0018029 A1 | 2/2002 | Koyama |
| 2002/0130828 A1 | 9/2002 | Yamazaki et al. |
| 2002/0186211 A1 | 12/2002 | Akai et al. |
| 2003/0011314 A1 | 1/2003 | Numao |
| 2003/0151582 A1 | 8/2003 | Ishii |
| 2003/0169247 A1 | 9/2003 | Kawabe |
| 2004/0066363 A1 | 4/2004 | Yamano et al. |
| 2005/0057478 A1 | 3/2005 | Miyazawa |
| 2006/0043371 A1 | 3/2006 | Steer |
| 2006/0066503 A1 | 3/2006 | Sampsell et al. |
| 2007/0085847 A1 | 4/2007 | Shishido |
| 2007/0126667 A1 | 6/2007 | Nakamura et al. |
| 2009/0027316 A1* | 1/2009 | Kim ............... G09G 3/3233 345/80 |
| 2010/0177083 A1 | 7/2010 | Yamashita |
| 2011/0084950 A1 | 4/2011 | Keitaro et al. |
| 2012/0038604 A1 | 2/2012 | Liu et al. |
| 2012/0154416 A1 | 6/2012 | Nakanishi et al. |
| 2013/0002626 A1 | 1/2013 | Washio |
| 2013/0063499 A1* | 3/2013 | Tanaka ............ G09G 3/3648 345/690 |
| 2013/0293529 A1 | 11/2013 | You et al. |
| 2015/0009111 A1 | 1/2015 | Yamauchi |
| 2015/0296579 A1 | 10/2015 | Hirokane |
| 2015/0348463 A1* | 12/2015 | Lee ............... G09G 3/3233 345/690 |
| 2015/0371591 A1 | 12/2015 | Suzuki et al. |
| 2016/0093251 A1* | 3/2016 | Chung ............ G01J 1/0403 345/207 |
| 2016/0126231 A1 | 5/2016 | Endisch et al. |
| 2016/0337608 A1 | 11/2016 | Numata |
| 2017/0039931 A1 | 2/2017 | Kubota et al. |
| 2017/0061863 A1 | 3/2017 | Eguchi |
| 2017/0315644 A1 | 11/2017 | Hayakawa |
| 2019/0073937 A1 | 3/2019 | Cho |
| 2019/0075261 A1 | 3/2019 | Machida et al. |
| 2019/0088214 A1 | 3/2019 | Chen et al. |
| 2019/0147793 A1 | 5/2019 | Valentine |
| 2019/0180706 A1 | 6/2019 | Fu et al. |

OTHER PUBLICATIONS

Notice of Allowance for U.S. Appl. No. 16/399,805 dated Sep. 24, 2020, 8 pages.

Malvar, Henrique; "Progressive Wavelet Coding of Images;" Microsoft Technical Report; MSR-TR-99-26; IEEE Data Compression Conference; May 1999; 9 pages.

* cited by examiner

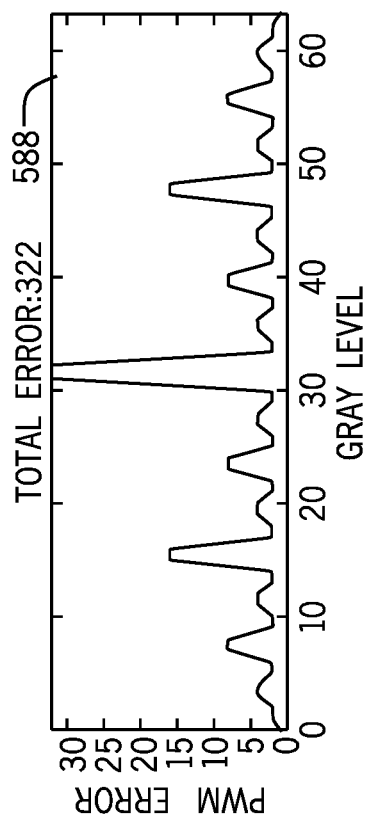
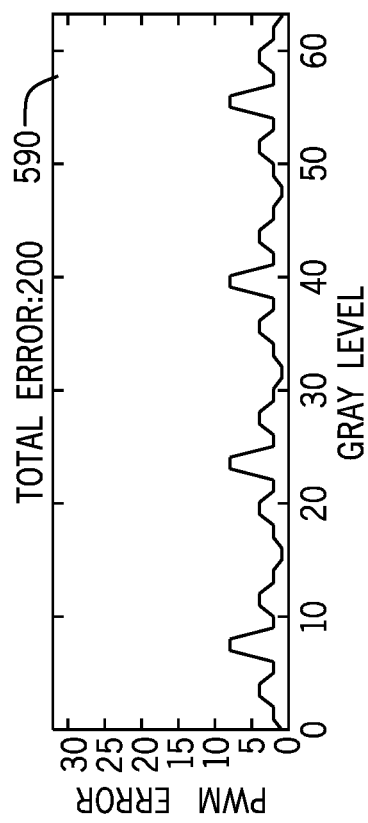
FIG. 24B
FIG. 24D
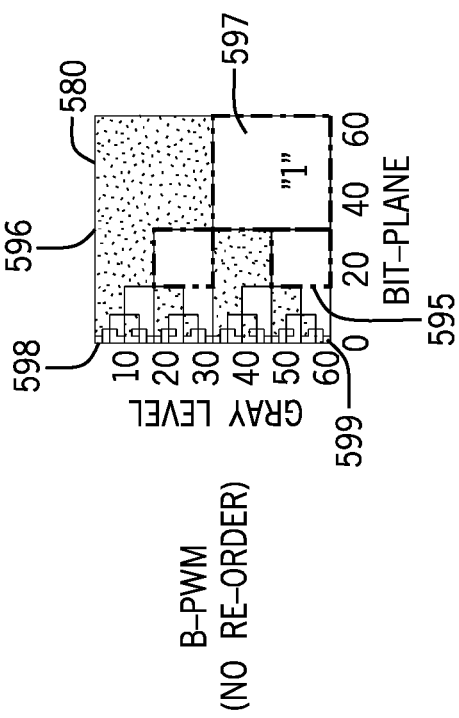
FIG. 24A
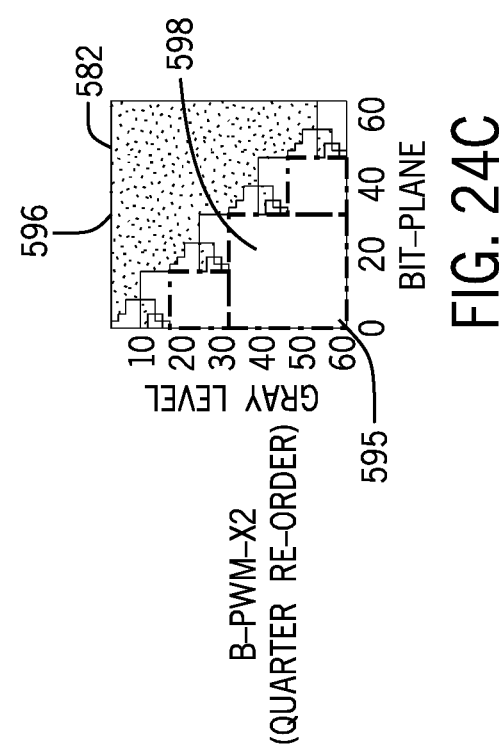
FIG. 24C

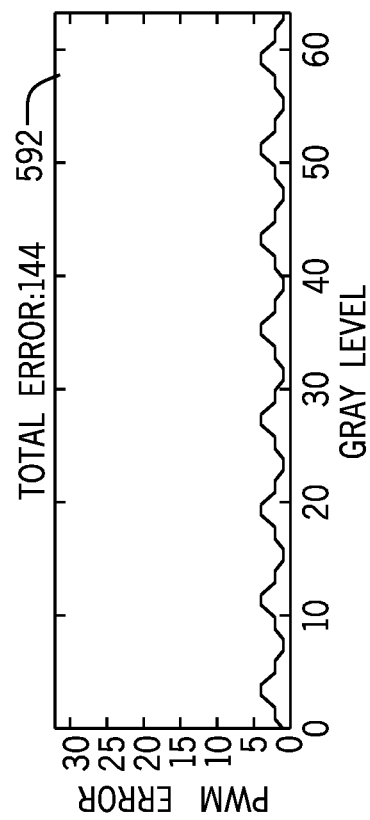
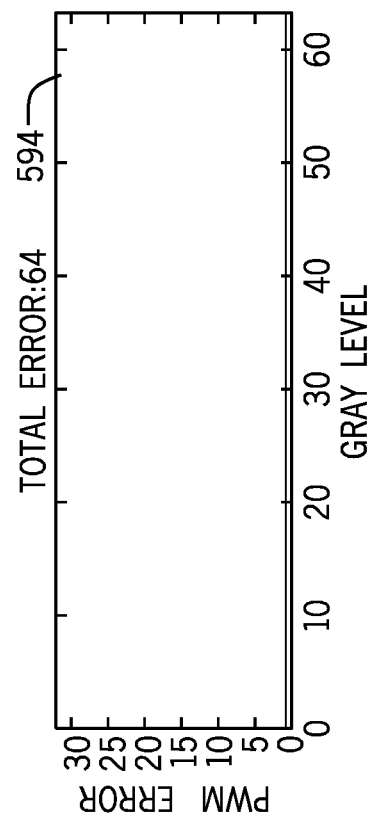
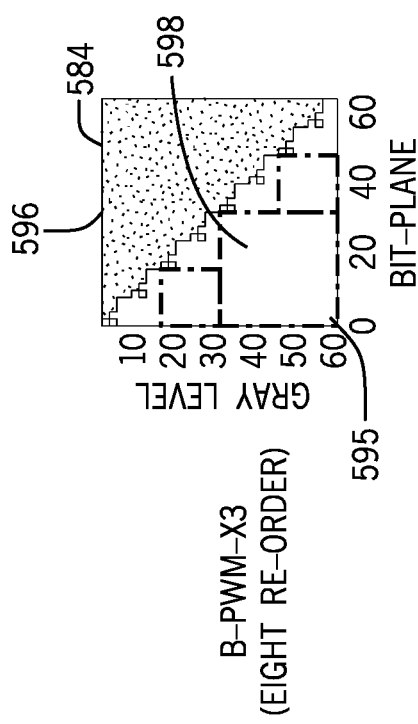
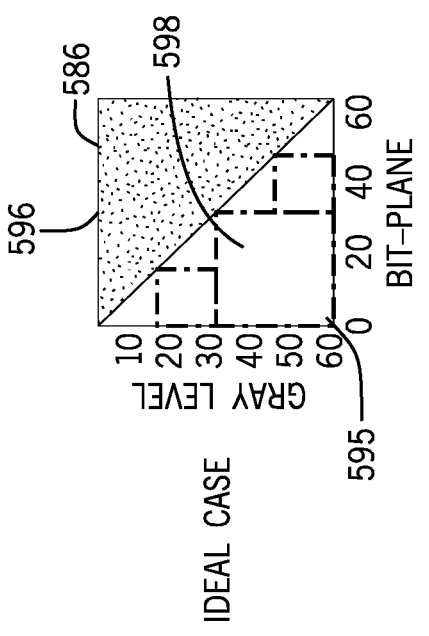

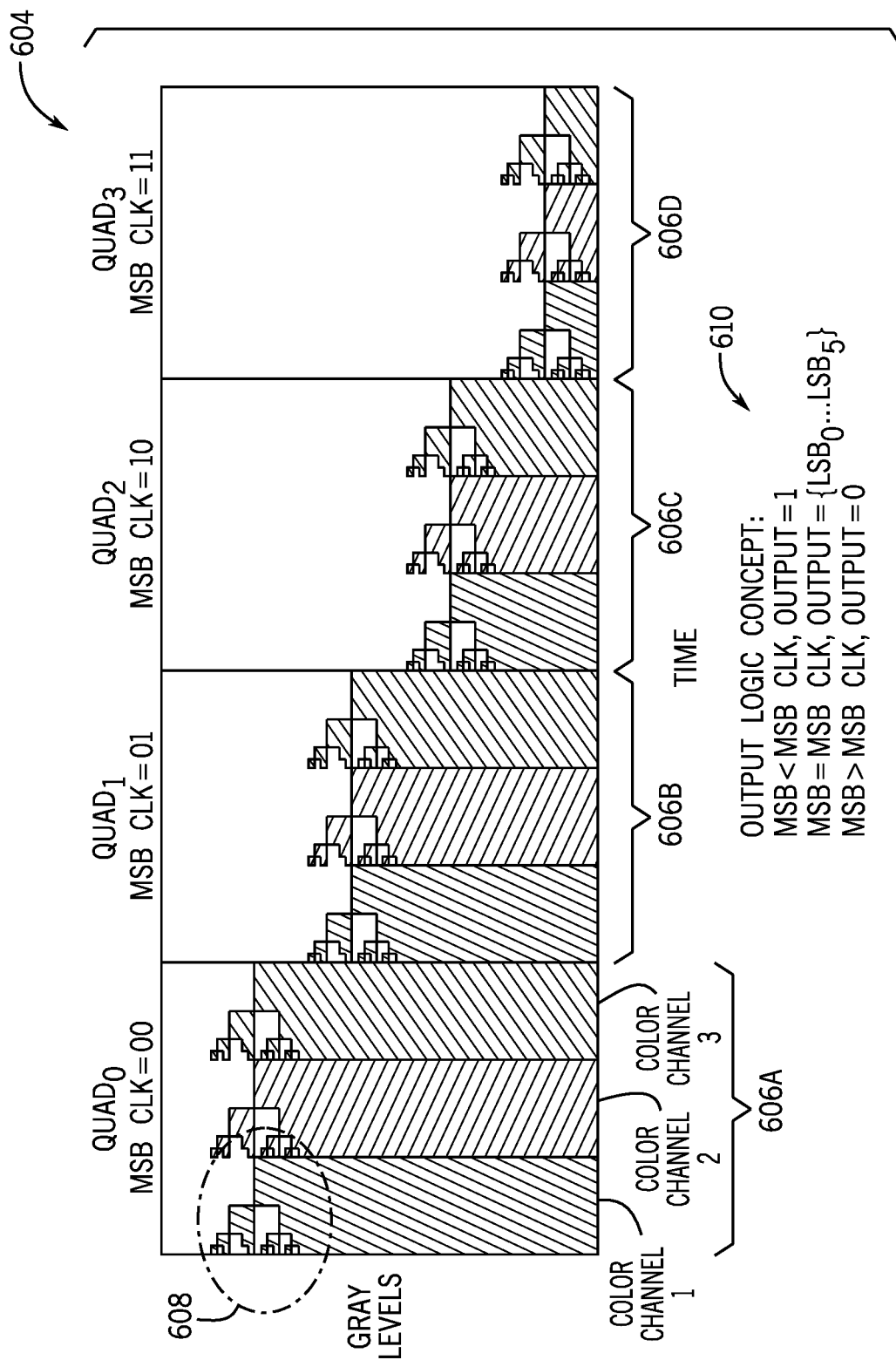

MEMORY-IN-PIXEL ARCHITECTURE

CROSS-REFERENCE TO RELATED APPLICATIONS

This application claims priority to U.S. Provisional Patent Application No. 62/668,707, entitled "MEMORY-IN-PIXEL ARCHITECTURE," filed on May 8, 2018, which is incorporated herein by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Methods and systems for reducing bandwidths, or amounts simultaneously transmitted, of image data transmitted and processed to prepare an image for presentation on an electronic display by implementing memory in pixels of the electronic display may provide immense value. Such an implementation of memory in the pixels may permit an elimination of a frame buffer associated with the electronic display. Having memory in the pixels may lessen the design complexity of electronic displays, as well, because the less image data that is concurrently transmitted to a pixel array of an electronic display, the simpler an electronic display may be designed. For example, the pixels may be programmed in smaller groups because memory in the pixel stores the values until a time of presentation of the image.

This disclosure describes an electronic display having one or more pixels that include memory and a driver that may help to decrease a bandwidth associated with transmitting and processing image data for presentation on an electronic display. The inclusion of the memory in the pixel may enable storage of image data prior to output to a light-emitting portion of the pixel. Thus, the memory in the pixel may reduce, or in some instances eliminate, a reliance upon a frame buffer in an electronic display by acting as an individual frame buffer for the pixel. The memory in the pixel may be used in conjunction with a driver to cause a light-emitting portion of the pixel to emit light.

BRIEF DESCRIPTION OF THE DRAWINGS

Various aspects of this disclosure may be better understood upon reading the following detailed description and upon reference to the drawings in which:

FIG. 24A is a bit-plane graph corresponding to no reordering implemented in the memory circuitry of FIG. 23, in accordance with an embodiment;

FIG. 24B is an error graph corresponding to no reordering implemented in the memory circuitry of FIG. 23, in accordance with an embodiment;

FIG. 24C is a bit-plane graph corresponding to two reorderings implemented in the memory circuitry of FIG. 23, in accordance with an embodiment;

FIG. 24D is an error graph corresponding to two reorderings implemented in the memory circuitry of FIG. 23, in accordance with an embodiment;

FIG. 24E is a bit-plane graph corresponding to three reorderings implemented in the memory circuitry of FIG. 23, in accordance with an embodiment;

FIG. 24F is an error graph corresponding to three reorderings implemented in the memory circuitry of FIG. 23, in accordance with an embodiment;

FIG. 24G is a bit-plane graph corresponding to an ideal case of reordering implemented in the memory circuitry of FIG. 23, in accordance with an embodiment;

FIG. 24H is an error graph corresponding to an ideal case of reordering implemented in the memory circuitry of FIG. 23, in accordance with an embodiment;

FIG. 25 is a bit-plane graph illustrating the bit-plane graph of FIG. 24C over time and with an inclusion of additional color channels, in accordance with an embodiment;

DETAILED DESCRIPTION OF SPECIFIC EMBODIMENTS

Figure 1:
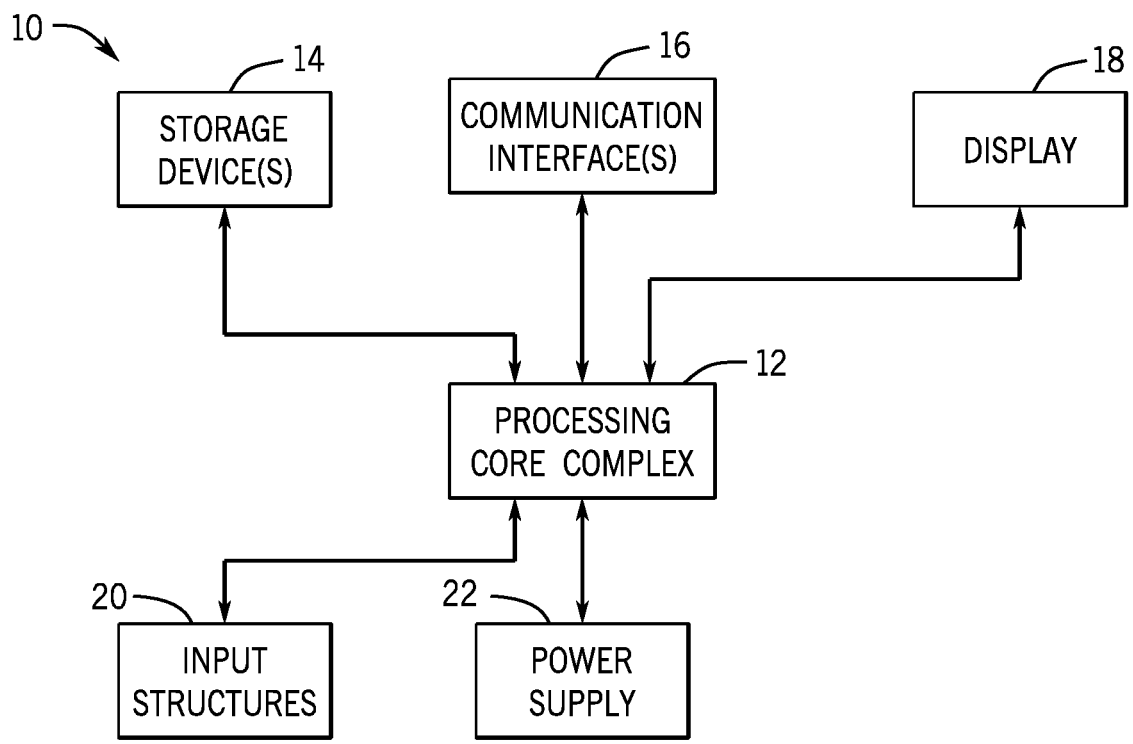
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Electronic displays are found in numerous electronic devices, from mobile phones to computers, televisions, automobile dashboards, and many more. Electronic displays have achieved increasingly higher resolutions by reducing individual pixel size. Yet increasing resolutions may increase a difficultly associated with managing an increased amount of image data associated with the increased resolutions processed by processing circuitry prior to displaying an image, for example, by causing increased power consumption from processing increased amounts of image data. Furthermore, the increasing resolutions may increase a bandwidth used to communicate image data from the processing circuitry to a pixel array for presentation of the image because more image data is used to communicate the same image at a higher electronic display resolution.

Embodiments of the present disclosure relate to systems and methods for implementing memory-in-pixel circuitry that may be used as an individual frame buffer for each pixel, which may reduce reliance on a frame buffer external to a pixel array and driving circuitry of an electronic display. Memory may be implemented in pixel circuitry that includes a light-emitting diode (LED). An organic light-emitting diode (OLED) represents one type of LED that may be found in the pixel, but other types of LEDs may also be used or light-emitting components may be used in the pixel circuitry, such as components to support liquid crystal displays (LCDs), plasma display panels, and/or dot-matrix displays.

The systems and methods of this disclosure to implement memory-in-pixel circuitry may reduce transmission bandwidths of image data to pixel arrays for display because the pixel may store image data in the memory. In this way, a reliance on frame buffers to temporarily store the image data external to the pixel is reduced because the pixel has its own memory to store its own image data prior to display of the image data.

A general description of suitable electronic devices that may include a self-emissive display, such as a LED (e.g., an OLED) display, and corresponding circuitry of this disclosure are provided. An OLED represents one type of LED that may be found in the self-emissive pixel, but other types of LEDs may also be used.

To help illustrate, an electronic device 10 including an electronic display 18 is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10. The electronic device 10 may include, among other things, a processing core complex 12 such as a system on a chip (SoC) and/or processing circuit(s), storage device(s) 14, communication interface(s) 16, the electronic display 18, input structures 20, and a power supply 22. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components.

As depicted, the processing core complex 12 is operably coupled with the storage device(s) 14. Thus, the processing core complex 12 execute instructions stored in the storage device(s) 14 to perform operations, such as generating and/or transmitting image data. As such, the processing core complex 12 may include one or more general purpose microprocessors, one or more application specific integrated circuits (ASICs), one or more field programmable logic arrays (FPGAs), or any combination thereof. Using pixels containing light-emitting components (e.g., LEDs, OLEDs), the electronic display 18 may show images generated by the processing core complex 12.

In addition to instructions, the storage device(s) 14 may store data to be processed by the processing core complex 12. Thus, in some embodiments, the storage device(s) 14 may include one or more tangible, non-transitory, computer-readable mediums. The storage device(s) 14 may be volatile and/or non-volatile. For example, the storage device(s) 14 may include random access memory (RAM) and/or read only memory (ROM), rewritable non-volatile memory such as flash memory, hard drives, optical discs, and/or the like, or any combination thereof.

As depicted, the processing core complex 12 is also operably coupled with the communication interface(s) 16. In some embodiments, the communication interface(s) 16 may facilitate communicating data with another electronic device and/or a network. For example, the communication interface(s) 16 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network.

Additionally, as depicted, the processing core complex 12 is also operably coupled to the power supply 22. In some embodiments, the power supply 22 may provide electrical power to one or more components in the electronic device 10, such as the processing core complex 12 and/or the electronic display 18. Thus, the power supply 22 may include any suitable source of energy, such as a rechargeable lithium polymer (Li-poly) battery and/or an alternating current (AC) power converter.

As depicted, the electronic device 10 is also operably coupled with the one or more input structures 20. In some embodiments, an input structure 20 may facilitate user interaction with the electronic device 10, for example, by receiving user inputs. Thus, the input structures 20 may include a button, a keyboard, a mouse, a trackpad, and/or the like. Additionally, in some embodiments, the input structures 20 may include touch-sensing components in the electronic display 18. In such embodiments, the touch sensing components may receive user inputs by detecting occurrence and/or position of an object touching the surface of the electronic display 18.

In addition to enabling user inputs, the electronic display 18 may include a display panel with one or more display pixels. As described above, the electronic display 18 may control light emission from the display pixels to present visual representations of information, such as a graphical user interface (GUI) of an operating system, an application interface, a still image, or video content, by displaying frames based at least in part on corresponding image data. As depicted, the electronic display 18 is operably coupled to the processing core complex 12. In this manner, the electronic display 18 may display frames based at least in part on image data generated by the processing core complex 12. Additionally or alternatively, the electronic display 18 may display frames based at least in part on image data received via the communication interface(s) 16 and/or the input structures 20.

Figure 2:
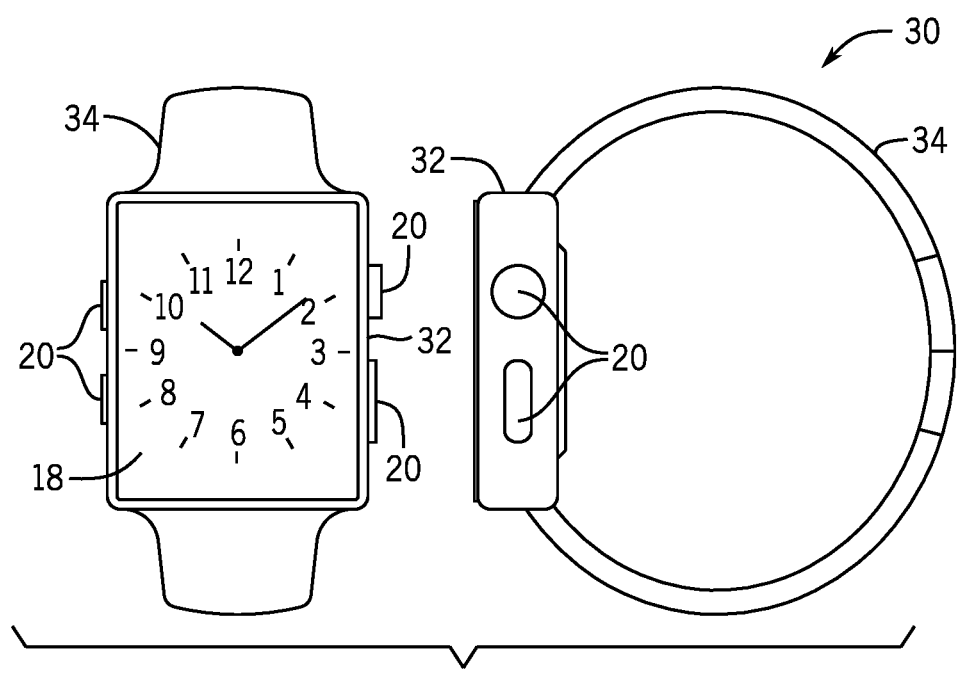
FIG. 2 is a perspective view of a watch representing an embodiment of the electronic device of FIG. 1, in accordance with an embodiment.

As may be appreciated, the electronic device 10 may take a number of different forms. As shown in FIG. 2, the electronic device 10 may take the form of a watch 30. For illustrative purposes, the watch 30 may be any Apple Watch® model available from Apple Inc. As depicted, the watch 30 includes an enclosure 32 (e.g., housing). In some embodiments, the enclosure 32 may protect interior components from physical damage and/or shield them from electromagnetic interference (e.g., house components). A strap 34 may enable the watch 30 to be worn on the arm or wrist. The electronic display 18 may display information related to the operation of the watch 30. Input structures 20 may enable the user to activate or deactivate watch 30, navigate a user interface to a home screen, navigate a user interface to a user-configurable application screen, activate a voice-recognition feature, provide volume control, and/or toggle between vibrate and ring modes. As depicted, the input structures 20 may be accessed through openings in the enclosure 32. In some embodiments, the input structures 20 may include, for example, an audio jack to connect to external devices.

Figure 3:
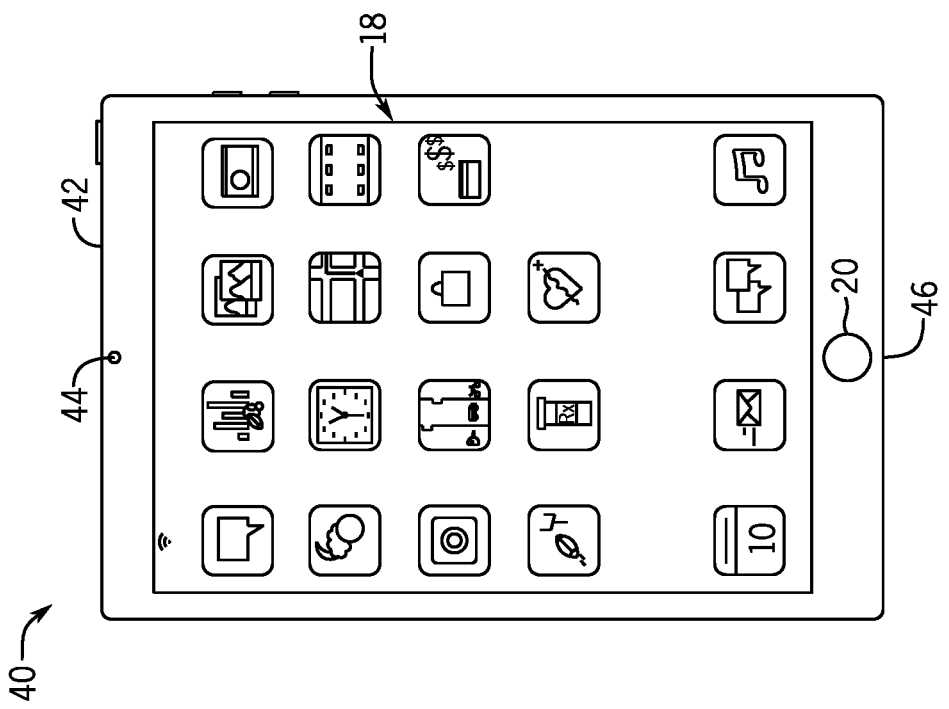
FIG. 3 is a front view of a tablet device representing an embodiment of the electronic device of FIG. 1, in accordance with an embodiment.

The electronic device 10 may also take the form of a tablet device 40, as shown in FIG. 3. For illustrative purposes, the tablet device 40 may be any iPad® model available from Apple Inc. Depending on the size of the tablet device 40, the tablet device 40 may serve as a handheld device such as a mobile phone. The tablet device 40 includes an enclosure 42 through which input structures 20 may protrude. In certain examples, the input structures 20 may include a hardware keypad (not shown). The enclosure 42 also holds the electronic display 18. The input structures 20 may enable a user to interact with a GUI of the tablet device 40. For example, the input structures 20 may enable a user to type a Rich Communication Service (RCS) text message, a Short Message Service (SMS) text message, or make a telephone call. A speaker 44 may output a received audio signal and a microphone 46 may capture the voice of the user. The tablet device 40 may also include a communication interface 16 to enable the tablet device 40 to connect via a wired connection to another electronic device.

Figure 4:
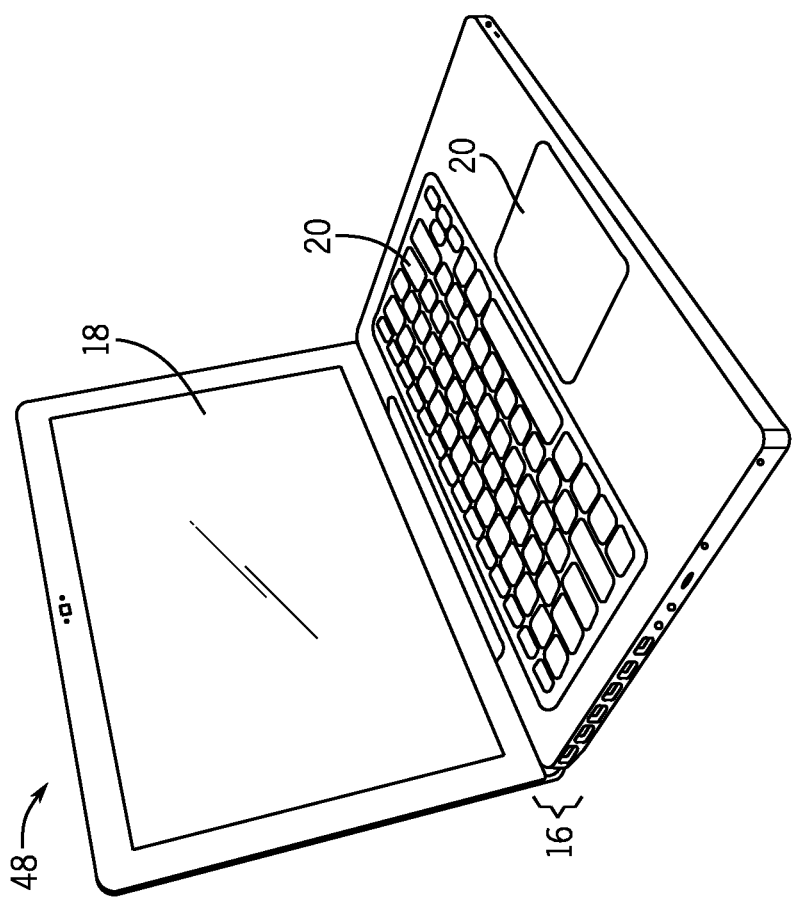
FIG. 4 is a front view of a computer representing an embodiment of the electronic device of FIG. 1, in accordance with an embodiment.

FIG. 4 illustrates a computer 48, which represents another form that the electronic device 10 may take. For illustrative purposes, the computer 48 may be any Macbook® or iMac® model available from Apple Inc. It should be appreciated that the electronic device 10 may also take the form of any other computer, including a desktop computer. The computer 48 shown in FIG. 4 includes the electronic display 18 and input structures 20 that include a keyboard and a track pad. Communication interfaces 16 of the computer 48 may include, for example, a universal serial bus (USB) connection.

In any case, as described above, operating an electronic device 10 to communicate information by displaying images on its electronic display 18 generally consumes electrical power. Additionally, as described above, electronic devices 10 often store a finite amount of electrical energy. Thus, to facilitate improving power consumption efficiency, an electronic device 10, in some embodiments, may include an electronic display 18 that implements memory-in-pixel as a way to reduce, or eliminate, use of an external frame buffer in displaying images, and thus reduces power consumed by use of the frame buffer in displaying images and/or reducing a bandwidth of image data being received into the electronic display 18. In some cases, an internal framebuffer (e.g., located in the electronic display 18, such as in a display driver integrated circuit of the electronic display 18) may be used in lieu of or in addition to memory-in-pixel techniques. By implementing memory-in-pixel or related techniques, an electronic display 18 may be programmed with smaller bandwidths of image data, further enabling power consumption savings. In addition, an electronic display 18 using memory in the pixel or in an onboard frame buffer may have a less complex design than an electronic display 18 without memory in the pixel or without an onboard framebuffer. These benefits may be realized because a pixel retains data transmitted to its memory until new image data is written to the memory.

Similarly, portions of image data may program a subset of pixels associated with the electronic display 18 at a time. An image to be displayed is typically converted into numerical data, or image data, so that the image is interpretable by components of the electronic display 18. In this way, image data itself may be divided into small "pixel" portions, each of which may correspond to a pixel portion of the electronic display 18, or of a display panel corresponding to the electronical display 18. In some embodiments, image data is represented through combinations of red-green-blue light such that one pixel appearing to have a single color is really three sub-pixels respectively emitting a proportion of red, green, and blue light to create the single color. In this way, numerical values, or image data, that quantify the combinations of red-green-blue light may correspond to a digital luminance level, or a gray level, that associates a luminance intensity (e.g., a brightness) of a color of the image data for those particular sub-pixels. As will be appreciated, the number of gray levels in an image usually depends on a number of bits used to represent the gray levels in a particular electronic display 18, which may be expressed as $2^N$ gray levels where N corresponds to the number of bits used to represent the gray levels. By way of example, in an embodiment where an electronic display 18 uses 8 bits to represent gray levels, the gray level ranges from 0, for black or no light, to 255, for maximum light and/or full light, for a total of 256 potential gray levels. Similarly, an electronic display 18 using 6 bits may use 64 gray levels to represent a luminance intensity for each sub-pixel.

Having memory in the pixels of an electronic display 18 enables image data to transmit to sub-pixels associated with one color without image data having to transmit to additional sub-pixels associated with a second color at the same time. For the purposes of this disclosure, sub-pixels are discussed in terms of red-green-blue color channels, where a color channel is a layer of image data including gray levels for a single color where when combined with additional color channels creates an image of a true, or desired, color, and where the image data for a color channel corresponds to image data transmitted to a sub-pixel for the color channel. However, it should be understood that any combination of color channels and/or sub-pixels may be used, such as, blue-green-red, cyan-magenta-yellow, and/or cyan-magenta-yellow-black.

Figure 5:
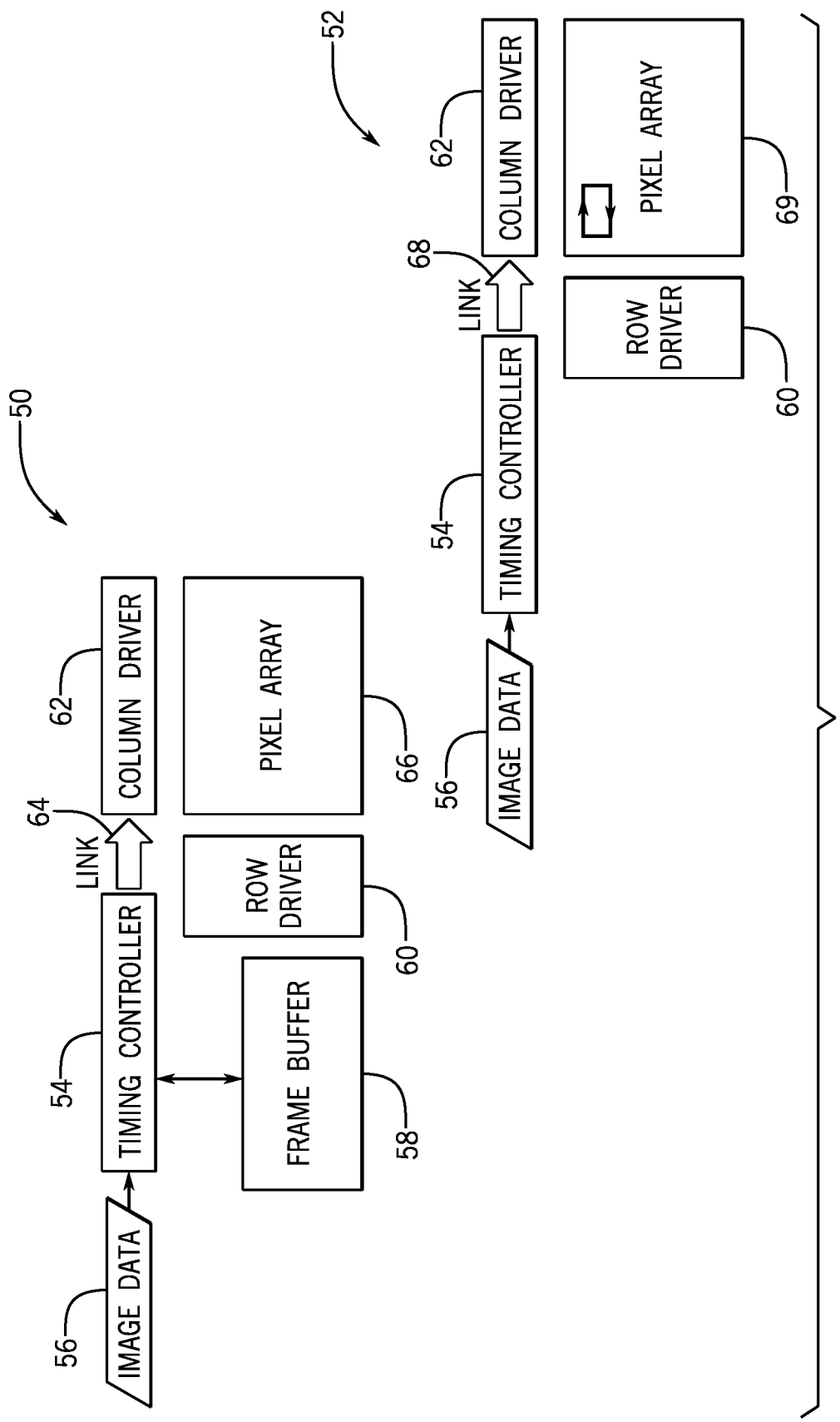
FIG. 5 is a block diagram of a display system of the electronic device of FIG. 1, in accordance with an embodiment.

To help illustrate, a display system 50 associated with an electronic display 18 that does not implement memory-in-pixel and a display system 52 associated with an electronic display 18 that does implement memory-in-pixel, which may each respectively be implemented in an electronic device 10, is shown in FIG. 5. The display system 50 includes a timing controller 54 to receive image data 56, a frame buffer 58, a row driver 60 and a column driver 62 communicatively coupled through communicative link 64 to the timing controller 54, and a pixel array 66 that receives control signals from the column driver 62 and the row driver 60 to create an image on an electronic display 18. Furthermore, the display system 52 includes a timing controller 54 to receive image data 56, a row driver 60 and a column driver 62 communicatively coupled through a communicative link 68 to the timing controller 54, and a pixel array 69 implementing memory-in-pixel techniques that receives control signals from the column driver 62 and the row driver 60 to create an image on an electronic display 18.

In preparing to display an image, the display system 50 may receive the image data 56 at the timing controller 54. The timing controller 54 may receive and use the image data 56 to determine clock signals and/or control signals to control a provision of the image data 56 to the pixel array 66 through the column driver 62 and the row driver 60. Additionally or alternatively, in some embodiments, the image data 56 is received by the frame buffer 58.

In either case, the frame buffer 58 may serve as external storage for the timing controller 54 to store the image data 56 prior to output to the column driver 62 and/or the row driver 60. The timing controller 54 may transmit the image data 56 from the frame buffer 58 to the column driver 62 and/or the row driver 60 through the communicative link 64.

The communicative link 64 is large enough (e.g., determined through transmission bandwidth of image data) to simultaneously transmit image data 56 associated with all the channels to the row driver 60 and/or the column driver 62, for example, the image data 56 associated with a red channel, a green channel, and a blue channel. In this way, the communicative link 64 communicates image data 56 associated with a respective pixel of the pixel array 66 for the red channel, the green channel, and the blue channel at the same time. The column driver 62 and the row driver 60 may transmit control signals based on the image data 56 to the pixel array 66. In response to the control signals, the pixel array 66 emits light at varying luminosities, or brightness indicated through gray levels ranging from, for example, 0 to 255, to communicate an image.

However, the display system 52 receives the image data 56 at the timing controller 54. The timing controller 54 may use the image data 56 to determine clock signals used to provision the image data 56 to the memory-in-pixel pixel array 69. The timing controller 54 transmits the image data 56 to the row driver 60 and/or the column driver 62 to program the memory of the pixel array 69 with digital data signals associated with the image data 56, where the digital data signals indicate the emission brightness/gray level for the pixels of the pixel array 69.

By implementing memory-in-pixel systems and methods, the display system 52 may reduce a bandwidth of signals communicated over communicative link 68, for example, when compared to a bandwidth of signals communicated over the communicative link 64. In some instances, a single channel of image data 56 may transmit through the communicative link 64 (e.g., red channel), as opposed to all channels being simultaneously transmitted to the pixel array 66 (e.g., red-green-blue channels). In this way, the communicative link 68 communicates image data 56 associated with a respective pixel of the pixel array 66 for the red channel, the green channel, and the blue channel at different times, causing a decrease in an overall bandwidth of signals used to communicate image data 56. Decreasing an overall bandwidth of the communicative link 68 may lead to a decrease in power consumption of the electronic device 10 because processing less data (e.g., a single channel of image data) at a given time may consume fewer processing resources than processing more data (e.g., three channels of image data).

Figure 6:
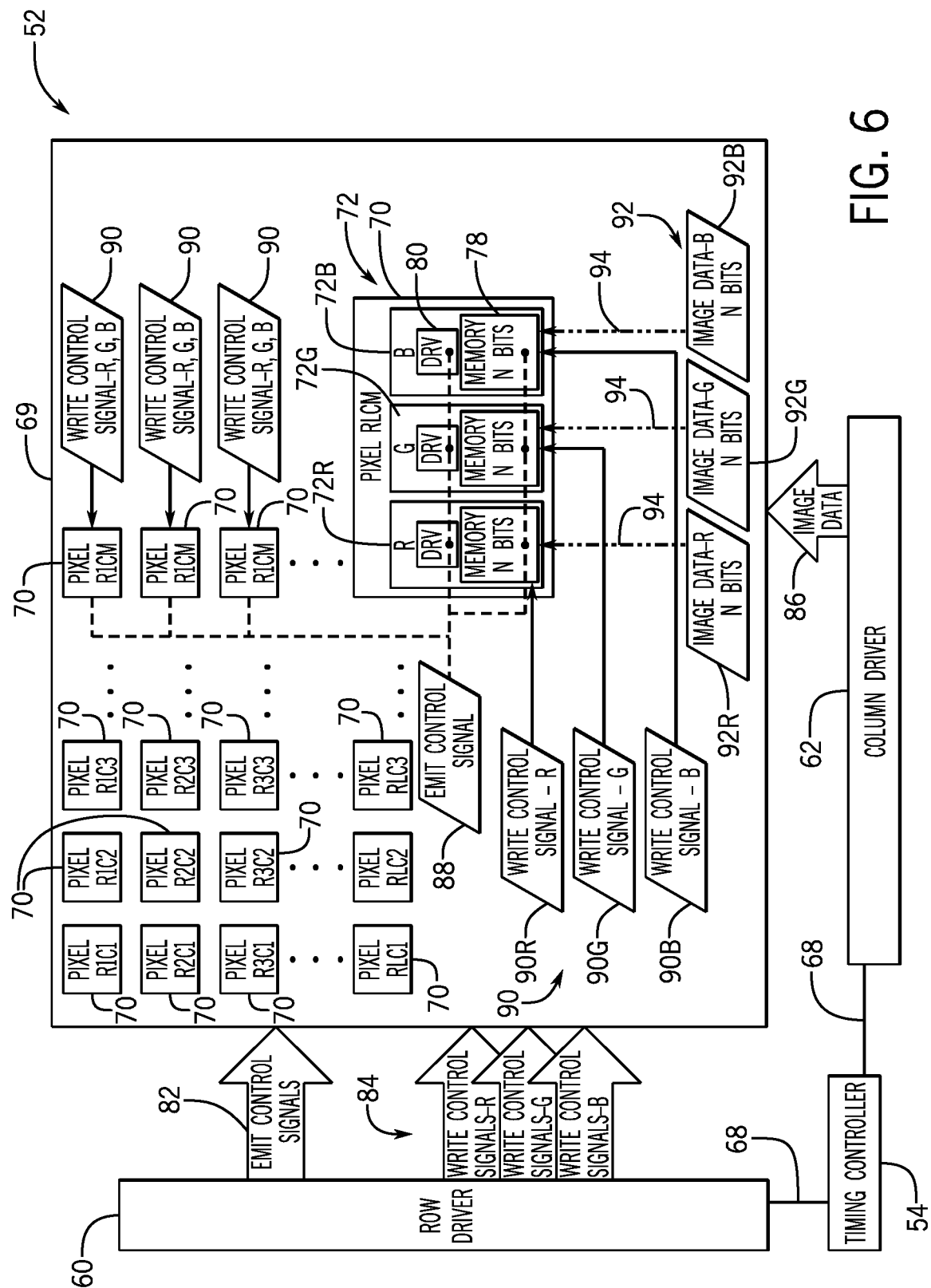
FIG. 6 is a block diagram of a pixel array of the display system of FIG. 5, in accordance with an embodiment.

To elaborate on operating the pixel array 69 with memory-in-pixel to display images, an example of a display system 52A implementing memory-in-pixel having a timing controller 54 linked through communicative link 68 to a row driver 60 and/or a column driver 62, is shown in FIG. 6. The display system 52A includes a pixel array 69 of L rows by M columns with one or more pixels 70 each having sub-pixels 72 corresponding to color channels of the electronic display 18, for example, a red sub-pixel 72R, a green sub-pixel 72G, and a blue sub-pixel 72B, where each of the sub-pixels 72 includes a memory 78 to store up to N bits and a driver (DRV) 80 to operate the sub-pixel 72 to emit light, is shown in FIG. 6. It should be appreciated that the depicted display system 52A is merely intended to be illustrative and not limiting. For example, in some embodiments, the pixel array 69 may include sub-pixels 72 to emit various amounts of cyan, yellow, and magenta light corresponding to cyan-yellow-magenta color channels instead of, or in addition to, the red-green-blue color channels.

Explaining operation of the display system 52A, the timing controller 54 receives image data 56 corresponding to a next image to be displayed on an electronic display having the pixel array 69. The timing controller 54 generates control signals and/or clocking signals responsive to the image data 56 and transmits signals related to operating rows of pixels 70 to the row driver 60 and transmits signals related to operating columns of pixels 70 to column driver 62. The row driver 60 is responsive to the signals associated with the image data 56 transmitted from the timing controller 54 and generates emit control signals 82 and write control signals 84 for each red-green-blue (RGB) channel. The column driver 62, also being responsive to the signals associated with the image data 56 transmitted from the timing controller 54, generates image data 86 to be transmitted to the memory 78 of each of the pixels 70. The column driver 62 may generate image data 86 in response to the signals associated with the image data 56 and/or the image data 56, in some embodiments, however, image data 56 transmits to each of the pixels 70 as image data 86. The column driver 62 generates data of size N bits for each sub-pixel 72, matching a size of the memory 78 which is also size N bits.

Generally, through transmission of the emit control signals 82, the write control signals 84, and the image data 86, the pixels 70 are operated to emit light to create an image on an electronic display 18. Each of the pixels 70 receives a respective emit control signal 88 of the emit control signals 82 transmitted from the row driver 60, a respective three write control signals 90 of the write control signals 84, and respective image data 92 for the channels of the pixel 70, for example, N bits of image data for the red channel (image data—R) 92R, N bits of image data for the green channel (image data—G) 92G, and N bits of image data for the blue channel (image data—B) 92B. The write control signals 84 may enable a memory 78 of the pixel 70 to be programmed by the image data 86 transmitted by the column driver 62. In addition, a respective emit control signal 88 of the emit control signals 82 may control if the pixel 70 is able to emit light. The emit control signal 88 transmits to respective pixels 70 of a column. An enabled emit control signal 88 may activate a driver 80 causing digital image data 92 from a memory 78 to transmit to a light-emitting portion of the pixel 70, for example, a light-emitting diode associated (LED) with a sub-pixel 72, that uses analog data signals to cause light emitted from the pixel 70. In the depicted embodiment, columns of pixels 70, for example, pixels 70 R1C1, R2C1, R3C1, to RLC1 in a first column receive a same emit control signal 88. Image data 92 transmitted to a pixel 70 causes the pixel 70 to emit light of an overall color and/or brightness.

A perceived color emitted from the pixel 70 changes based on the light emitted from each of the three channels of the pixel 70, that is, the light emitted from each respective sub-pixel. For example, operating each sub-pixel to output a brightness of 0, causes the pixel 70 to appear to be off while operating a red sub-pixel 72R to output a brightness of 100%, a green sub-pixel 72G to output a brightness of 50%, and a blue sub-pixel 72B to output a brightness of 0% may cause a pixel 70 to emit an overall color that is perceived as an orange color. Thus, data is rendered and transmitted to each sub-pixel 72 to correspond to individual color channels of a pixel 70.

Implementing memory 78 in a pixel 70 enables image data 92 to be programmed into the pixel 70 prior to a desired presentation time of the image. In some embodiments, an enabled write control signal 90 causes the memory 78 to clear (or overwrite) stored image data 92, where not enabling a write control signal 90 may cause the memory 78 to retain the programmed image data 92. For example, to write new image data, a write control signal—R 90R may cause a memory 78 of a red sub-pixel 72R to clear, enabling the writing of new image data, image data—R 92R to be loaded into the memory 78. In this example, a write control signal—B 90B was not enabled, thus the memory 78 of the blue sub-pixel 72B does not clear and continues to retain its programmed image data, image data—B 92B. Having memory 78 in pixels 70 is an improvement to display technologies and processing technologies because memory 78 enables portions of image data 86 to be written at a time instead of a whole frame of data, causing improved use of available bandwidth to communicate image data for display on an electronic display 18, as well as improvements to power consumption used for processing image data, as explained earlier with reference to FIG. 5.

In the pixel array 69, image data 86 is communicated from the column driver 62 to the sub-pixels 72 through a direct communicative coupling, for example, through a communicative coupling 94. In some embodiments, a multiplexing circuit may be used to control transmission of image data 86 to sub-pixels 72 such that a multiplexing control signal is used by the column driver 62 to arbitrate transmission of image data 98 to a sub-pixel 72, for example, where in such arbitration a red sub-pixel 72R may not receive image data 98 at the same time as a blue sub-pixel 72B or a green sub-pixel 72G.

Figure 7:
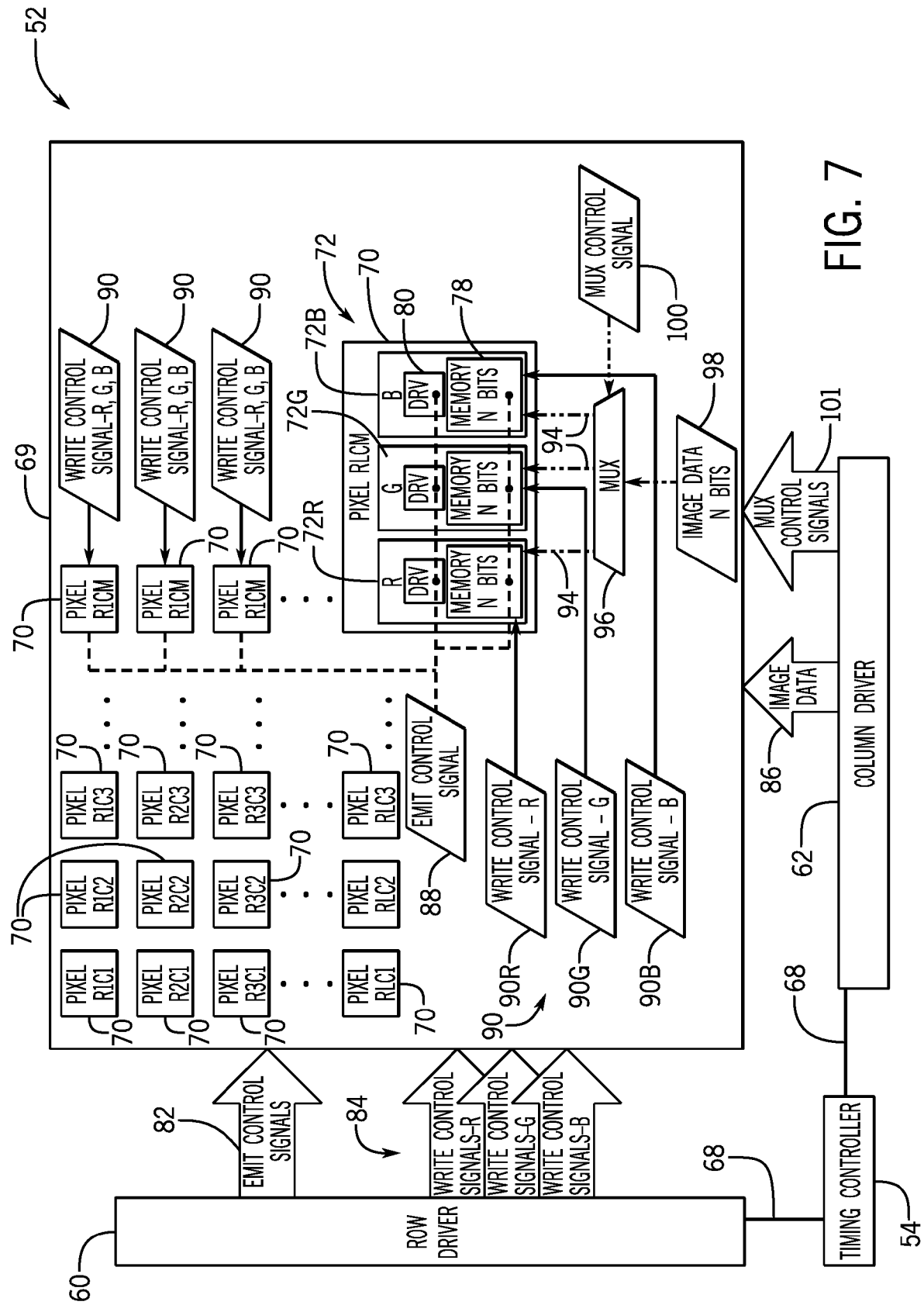
FIG. 7 is a block diagram of an embodiment of the pixel array of FIG. 6, in accordance with an embodiment.

To elaborate, an example embodiment of a display system 52B associated with an electronic display 18 implementing memory-in-pixel including a timing controller 54 linked through communicative link 68 to a row driver 60 and a column driver 62, is shown in FIG. 7. The display system 52B, similar to the display system 52A depicted in FIG. 6, includes a pixel array 69 of L rows by M columns with one or more pixels 70 each having sub-pixels 72, for example, a red sub-pixel 72R, a green sub-pixel 72G, and a blue sub-pixel 72B, where each of the sub-pixels 72 includes a memory 78 to store up to N bits and a driver (DRV) 80 to operate the sub-pixel 72 to emit light, is shown in FIG. 6. It should be appreciated that the depicted display system 52B is merely intended to be illustrative and not limiting. It is noted functions and/or descriptions of the display system 52 that are common to both FIG. 6 and FIG. 7 are relied upon herein.

In the example embodiment of the display system 52B in FIG. 7, the pixel array 69 includes a multiplexing circuit 96 that receives image data 98 of size N bits from the column driver 62. The multiplexing circuit 96 is responsive to a respective multiplexing control signal (MUX control signal) 100 of multiplexing control signals 101. The MUX control signal 100 may cause the multiplexing circuit 96 to output data to a sub-pixel 72 of a pixel 70. In this way, the column driver 62, through emission of the MUX control signal 100, may operate to program a sub-pixel 72 (e.g., one color channel) of a pixel 70 at a time via, for example, a communicative coupling 94. For the pixel array 69, various embodiments of sub-pixel 72 circuits may be used.

Figure 8:
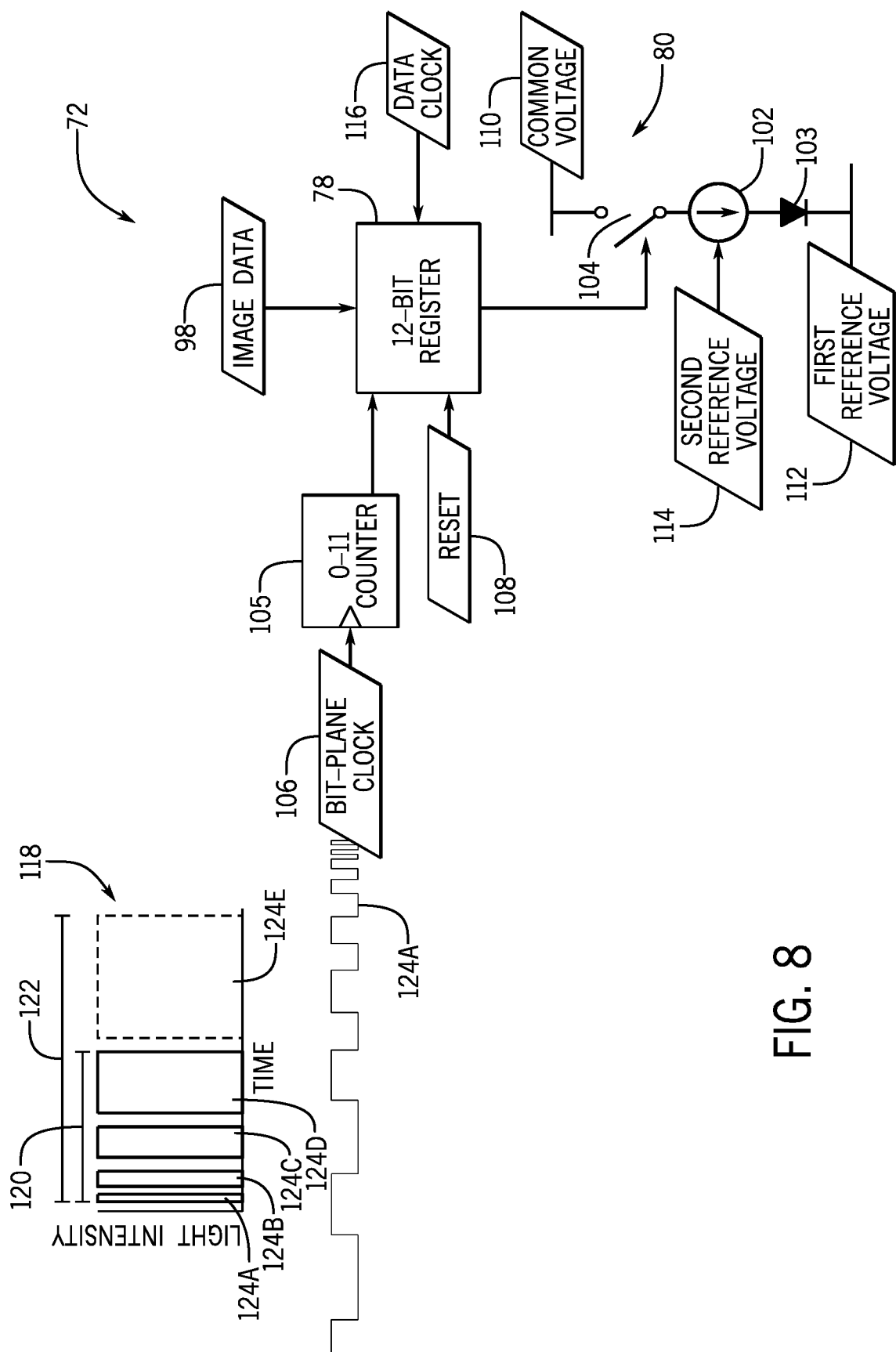
FIG. 8 is a block diagram of a pixel of the pixel array of FIG. 6 that emits light according to a binary pulse width modulation emission scheme, in accordance with an embodiment.

An example of an embodiment of a sub-pixel 72 implementing memory-in-pixel techniques includes a memory 78, a driver 80, a current source 102, a LED 103, a switch 104, and a counter 105, where the sub-pixel 72 receives a variety of signals including image data 98, a bit-plane clock 106, a reset signal 108, a common voltage 110, a first reference voltage 112, a second reference voltage 114, and a data clock 116, is shown in FIG. 8. It should be appreciated that the depicted sub-pixel 72 is merely intended to be illustrative and not limiting. For example, memory 78 is depicted as a 12-bit register but may be any suitable memory circuit to store any suitable number of bits.

The depicted sub-pixel 72 may emit according to a binary pulse width modulation emission scheme. To explain operation of the sub-pixel 72, image data 98 transmits to the memory 78 from, for example, a column driver 62. Additionally or alternatively, image data 92, image data 56, or any suitable image data may be transmitted to the memory 78 for storage. Upon receiving the image data 98, the memory 78 stores the image data 98 clocked in by the data clock 116. The image data 98 may be represented by binary data such that any given bit may equal a zero, "0," or a one, "1", where a 0 corresponds to a logical low voltage value for the system and a 1 corresponds to a logical high voltage value for the system. The memory 78 may output the image data 98 to the switch 104, for example, bit by bit in order from least significant bit to most significant bit, according to a clocking signal generated by a combination of the counter 105 and the bit-plane clock 106.

As shown, a bit-plane clock 106 has clocking time periods that increase over time to correspond to a level of influence of a particular bit in the image data 98. In this way, a least significant bit of the image data 98 may be associated with a smaller clocking time period than a most significant bit of the image data 98.

When the memory 78 outputs the image data 98, for example, at a rising edge of the bit-plane clock 106, the image data 98 operates the switch 104 to open or close. A 0 bit causes the switch 104 to open, causing the LED 103 to not emit light while a 1 bit causes the switch 104 to close, causing the LED 103 to emit light. The operation of the switch 104 occurs at varying emission periods as a method to modulate emission of light from the LED 103, causing the perceived brightness of the sub-pixel 72 to change as the modulation changes. Thus, through the relationship between the image data 98 output from memory 78 and the switch 104, image data 98 equaling "000000000000" may cause the LED 103 to not emit light while image data 98 equaling "101011000111" may cause the LED 103 to be perceived as brighter. The image data 98 equaling "101011000111" may be perceived as brighter because the sub-pixel 72 operates to emit light in response to each logical high value, "1," through the value causing the switch 104 to activate permitting light to emit. The more times the switch 104 activates during an emission period, the brighter a pixel is perceived because the more light is emitted over time (e.g., light emits in response to the "1" and does not emit in response to the "0"). In this way, image data 98 may be derived from a desired gray level for the sub-pixel 72 without being an exact binary representation of the gray level. However, it should be noted that there may be scenarios where the desired gray level for the sub-pixel 72 does indeed equal the binary representation transmitted via image data 98.

When the switch 104 closes, an electrical connection is created between the common voltage 110 and the first reference voltage 112. This causes current from current source 102 to transmit through the LED 103 enabling light to emit from the sub-pixel 72. Thus, emission periods of the sub-pixel 72 may be varied to control a perceived light emitted from the sub-pixel 72, where the emission periods correspond to a bit placement (e.g., most significant bit, least significant bit) of the image data 98 stored in the memory 78 such that the closer a bit of image data 98 is to the most significant bit position, the longer an emission period corresponding to that bit of image data 98. Once the counter 105 counts up to 11, the counter 105 restarts and causes the bit-plane clock 106 to restart its clocking intervals, for example, to correspond to a next least significant bit after the last most significant bit emission period. Additionally or alternatively, in some embodiments, the second reference voltage 114 is included to alter an overall current value used to control light emitted from the LED 103. For instance, the second reference voltage 114 may increase a sensitivity of the LED 103 to current changes such that a lower current value may be used to cause light to emit from the LED 103, or used to enable the LED 103.

This emission scheme is generally referred to as a binary pulse width modulation emission scheme for a sub-pixel 72 because the image data 98 is binary data selected to modulate light emission from the sub-pixel 72 in such a way as to change a perceived brightness of the sub-pixel 72. Graph 118 depicts emission periods for a sub-pixel 72 caused by the binary pulse width modulation emission scheme. With the binary pulse width modulation emission scheme, the sub-pixel 72 is operated to change a perceived brightness of light emitted through varying emission periods of light. As depicted in the graph 118, image data 98 received by the sub-pixel 72 is represented through five bits of binary data. Thus, when the image data 98 equals 01111, the sub-pixel 72 emits light corresponds to a first range 120 having emission periods 124A for the least significant bit and emission periods 124B, 124C, and 124D for subsequent bits. In this embodiment, the least significant bit of the image data 98 from memory 78 operates the switch 104 first, hence why the least significant bit corresponds to a first emission period 124A in time. As such, in between transmission of bits to operate switch 104, emission temporarily halts, as is seen with the no emission period between the first emission period 124A and the emission period 124B. In addition, when the image data 98 equals 11111, the emission period of the sub-pixel 72 corresponds to a second range 122 that is equal to the first range 120 plus a last emission period 124E corresponding to the most significant bit (e.g., because the most significant bit is now enabled as a 1).

When following a binary pulse width modulation emission scheme, image data 98 having data of 01111 is perceived as less bright than image data 98 having data of 11111 due to how light is perceived by a viewer of the electronic display 18. This is because the more emission periods that occur during a total emission cycle (e.g., as represented by all is in the image data 98, 11111), the brighter a light emitted from a sub-pixel 72 is perceived. As such, if the sub-pixel 72 were to emit for the last emission period 124E in addition to the first range 120 (e.g., if the most significant bit of the image data 98 was a 1), the sub-pixel 72 may be perceived as brighter on an electronic display 18 than a sub-pixel 72 emitting just for the first range 120.

Figure 9:
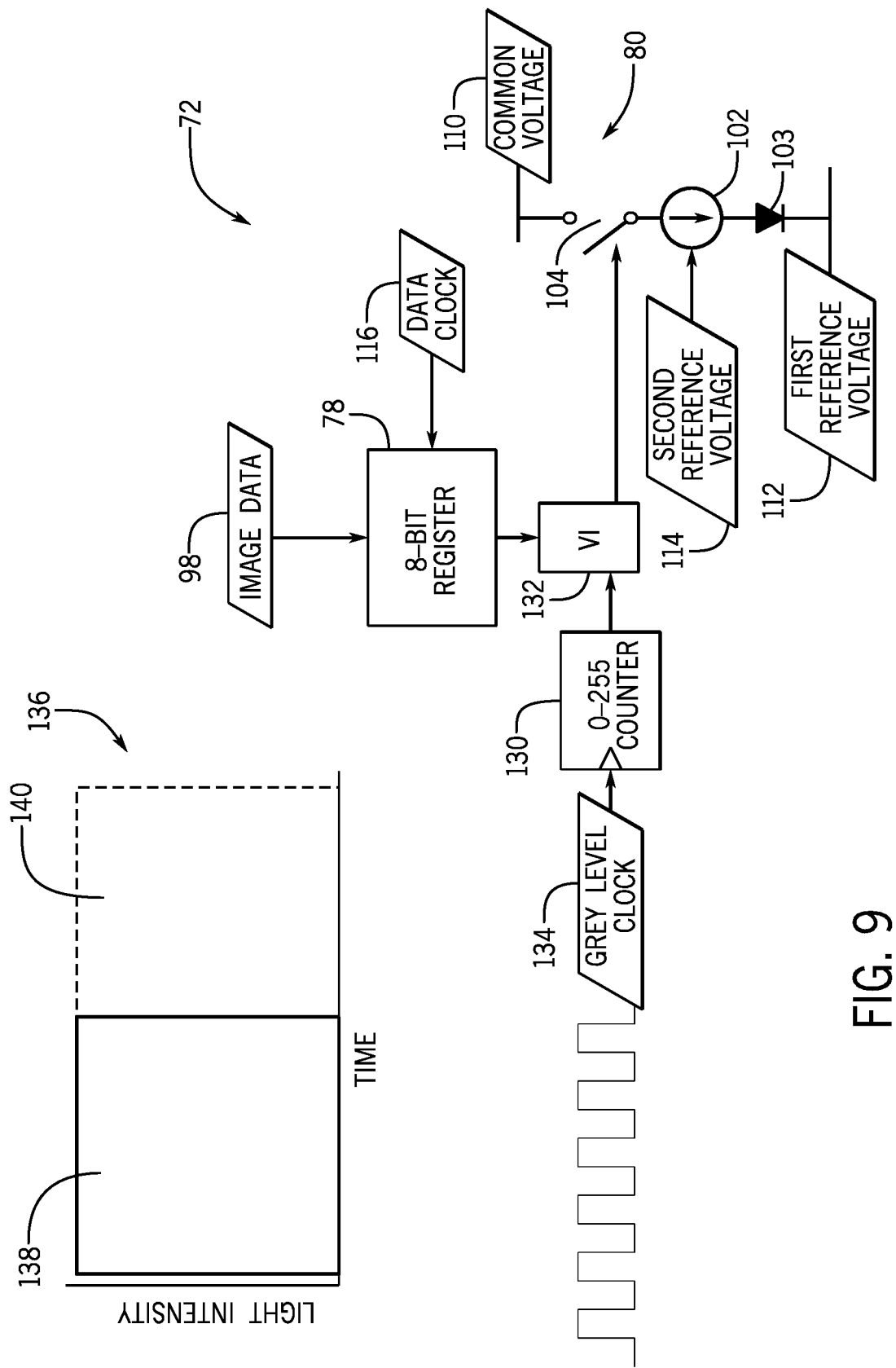
FIG. 9 is a block diagram of an embodiment of the pixel of the pixel array of FIG. 6 that emits light according to a single pulse width modulation emission scheme, in accordance with an embodiment.

Another example of an embodiment of a sub-pixel 72 including a memory 78, a driver 80, a current source 102, a LED 103, a switch 104, a counter 130, and a comparator 132, where the sub-pixel 72 receives a variety of signals including image data 98, a gray level clock 134, a common voltage 110, a first reference voltage 112, a second reference voltage 114, and a data clock 116, is shown in FIG. 9. It should be appreciated that the depicted sub-pixel 72 is merely intended to be illustrative and not limiting. For example, memory 78 is depicted as an 8-bit register but may be any suitable memory circuit to store any suitable number of bits.

The depicted sub-pixel 72, having memory-in-pixel, may emit according to a single pulse width emission scheme. To explain operation of the sub-pixel 72, image data 98 transmits to the memory 78, for example, from a column driver 62, for storage. Additionally or alternatively, image data 92, image data 56, or any suitable image data may be transmitted to the memory 78 for storage. In some embodiments, the image data 98 may be clocked into the memory 78 by the data clock 116, for example, on a rising edge of the data clock 116. The image data 98 communicated to the sub-pixel 72 may correspond to a desired gray level at which the sub-pixel 72 is to emit light. Using the image data 98 stored in the memory 78, the comparator 132 determines if a current number represented by the counter 130 is less than or equal to the image data 98 in memory 78. In other words, the counter 130 counts up to the number indicated by the image data 98 and in response to the number represented by the counter 130 meeting a condition, for example, being smaller than or equal to the number indicated by the image data 98, the comparator 132 outputs a control signal to close the switch 104 when the condition is met. When the condition is not met, the comparator 132 does not output a control signal and opens the switch 104. Additionally or alternatively, the comparator 132 may enable a deactivation control signal to cause the opening of the switch 104. For instance, if the memory 78 stores a binary sequence of 10110101 corresponding to the number 181, the comparator 132 will check if the counter 130 has counted to the number 181, and upon the counter 130 exceeding the number 181, the comparator 132 transmits a signal to open the switch 104 thus stopping emission.

When the switch 104 closes, an electrical connection is created between the common voltage 110 and the first reference voltage 112. This causes current from current source 102 to transmit through the LED 103 causing light to emit from the sub-pixel 72. Thus, emission periods of the sub-pixel 72 may be varied to control a perceived light emitted from the sub-pixel 72 through changing a number indicated by the image data 98. Additionally or alternatively, in some embodiments, the second reference voltage 114 is included to alter an overall current value used to control light emitted from the LED 103. For instance, the second reference voltage 114 may increase a sensitivity of the LED 103 to current changes such that a lower current value may be used to cause light to emit from the LED 103, or used to enable the LED 103.

The counter 130 counts from 0 to 255 and increments based on a gray level clock 134, for example, a rising edge of the gray level clock 134. Periods of the gray level clock 134 represent the time difference between increments of the gray level for an electronic display 18, for example, a difference in emission between emitting a gray level of 100 and emitting a gray level of 101. In this way, the counter 130 counts up to the number represented by the image data 98 stored in memory 78 subsequently causing emission to occur for the time period corresponding to the desired gray level. The counter 130 may continue to count beyond the number represented by the image data 98 stored in memory 78 on to a maximum value, for example, 255, and may restart counting at a minimum value, for example, 0. Thus, in some embodiments, a counting range of the counter 130 may be defined through design of the counter 130, for example, through a number of registers and/or logical components included in the counter 130. By the time the counter 130 restarts counting at 0, additional image data 98 may be stored into memory 78 to begin comparison for a next emission period of a gray level associated with the additional image data 98.

Through following this emission scheme, the sub-pixel 72 may follow a single pulse width modulation emission scheme. A representation of an emission of light from a sub-pixel 72 following a single pulse width modulation emission scheme is shown in graph 136. The graph 136 includes an actual emission period 138 and a total emission period 140. The total emission period 140 corresponds to a total length of emission represented by a maximum number transmitted as image data 98, for example, 255, and may correspond to a maximum perceived brightness of light emitted from the sub-pixel 72. The actual emission period 138 corresponds to a period of time a sub-pixel 72 emitted light for according to a number less than the maximum transmitted as the image data 98, for example, from a counter 130. A counter 130 increments from 0 to 255 taking the amount of time represented by the total emission period 140 while the comparator 132 enables light to emit for the amount of time represented by the actual emission period 138. In this way, a sub-pixel 72 may emit light of varying perceived brightness.

Figure 10:
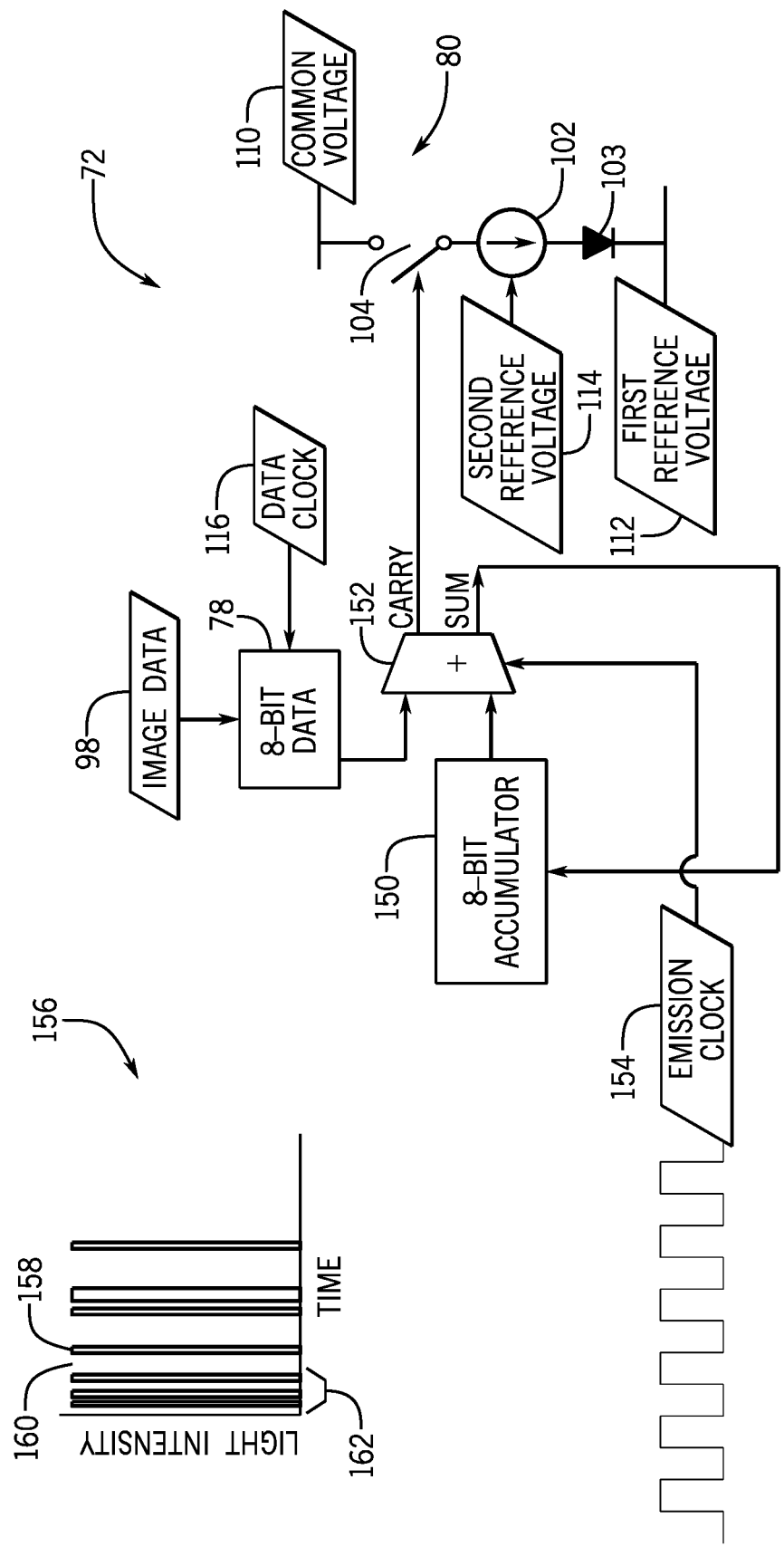
FIG. 10 is a block diagram of another embodiment of the pixel of the pixel array of FIG. 6 that emits light according to a pulse density modulation emission scheme, in accordance with an embodiment.

Another example of an embodiment of a sub-pixel 72 including memory 78, a driver 80, a current source 102, a LED 103, a switch 104, an accumulator 150, and an adder 152, where the sub-pixel 72 receives a variety of signals including an emission clock 154, image data 98, a common voltage 110, a first reference voltage 112, a second reference voltage 114, and a data clock 116, is shown in FIG. 10. It should be appreciated that the depicted sub-pixel 72 is merely intended to be illustrative and not limiting. For example, memory 78 is depicted as being able to store 8-bits of image data 98 but may be any suitable memory circuit to store any suitable number of bits.

The depicted sub-pixel 72, having memory-in-pixel, may emit according to a pulse density modulation emission scheme. In a pulse density modulation emission scheme each pulse has a constant light emitted and a constant emission period but variable separating intervals between pulses—where a brighter light emitted from the sub-pixel 72 corresponds to a higher number of pulses during a same time period. To explain operation of the sub-pixel 72 for the pulse density modulation emission scheme, image data 98 transmits to the memory 78, for example, from a column driver 62, for storage. Additionally or alternatively, image data 92, image data 56, or any suitable image data may be transmitted to the memory 78 for storage. The image data 98 transmitted to the sub-pixel 72 is generated based at least on a desired gray level at which the sub-pixel 72 is to emit light.

Upon receiving the image data 98, the memory 78 stores the image data 98 according to the data clock 116, for example, loading bits of image data 98 bit by bit on each rising edge of the data clock 116. The memory 78 outputs the image data 98 to be added to binary data stored in the accumulator 150. While the accumulator 150 is shown as being an 8-bit accumulator, it should be understood that any suitable accumulator or register may be used to temporarily store data. The adder 152 may perform binary addition of the image data 98 and binary data of the accumulator 150 in response to an emission clock 154, for example, a rising edge of the emission clock 154. The sum from the adder 152 is transmitted for storage in the accumulator 150 for use with next image data 98 while a carry bit is used to open and/or close the switch 104.

When the switch 104 closes, an electrical connection is created between the common voltage 110 and the first reference voltage 112. This causes current from current source 102 to transmit through the LED 103 generally enabling light to emit from the sub-pixel 72. In this way, variable separating intervals between pulses created by the emission clock 154 and the adder 152 transmitting the carry bit from the addition may contribute to change emission of light from the sub-pixel 72. Thus, intervals separating emission pulses of the sub-pixel 72 may be varied to control light emitted from the sub-pixel 72, where a brighter light may emit in response to smaller intervals separating the pulses (e.g., a higher density of pulses corresponds to a brighter perceived light emitted from LED 103). Additionally or alternatively, in some embodiments, the second reference voltage 114 is included to alter an overall current value used to control light emitted from the LED 103. For instance, the second reference voltage 114 may increase a sensitivity of the LED 103 to current changes such that a lower current value may be used to cause light to emit from the LED 103, or used to enable the LED 103.

Graph 156 depicts emission pulses and variable separating intervals between pulses caused by the pulse density modulation emission scheme. With the pulse density modulation emission scheme, the sub-pixel 72 emits pulses separated by different length of no emission intervals to change an overall light emitted from the sub-pixel 72. As depicted in graph 156, image data 98 may cause the sub-pixel to emit an emission pulse 158 and to not emit for the time period of a no-emission interval 160. For example, emission pulses 162 have a smaller no-emission interval separating respective emission pulses than the emission interval 160, and thus the LED 103 of the sub-pixel 72 may emit light for the emission pulses 162 that is perceived as brighter than a light emitted from the LED 103 due to the emission pulse 158.

Figure 11:
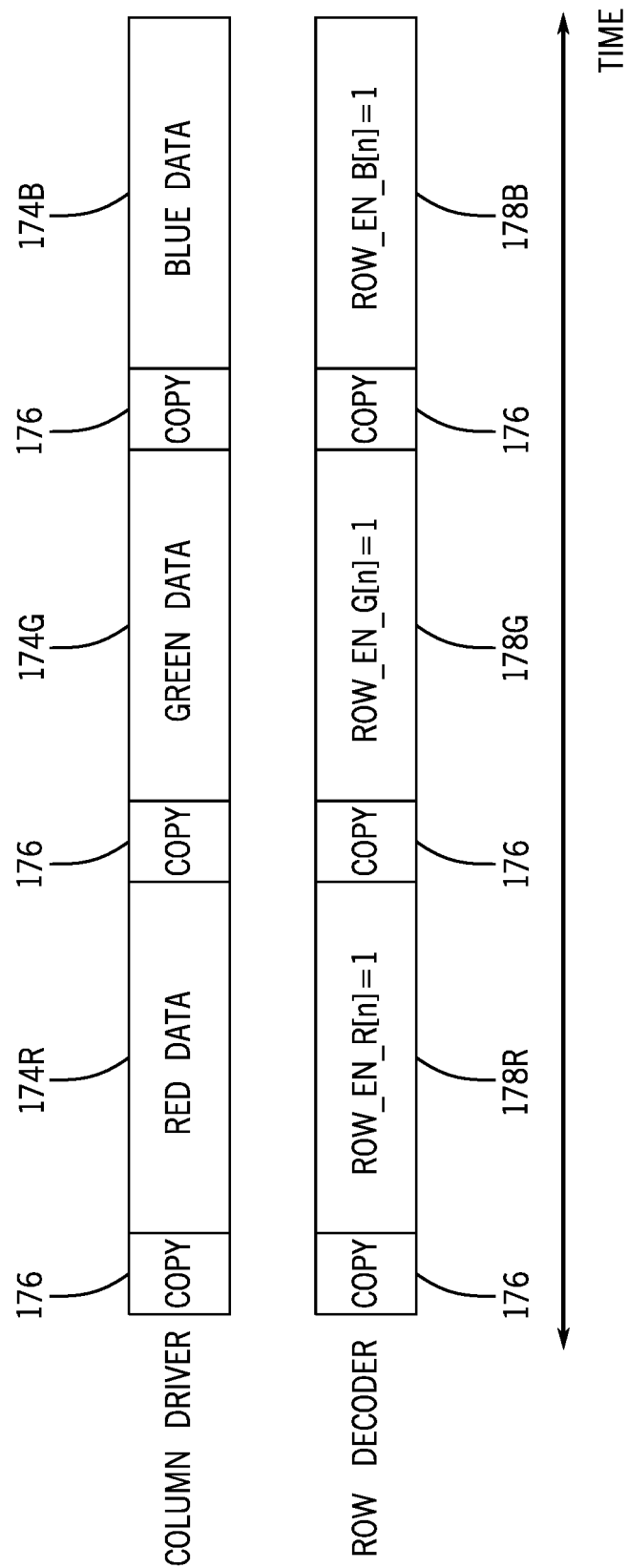
FIG. 11 is a timing diagram of programming sequences performed by a column driver of the display system of FIG. 5, in accordance with an embodiment.

Thus, to summarize, through using memory-in-pixels techniques, a timing controller 54 may program image data 98 into a display system 52 in smaller portions of image data 98 as opposed to programming image data for all sub-pixels 72 at a same time. To illustrate, a timing diagram of signal transmitted within a display system 52 to prepare to transmit image data for storage in one or more memories 78 illustrates a red image data transmission period 174R, green image data transmission period 174G, blue image data transmission period 174B, one or more copy periods 176, and one or more enable periods 178, is shown in FIG. 11.

As depicted, a column driver 62 may receive a signal to initiate the copying of red data into one or more memories 78 of one or more red sub-pixels 72R. Upon receiving the signal, the column driver 62 may enter a copy period 176 to prepare for transmitting red data to the red sub-pixels 72R. During the copy period 176, the column driver 62, for example, via internal circuitry such as a row decoder, may prepare to enable multiplexing circuits 96 associated with pixels 70 of a display system 52. The column driver 62, or other suitable circuitry, may operate the multiplexing circuits 96 to permit the programming of memories 78 of red sub-pixels 72R and may operate the multiplexing circuits 96 to not permit the programming of memories 78 of blue sub-pixels 72B and green sub-pixels 72G, for example, through enabling and/or disabling multiplexing control signals 101. In this way, the red image data may be transmitted and stored in the memories 78 corresponding to red sub-pixels 72R. At the end of the copy period 176, the column driver 62 may transmit red image data to the red sub-pixels 72R during the red image data transmission period 174R. The transmitted red image data is transmitted into the respective memories 78 of the red sub-pixels 72R to be programmed with new red image data. Upon transmitting the red image data to the red sub-pixels 72R, the column driver 62 and the row decoder may repeat the described process for green image data and blue image data, enabling selective programming of the various color channels associated with each pixel 70.

Generally, a sub-pixel 72 is operated to emit light through receiving one or more control signals, such as, from the column driver 62 and/or the row driver 60. The row driver 60 and the column driver 62 may control operation of the sub-pixel 72 by using control signals to control components of the sub-pixel 72, such as a current drive of the sub-pixel 72. As described above, the column driver 62 may be responsible at least for the transmission of image data to the sub-pixel 72 while the row driver 60 may be responsible for one or more control signals to control emission that transmit to the sub-pixel 72. The sub-pixel 72 may include any suitable controllable element responsive to these control signals and image data, such as a transistor, one example of which is a metal-oxide-semiconductor field-effect transistor (MOSFET). However, any other suitable type of controllable elements, including thin film transistors (TFTs), p-type and/or n-type MOSFETs, and other transistor types, may also be used.

In some embodiments, the row driver 60 and/or column driver 62 may perform an initialization process, a charging process, a programming process, and an emission process to the sub-pixel 72 to prepare to display an image on an electronic display 18. Through performing these processes, a row driver 60 and/or a column driver 62 of the electronic display 18 may initialize the sub-pixel 72 to be programmed, may charge a capacitor for programming, may program the sub-pixel 72 with signals corresponding to a driving current designed to cause the sub-pixel 72 to emit light, and may enable image data to control emission of light from the sub-pixel 72. In some embodiments, a current drive may be responsible for generating the driving current in the sub-pixel 72.

Figure 12:
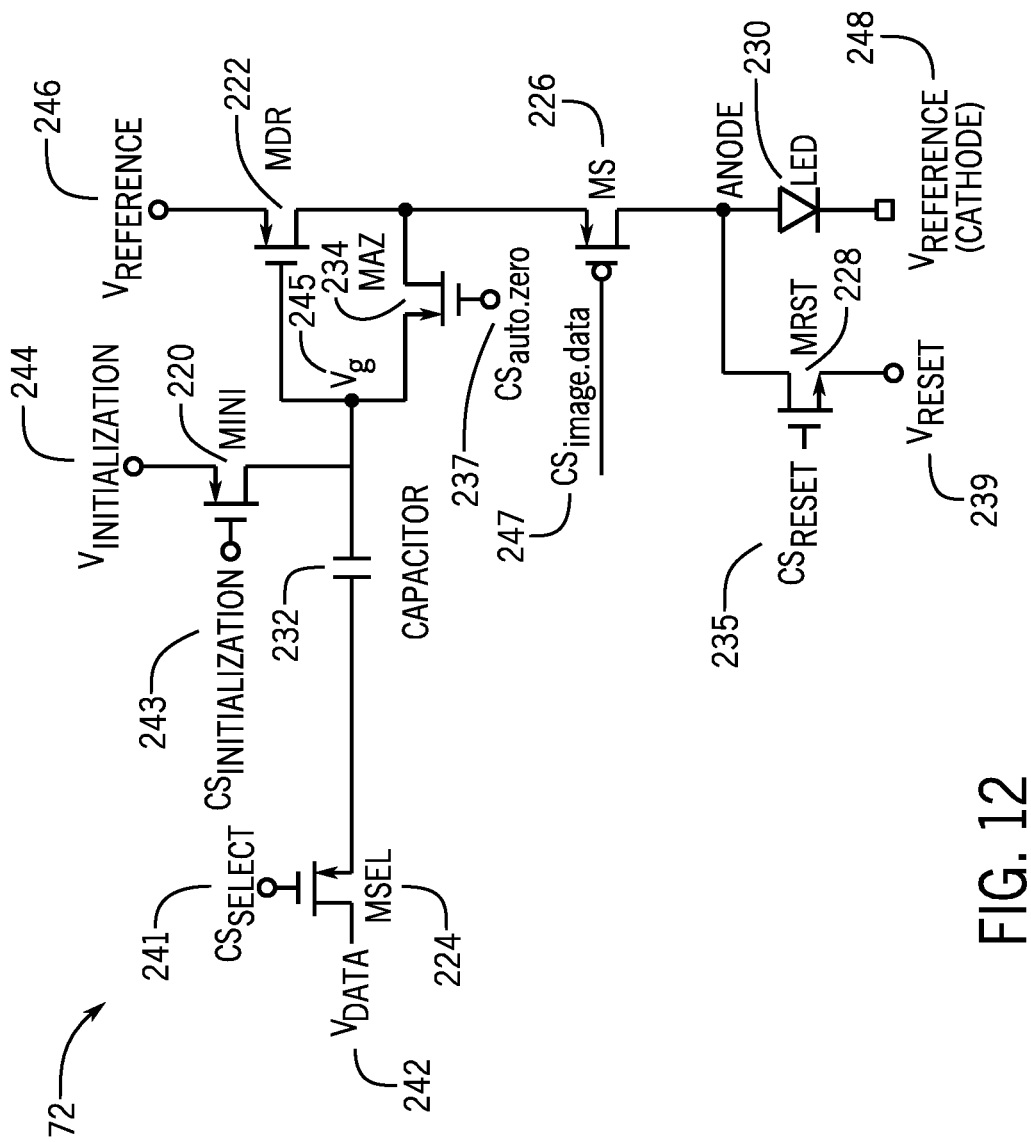
FIG. 12 is a circuit diagram of a first embodiment of a sub-pixel of the pixel array of FIG. 6 having a current drive, in accordance with an embodiment.

To help elaborate on a sub-pixel circuit having a current drive, an embodiment of a sub-pixel 72 including an initialization transistor (MINI) 220, a driving transistor (MDR) 222, a selection transistor (MSEL) 224, a switching transistor (MS) 226, a reset transistor (MRST) 228, a light-emitting portion such as a LED 230, a capacitor 232, and an auto-zero transistor (MAZ) 234 is shown in FIG. 12. It should be appreciated that the depicted sub-pixel 72 is intended to be illustrative and not limiting. For example, the row driver 60 and the column driver 62 are described herein as outputting image data and control signals relevant to displaying a next image on an electronic display 18, however it should be understood that any suitable component may be used to emit control signals to perform described processes to display of the next image. Furthermore, the circuitry shown in FIG. 12 is merely an example of circuitry implemented in a sub-pixel 72 and/or a pixel 70, and should not be interpreted as limiting. For example, a voltage drive circuit (e.g., voltage drive) may be used with the sub-pixel 72 instead of a current drive circuit (e.g., current drive).

During an initialization process, a row driver 60 may enable a reset control (CSreset) signal 235 and disable an auto-zero control (CSauto.zero) signal 237. The CSreset signal 235 may transmit to the MRST 228. In response to receiving the CSreset signal 235, the MRST 228 may activate and permit the draining of residual signals from the display of the first image from the sub-pixel 72. These residual signals may drain through to a node coupled to a voltage reset (Vreset) signal 239 designed to encourage draining of the residual signals (e.g., 0 volts), such as a system ground or a system reference voltage. In addition, the row driver 60 may enable a selection control (CSselect) signal 241. The CSselect signal 241 may transmit to the MSEL 224. In response to receiving the CSselect signal 241, the MSEL 224 may activate and permit transmission of voltage data (Vdata) signal 242 to a node of the capacitor 232. To complete the initialization process, the row driver 60 may also enable an initialization control (CSinitialization) signal 243. The CSinitialization signal 243 may transmit to the MINI 220. In response to receiving the CSinitialization signal 243, the MINI 220 may activate and permit initialization of the capacitor 232 to occur. In this state, the capacitor 232 may charge with a voltage corresponding to a voltage difference between the Vdata signal 242 and an initialization voltage (Vinitialization) signal 244. As such, the voltage difference may be programmed through selecting different values for Vdata signal 242 and Vinitialization signal 244 based on a desired voltage level to initialize the capacitor 232 with, while protecting the sub-pixel 72 from receiving additional signals that may interfere with the initialization or that may cause unintentional emissions of light from the LED 230. The row driver 60 may continue the initialization process until the row driver 60 disabled the CSinitialization signal 243 causing the MINI 220 to deactivate.

After the initialization process, the row driver 60 may perform the charging process while the MINI 220 and the MRST 228 are deactivated. During the charging process, the MAZ 234 and the MINI 220 remain deactivated, while the MSEL 224 remains activated. While the MSEL 224 is activated, the capacitor 232 charges based on the Vdata signal 242 and a reference voltage (Vreference) signal 246. Charging the capacitor 232 may enable a driving current to transmit through the MDR 222 even while the MSEL 224 is deactivated. In some embodiment, the capacitor 232 stores the voltage value of the Vdata signal 242 such that the MDR 222 remains activated throughout the emission process—permitting the sub-pixel 72 to produce a constant driving current through the LED 230 for emission. In this way, the sub-pixel 72 has a current drive—since the driving current enables the emission of light from the LED 230 while the MS 226 is activated.

During the programming process, the row driver 60 may enable the CSauto.zero signal 237 causing the activation of the MAZ 234. When the MAZ 234 activates, an electrical coupling is formed between the node of the capacitor 232 and a source node of the MS 226, such that a voltage value of the source node of the MS 226 increases to equal the voltage value of a gate voltage (Vg) 245 of MDR 222. After period of time sufficient for the voltage of source node of the MS 226 to increase to equal the voltage value of Vg 245, the row driver 60 may disable the CSauto.zero signal 237 causing the MAZ 234 to deactivate. At this state, the sub-pixel 72 is programmed with electrical signals ready to transmit through to the LED 230 upon activation of the MS 226. That is, at this state, the sub-pixel 72 is ready to transmit a driving current created through the programmed signals in response to CSimage.data signal 247 enabling the MS 226.

Upon completion of the programming process, the row driver 60 may operate the sub-pixel 72 to perform the emission process. During the emission process, the sub-pixel 72 emits light according to image data control (CSimage.data) signal 247 transmitted to the MS 226, for example, from the column driver 62. The sub-pixel 72 may receive the CSimage.data signal 247 from any suitable component of an electronic device 10 that may create and/or generate image data for display via a sub-pixel 72. The MS 226 activates in response to an enabled CSimage.data signal 247, for example, a logical high bit of a voltage having sufficient value to switch the MS 226 (e.g., large enough to overcome the programmed voltage at the source node of the MS 226 and a threshold voltage of the MS 226). Upon activation of the MS 226, the voltage stored at the source node of the MS 226 transmits as a driving current through the LED 230. If the driving current exceeds a threshold voltage of the LED 230, where the threshold voltage of an LED represents a voltage value at or above which light emits from the LED, thus the LED 230 may emit light based at least in part on a value of the driving current.

As will be appreciated, the CSimage.data signal 247 may be binary and/or digital data representative of image data used to operate the sub-pixel 72 to emit at a particular gray level to convey an image (e.g., the second image). As discussed earlier, the sub-pixel 72 may operate according to a variety of emission schemes, and as such, the CSimage.data signal 247 transmitted to the MS 226 may vary between embodiments. However, across the embodiments, the CSimage.data signal 247 is derived from an image to be displayed on the display. Furthermore, the enabling and/or disabling of the CSimage.data signal 247 at least in part causes the LED 230 to emit light or to not emit light, and thus enables the CSimage.data signal 247 to modulate the emission of light from the sub-pixel 72.

Upon a completion of the emission process, the row driver 60 may disable the CSselect signal 241 and enable the CSreset signal 235, causing the deactivation of the MSEL 224 and the activation of the MRST 228. Upon the MSEL 224 deactivating, the sub-pixel 72 may no longer operate to emit light because the capacitor 232 is no longer receiving a charge and because residual signals from the emission process are drained permitted by the enabling of the MRST 228.

The sub-pixel 72 described is considered a current drive pixel because the sub-pixel 72 has a primary current that drives the LED 230 to emit light or not emit light. The primary, or driving, current transmits through MS 226 in response to various control signals controlling the timing of the light emission from the sub-pixel 72. The described sub-pixel 72 circuit may have particular advantages including how a digital output is able to control emission from the LED 230 without further conversion into an analog output. In addition, inclusion of a capacitor 232 may enable compensation for a change of threshold voltage associated with the sub-pixel 72 from a substrate bias effect, a side effect associated with applying a voltage to a gate of some transistors.

Further improvements to the sub-pixel 72 may occur if a voltage drive is included in addition to the current drive structure of sub-pixel 72 in FIG. 12. At the beginning of the emission process, the voltage drive is enabled for a period of time to provide a boost to the anode of the LED 230 to make initial emission of light easier, where a lower driving current may be used to enable light emission than without boosting the anode of the LED 230. A smaller driving current value may be used to drive the LED 230 to emit light because the LED 230 may operate in a forward bias region, or an operating region of an LED 230 more sensitive to small changes in currents, because of the boost provided by the voltage drive.

Figure 13:
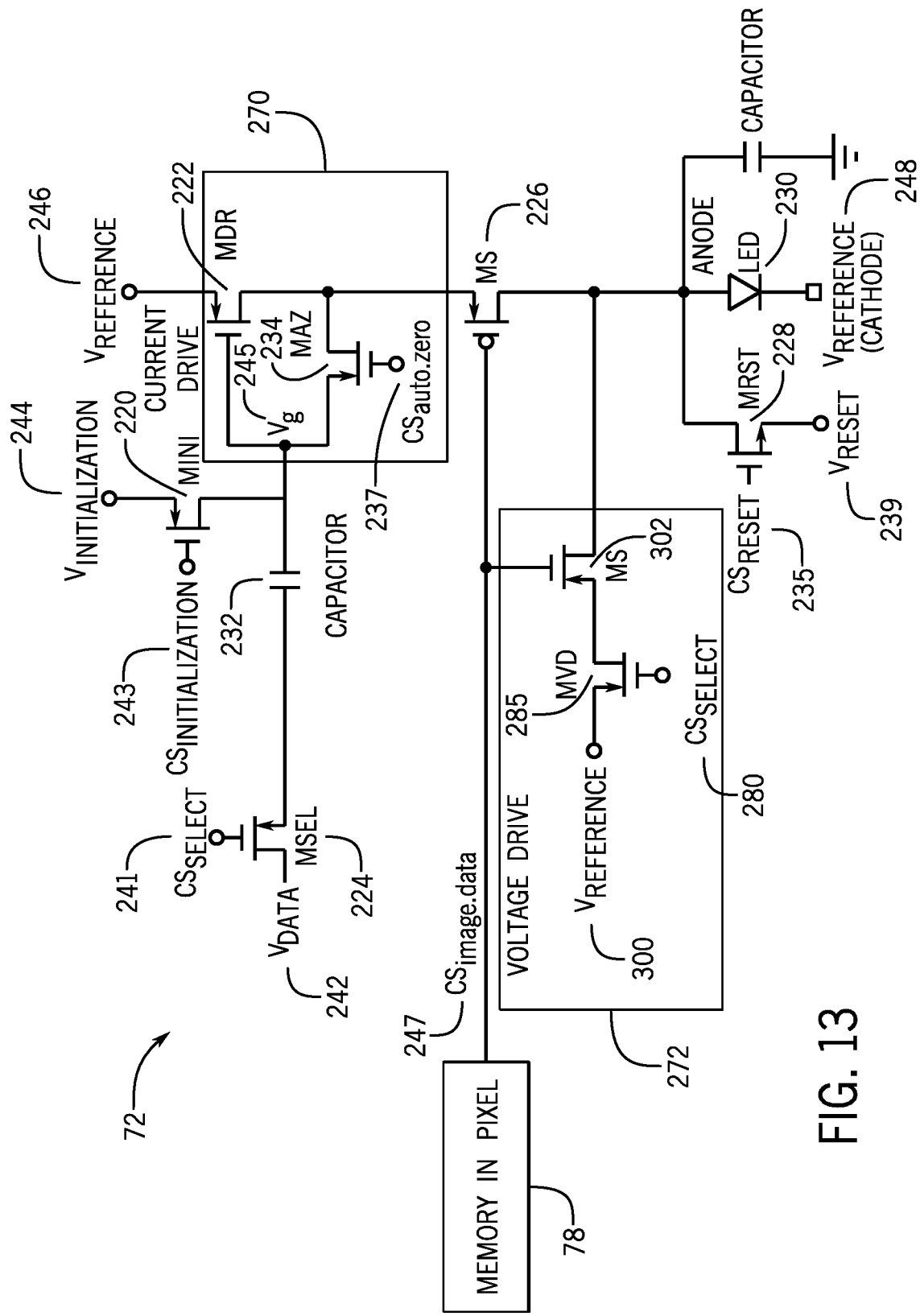
FIG. 13 is a circuit diagram of a second embodiment of the sub-pixel of the pixel array of FIG. 6 having a hybrid drive and having memory, in accordance with an embodiment.

To illustrate, a second embodiment of the sub-pixel 72 having a hybrid drive including a current drive 270 and a voltage drive 272 and having a memory 78 is shown in FIG. 13. It should be appreciated that the depicted sub-pixel 72 is intended to be illustrative and not limiting. For example, the current drive 270 and the voltage drive 272 are shown as separate elements in the sub-pixel 72 but one or both of the drives may be included in the driver 80 described earlier.

A row driver 60 and/or a column driver 62 may operate the sub-pixel 72 to emit light by enabling and/or disabling control signals. The row driver 60 and/or the column driver 62 may use the control signals to perform various processes to cause the sub-pixel 72 to emit light, including an initialization process, a charging process, a programming process, and an emission process for the sub-pixel 72 to enable display of the image data corresponding to an image to be displayed.

Figure 14:
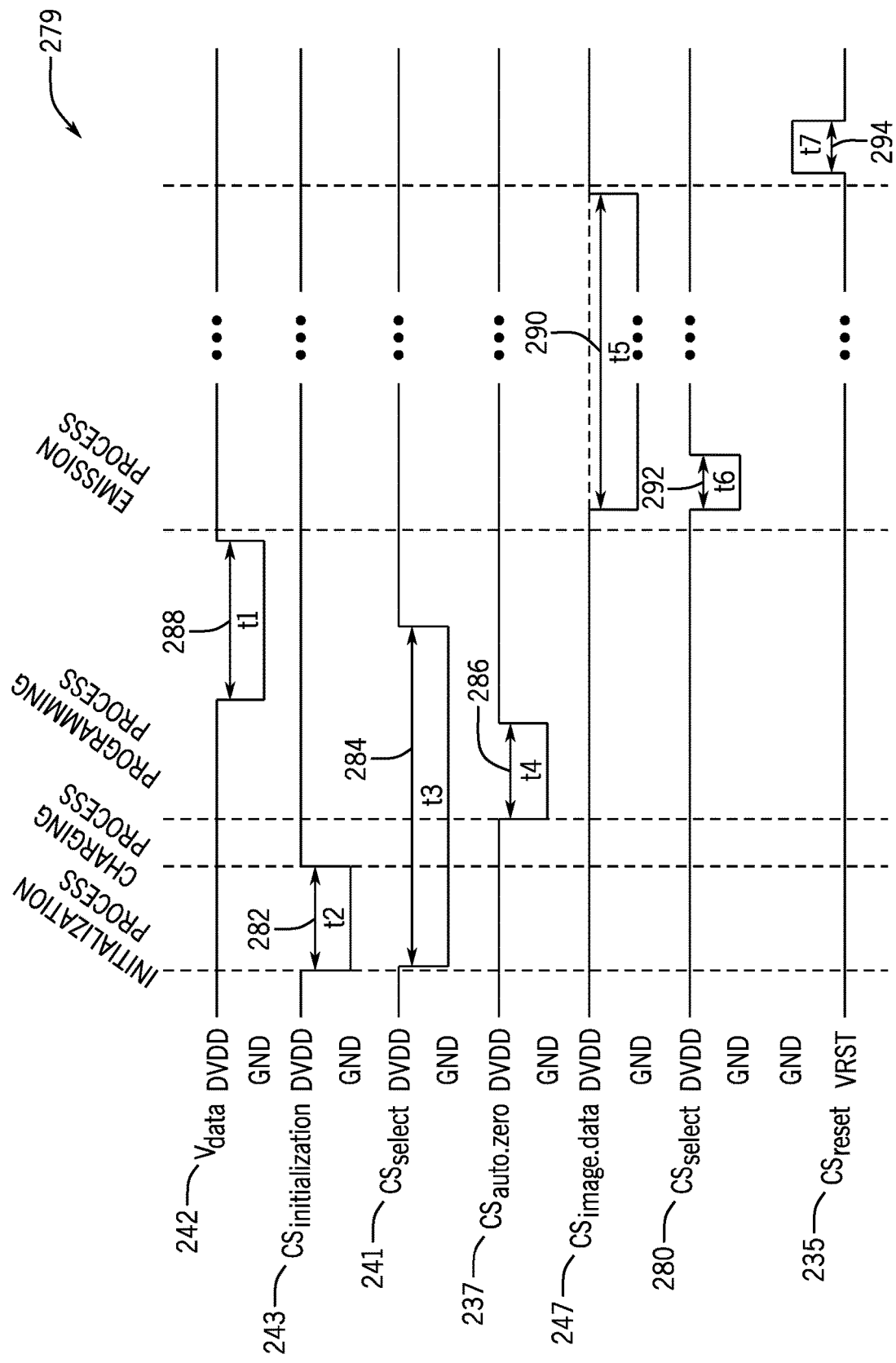
FIG. 14 is a timing diagram of control signals used to operate the sub-pixel of FIG. 13, in accordance with an embodiment.

To help illustrate the interaction of control signals emitted by the row driver 60 and/or the column driver 62 and the sub-pixel 72 of FIG. 13, a timing diagram 279 corresponding to signals used to display including a Vdata signal 242, a CSinitialization signal 243, a CSselect signal 241, a CSauto.zero signal 237, an CSimage.data signal 247, a CSselect signal 280, and a CSreset signal 235, is shown in FIG. 14. It should be appreciated that the timing diagram is intended to be illustrative and not limiting, for example, control signals shown in FIG. 14 may represent more or less control signals than implemented in a sub-pixel 72.

The initialization process described above corresponds to a time period 282. During the time period 282, a row driver 60 may provide a high voltage for the Vdata signal 242, may enable the CSinitialization signal 243 for the duration of the initialization process, may enable the CSselect signal 241 for a time period 284, may disable the CSauto.zero signal 237, may disable the CSreset signal 235, and may disable the CSselect signal 280.

Referring back to FIG. 13, the control signals outputted by the row driver 60 to execute an initialization process cause activation and/or deactivation of various switching elements, as described earlier. Implementing the control signals of FIG. 14 into the sub-pixel 72 causes a MINI 220 to activate in response to the enabled CSinitialization signal 243, causes a MSEL 224 to activate in response to the enabled CSselect signal 241, causes a MAZ 234 to deactivate in response to the disabled CSauto.zero signal 237, causes a MRST 228 to deactivate in response to the disabled CSreset signal 235, and causes a voltage drive switching element (MVD) 285 to deactivate in response to the disabled CSselect signal 280. This arrangement enables a difference in voltage values between the Vdata signal 242 and the Vinitialization signal 244 to charge a capacitor 232. The row driver 60 may continue the initialization process until the row driver 60 disables the CSinitialization signal 243 to cause the MINI 220 to deactivate, and thus end initialization.

Referring back to FIG. 14, the timing diagram 279 shows, after the initialization process, the row driver 60 disables the CSinitialization signal 243 to perform a charging process to the sub-pixel 72. During the charging process, the Vdata signal 242, the CSauto.zero signal 237, the CSimage.data signal 247, the CSselect signal 280, and the CSreset signal 235 remain at their previous state. The timing diagram 279 shows the Vdata signal 242 at a high voltage level for the sub-pixel 72 circuit (DVDD), for example, corresponding to a logical high value in binary data for the sub-pixel 72 and/or the electronic device 10. In some embodiments, DVDD is equal to a voltage value of the Vreference signal 246.

Referring back to FIG. 13, the control signals outputted by the row driver 60 activate and/or deactivate various switching elements to execute a charging process. Upon the disabling of the CSinitialization signal 243 and the deactivation of the MINI 220, the capacitor 232 charges based on the Vdata signal 242 and the Vreference signal 246. Charging the capacitor 232 may enable the current drive 270 to remain in use during the emission process even while the MSEL 224 is deactivated. In some embodiments, the capacitor 232 holds the voltage value of the Vdata signal 242 after the charging process such that the MDR 222 may remain activated throughout the emission process—permitting the current drive 270 to produce a constant driving current through the LED 230 for emission.

After a set period of time suitable to charge the capacitor 232, the row driver 60 may perform a programming process. Referring briefly to FIG. 14, to perform the programming process, the row driver 60 enables the CSauto.zero signal 237 for a time period 286 and holds CSinitialization signal 243, the Vdata signal 242, the CSimage.data signal 247, the CSselect signal 280, and the CSreset signal 235 at their previous state. As is shown, the row driver 60 also transmits a ground voltage (GND) as the Vdata signal 242 for a time period 288 during the programming process. The GND may equal zero volts or any suitable ground reference voltage associated with an electronic display 18, an electronic device 10, and/or a sub-pixel 72.

Returning to FIG. 13, in response to the enabled CSauto.zero signal 237, the MAZ 234 activates. When the MAZ 234 activates, an electrical coupling is formed between the node of the capacitor 232 and a source node of the MS 226, such that a voltage value of the source node of the MS 226 increases to equal the voltage value of Vg 245. After the time period 286, the row driver 60 disables the CSauto.zero signal 237 and the MAZ 234 deactivates. At this state, the sub-pixel 72 is programmed with electrical signals ready to transmit to the LED 230 upon activation of the MS 226. That is, at this state, the sub-pixel 72 is ready to transmit a driving current created through the programmed signals in response to CSimage.data signal 247 enabling the MS 226. Once the source node of the MS 226 is programmed with the Vg 245 voltage, the row driver 60 transmits a Vdata signal 242 equal to GND and, at the end of the time period 284, disables the CSselect signal 241 causing the MSEL 224 to deactivate. Upon the completion of the programming process, the row driver 60 may enable and/or disable control signals to perform an emission process.

Referring to FIG. 14, during an emission process, the row driver 60 may return a Vdata signal 242 to DVDD, may continue to disable the CSinitialization signal 243, may continue to disable the CSselect signal 241, may enable the CSimage.data signal 247 for a time period 290, may enable the CSselect signal 280 for a time period 292, and may continue to disable the CSreset signal 235. As is illustrated, the CSselect signal 280 is enabled at the same time as the CSimage.data signal 247, however is disabled earlier than the CSimage.data signal 247. This is because the CSselect signal 280 acts to activate a switching element to provide the boost to an anode of an LED 230 of the sub-pixel 72.

Returning to FIG. 13 to illustrate, a voltage drive switching element (MVD) 285 of the sub-pixel 72 activates in response to the enabling of the CSselect signal 280 causing the voltage drive 272 to activate. In response to the MVD 285 activating, a reference voltage (Vreference) signal 300 transmits to the anode of the LED 230 upon the CSimage.data signal 247 enabling a switching transistor (MS) 302 and the MS 226 for a first transmitted CSimage.data signal 247. This causes the Vreference signal 300 to transmit at the anode of the LED 230 enabling, or "boosting," a smaller programmed value from the source of the MS 226 to cause emission of light from the LED 230. The boosting may continue for the time period 292, where upon the ending of the time period 292, the row driver 60 disables the CSselect signal 280 causing the deactivating of the MVD 285 and of the MS 302.

Generally, the emission process may continue for the time period 290 with the boost lasting for a shorter time period, for example, a time period 292. During the emission process, the sub-pixel 72 is programmed to transmit the driving current through the LED 230 in response to the activation of the MS 226. As described earlier, the memory 78 of the sub-pixel 72 stores digital data and outputs digital data. Through the described hybrid drive, stored digital data is transmitted from memory 78 as digital data turning into a control signal to control the emission of light from the sub-pixel 72 with little overhead and no increased consumption of power. At the conclusion of boosting, in some embodiments, the sub-pixel 72 may be reset via enabling of the CSreset signal 235, for a duration such as time period 294. Thus, light emitted from the LED 230 may follow a variety of emission schemes, as explained earlier with FIG. 8-FIG. 10, to communicate gray levels associated with an image because the binary data outputted from the memory 78 acts to modulate the light emitted via the LED 230.

Figure 15:
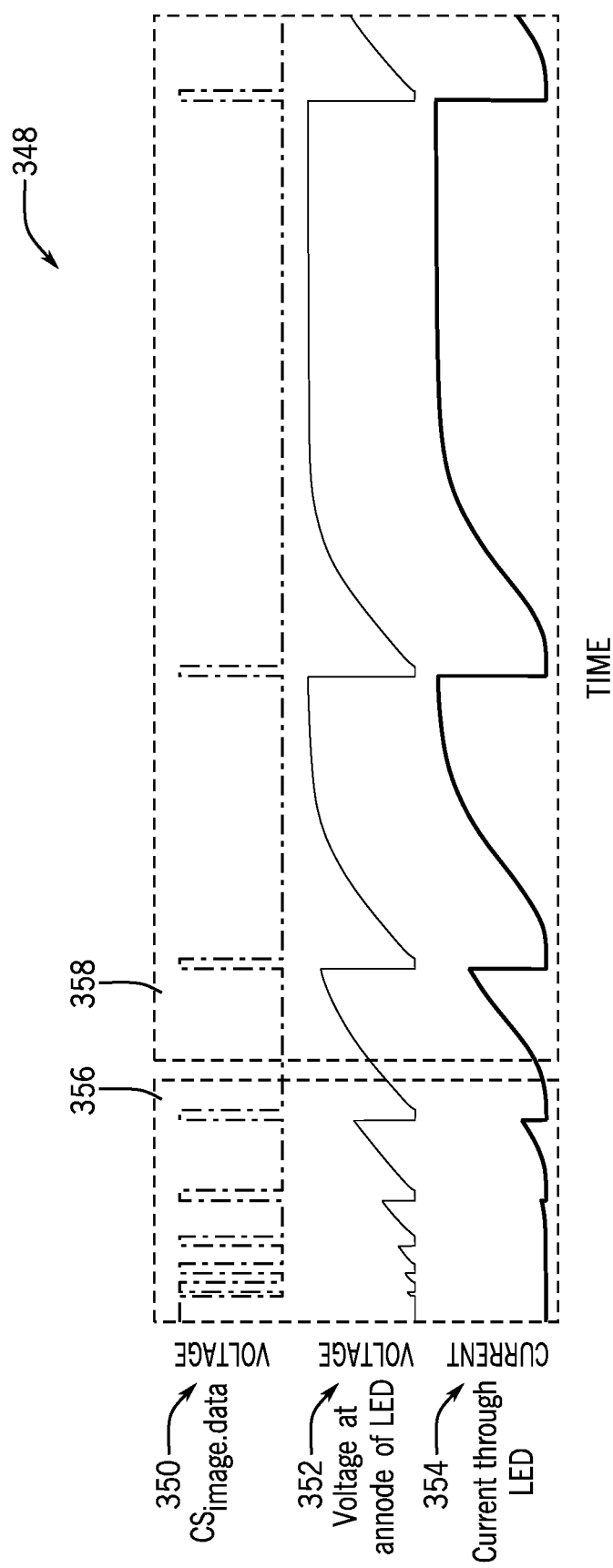
FIG. 15 is a graph showing a current and a voltage created by simulating transmission of image data corresponding to a binary pulse width modulated emission scheme to the sub-pixel of FIG. 12, in accordance with an embodiment.

To help illustrate effects of the "boost" to an anode voltage of a sub-pixel 72, a graph 348 illustrating an example CSimage.data signal 350, a voltage signal 352 corresponding to a voltage at an anode of a LED 230, and a current signal 354 corresponding to a current through the LED 230 for a sub-pixel 72 not implementing a hybrid drive, is shown in FIG. 15. It should be appreciated that the timing diagram is intended to be illustrative and not limiting.

In this simulation, a binary pulse width modulation emission scheme was tested by providing an increasingly wider binary pulse as the CSimage.data signal 350. The simulation results, shown in the graph 348, generally has two portions. A first portion 356 may correspond to a slower emission response time and a second portion 358 may correspond to a normal emission response time, where an emission response time generally refers to a relative responsiveness of an LED 230 to voltages applied to it. It is also worth noting that an LED, like the LED 230, operates to conduct based on the difference in voltages between an anode and a cathode of the LED. If the difference in voltage between the anode and the cathode is greater than a threshold voltage, the LED operates to emit light according to a value of the current transmitted through the LED. In the graph 348, the current signal 354 may generally correspond to LED 230 emission, where the closer the current signal 354 values matches a state of the CSimage.data signal 350, the better the emission response time of the LED 230. In the graph 348, the effects of a slow charge effect on the anode voltage of the LED 230 are clear. During the first portion 356, the current signal 354 appears to be less responsive to state changes of the CSimage.data signal 350 than the second portion 358, as indicated by the general matching of amplitudes of the current signal 354 and the CSimage.data signal 350 during the second portion 358 and the lack thereof during the first portion 356. Boosting the anode at the beginning of an emission period may reduce, or eliminate, the slow charge effect of the anode voltage.

Figure 16:
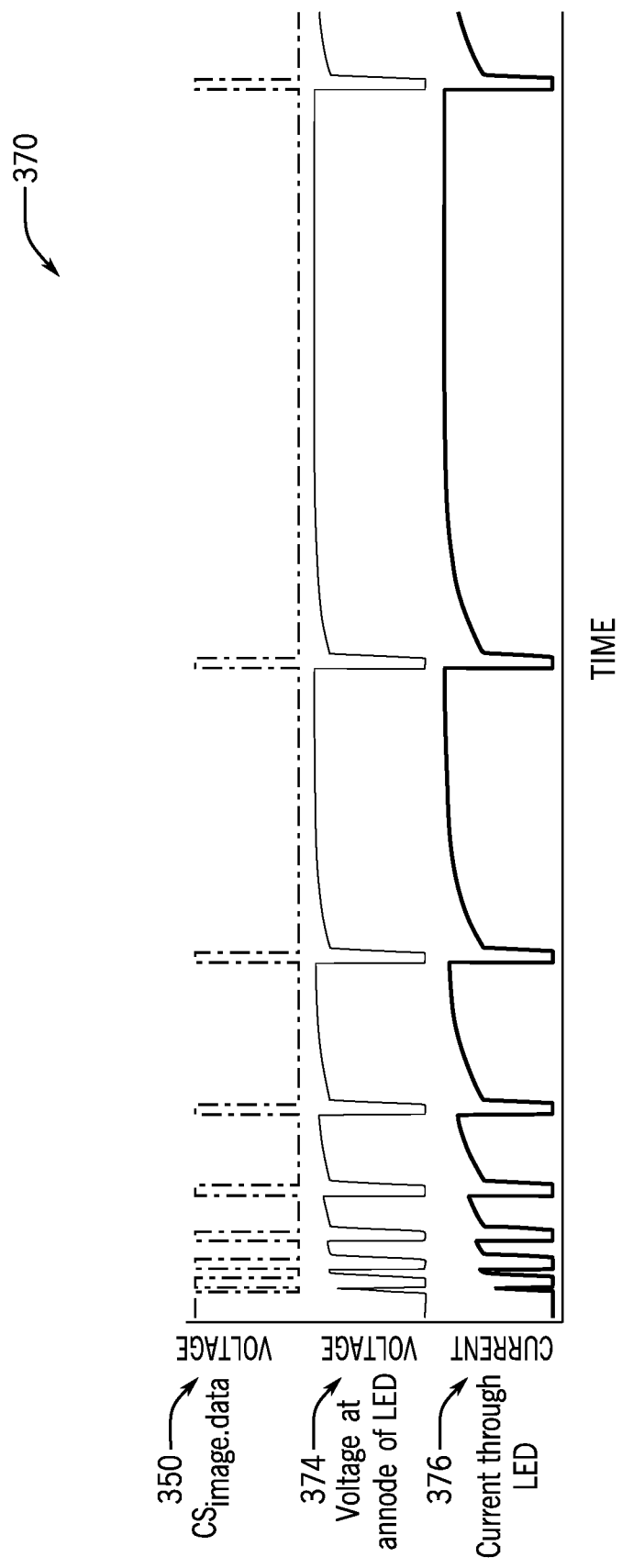
FIG. 16 is a graph showing a current and a voltage created by simulating transmission of image data corresponding to a binary pulse width modulated emission scheme to the sub-pixel of FIG. 13, in accordance with an embodiment.

Proceeding onto FIG. 16, for comparison, a graph 370 illustrating an example CSimage.data signal 350, a voltage signal 374 corresponding to a voltage at an anode of a LED 230, and a current signal 376 corresponding to a current through the LED 230 for a sub-pixel 72 having a hybrid drive, is shown in FIG. 16. It should be appreciated that the timing diagram is intended to be illustrative and not limiting. For example, while the CSimage.data signal 350 is shown to follow binary pulse width modulation emission scheme, any suitable emission scheme may cause the same improvement to responsiveness as is described below.

In this simulation, similar to the graph 348, a binary pulse width modulation emission scheme was tested by providing an increasingly wider binary pulse as the CSimage.data signal 350. However, unlike the graph 348, the graph 370 shows the current signal 376 to be responsive to changes in the CSimage.data signal 350. This improved responsiveness is due at least in part to the addition of the voltage drive 272 to the sub-pixel 72. Because the voltage drive 272 of the hybrid drive is "boosting" the anode of the LED 230, smaller changes in voltages at the anode of the LED 230 may elicit the same and/or similar responsiveness of the second portion 358 of the graph 348. Thus, the graph 370 shows the benefits and improvements to display technologies provided by at least implementing a hybrid drive in a sub-pixel 72.

As described above, a display implementing memory-in-pixel techniques may implement a variety of pixel circuitry embodiments and a variety of memory circuitry embodiments to achieve benefits described earlier in this disclosure. An example embodiment is a memory circuit supporting a binary pulse width emission scheme, where digital data stored in the memory circuit is outputted to the driver circuit to control emission of light from a pixel. As a reminder, the binary pulse width emission scheme works in tandem with a clocking signal, for example, a bit-plane clock, to assign contribution weights to the different portions of digital data transmitted from the memory circuit. In some embodiments, the clocking signal is used to clock a register to output stored digital data from a memory circuit. However, in some embodiments, a system clock and/or a row driver 60 may control light emission duration through a length of time that an emission-enabling signal is enabled.

Figure 17:
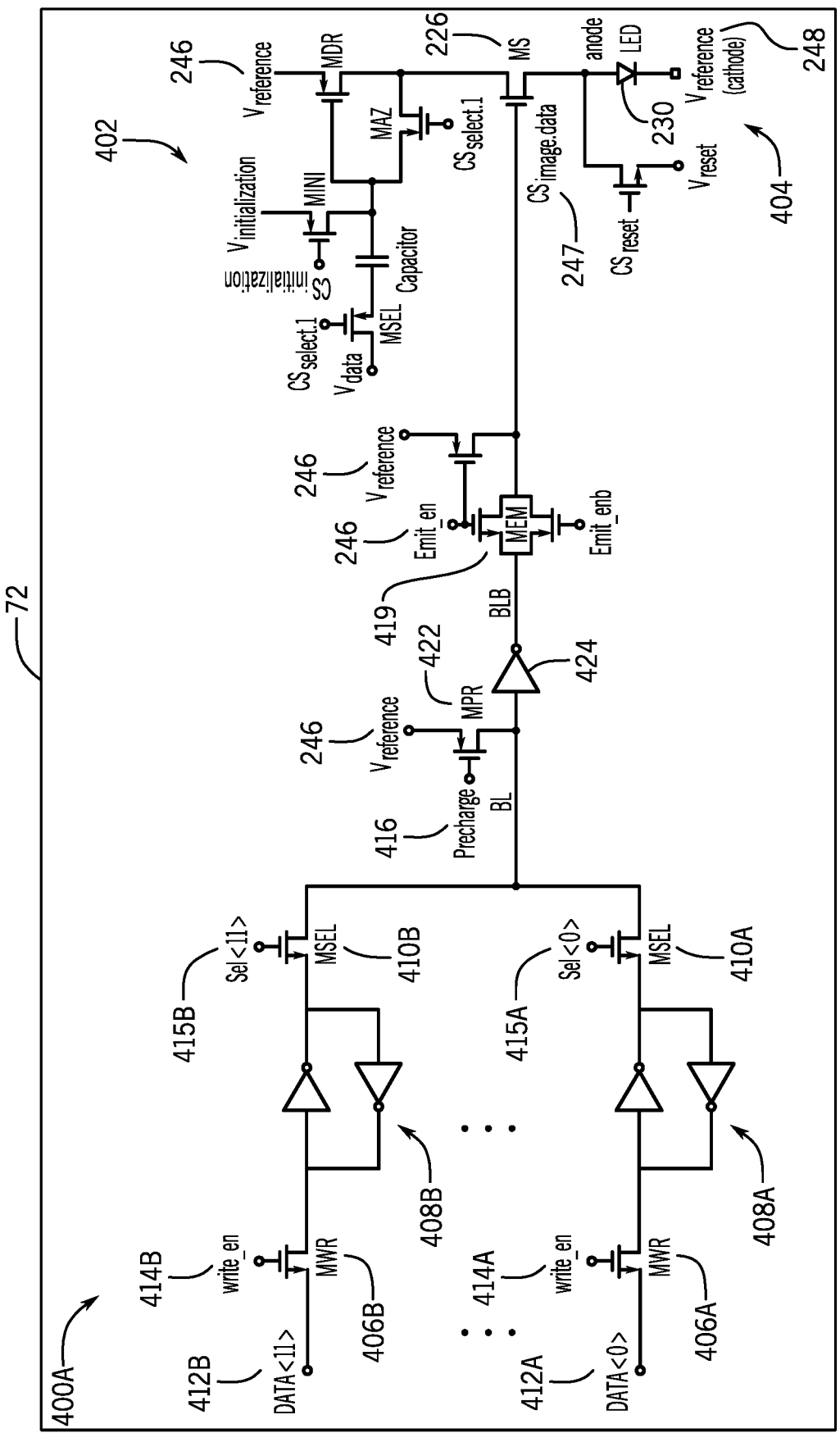
FIG. 17 is a circuit diagram of memory circuitry coupled to the sub-pixel of FIG. 12, in accordance with an embodiment.

To help illustrate the memory circuit that facilitates in controlling emission via an emit-enable signal, a sub-pixel 72 including memory circuitry 400A, analog driver circuitry 402, and light-emitting circuitry 404 is shown in FIG. 17. It should be appreciated that the sub-pixel 72 is intended to be illustrative and not limiting. For example, while the memory circuitry 400A is shown as storing twelve bits of digital data, any suitable memory circuit may be used, such as circuitry to store more than or less than twelve bits of digital data.

The memory circuitry 400A may include write_enabling transistors (MWR) 406, one or more inverter pairs 408, and transmission selection transistors (MSEL) 410. The memory circuitry 400A receives and stores digital data (DATA) 412, for example, from a column driver 62. Prior to the memory circuitry 400A storing the DATA 412, a row driver 60 may enable a write_enabled control signal (write_en) 414 to activate the MWRs 406 to permit writing image data to memory (e.g., inverter pairs 408) so the memory may memorize the image data. Upon receiving the DATA 412, the inverter pair 408 stores the DATA 412 value. It should be emphasized that using the memory circuitry 400A permits parallel transmission of the DATA 412, such that all bits of DATA 412 are stored in the respective inverter pairs 408 at the same time, or in the same write cycle (e.g., when the write_en signal 414 is enabled) in addition to bitwise transmission where each bit of DATA 412 is stored one bit at a time. The MSEL 410 activates in response to an enabled selection control signal (Sel) 415 transmitted by, for example, the row driver 60 which operates to activate the MSEL 410 of the bit of memory targeted to transmit to analog driver circuitry 402. In this way, the MSEL 410A may be activated at the same time that the MSEL 410B is deactivated. Thus, the memory circuitry 400A is loaded with one or more DATA 412 bits before an emission process begins, and the DATA 412 is read bit by bit facilitated by the activation of respective MSEL 410.

At the beginning of an emission process, for example, the emission process as described in FIG. 14, the row driver 60 may enable a precharge control signal (Precharge) 416 as a way to initially enable light emission based at least in part on activation of an emission transistor (MEM) 419. The MEM 419 may activate in response to the row driver 60 enabling of an emission control signal (Emit_en) 420. In some embodiments, the row driver 60 may enable the Precharge signal 416 at the same time as the Emit_en signal 420 to permit the Vreference signal 246 to transmit to a MS 226 to precharge, or boost, the anode of the LED 230 prior to an activation of the MSEL 410. After precharging completes and during the emission process, the Emit_en signal 420 may continue to be enabled by the row driver 60. While row driver 60 disables the Precharge signal 416 after precharging to cause the stored DATA 412 to at least in part control activation of the MEM 419. In this way, stored DATA 412 transmitting from the inverter pair 408 may cause the MEM 419 to activate in response to a logical value of the stored value (e.g., "1" or "0"). It is noted that in some embodiments, the logical high value is equal to the Vreference signal 246, and the logical low value is equal to a Vreference signal 248.

Upon the stored DATA 412 transmitting from the memory circuitry 400A, the light-emitting circuitry 404 receives the stored DATA 412 at the gate of a MS 226. The MS 226 activates in response to the stored DATA 412 value, enabling a current generated by the analog driver circuitry 402 to transmit through to the LED 230 to cause light emission. Emission may continue as long as the stored DATA 412 is applied as a CSimage.data signal 247. In this way, light emits from the sub-pixel 72 following the initialization process, the charging process, the programming process, and the emission process generally described with FIG. 12 through FIG. 14.

Figure 18:
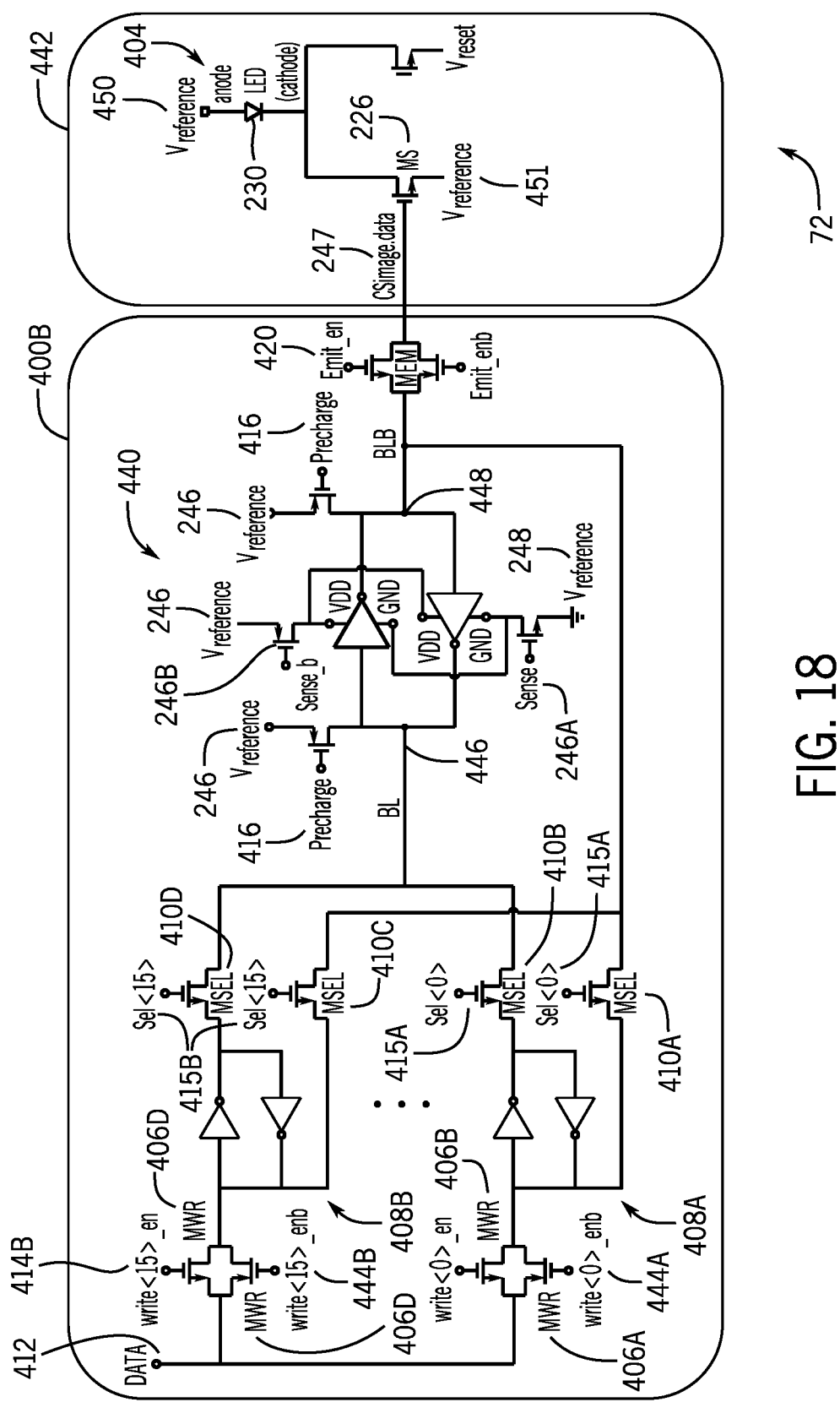
FIG. 18 is a circuit diagram of an embodiment of the memory circuitry of FIG. 17 coupled to an embodiment of a sub-pixel of FIG. 12 implementing a global anode, in accordance with an embodiment.

An additional embodiment of a sub-pixel 72 having memory circuitry 400B and an analog driver circuitry 442 including light-emitting circuitry 404 is shown in FIG. 18. It should be appreciated that the sub-pixel 72 is intended to be illustrative and not limiting. For example, while the memory circuitry 400B is shown as storing sixteen bits of digital data, any suitable memory may be used, such as circuitry to store more than or less than sixteen bits of digital data. In addition, while the sub-pixel 72 is depicted as having a LED 230 included in the light-emitting circuitry 404, any suitable light-emitting circuitry 404 may be combined with described memory-in-pixel techniques.

The memory circuitry 400B is depicted as including one or more write enabling transistors (MWRs) 406, one or more inverter pairs 408, and one or more selection transistors (MSELs) 410. DATA 412 is received into the memory circuitry 400B from, for example, a column driver 62. To transmit DATA 412 into the memory circuitry 400B, a row driver 60 may enable a write_en signal 406 and an inverse of the write_en signal (inverse write_en) 444 to enable bitwise memory storage of the DATA 412. For example, the row driver 60 may enable storage of a last bit of DATA 412 in the inverter pair 408B by activating MWR 406D and/or MWR 406C. Thus, the row driver 60 and the column driver 62 may operate to enable bitwise transmission and storage of DATA 412 into the memory circuitry 400B.

Upon storage of the DATA 412 in the inverter pairs 408, the memory circuitry 400B stores the DATA 412 value until the row driver 60 selects a respective bit for transmission. Prior to selecting the respective bit for transmission, the row driver 60 precharges the sense amplifier 440 via enabling of a precharge (Precharge) signal 416. By precharging the sense amplifier 440 and subsequent analog driver circuitry 442, the sub-pixel's 72 responsiveness to transmitted electrical signals may improve when compared to a sub-pixel 72 not precharged. As described prior, precharging a sub-pixel 72 may make switching states easier and less demanding on circuitry (e.g., by increasing circuitry responsiveness).

Upon completion of precharging, the row driver 60 selects a bit for transmission to the analog driver circuitry 442 to cause emission according to stored DATA 412. To transmit a bit to the analog driver circuitry 442, the row driver may enable a Sel signal 415 to activate MSEL 410 corresponding to an inverter pair 408. For example, the row driver 60 may enable a Sel signal 415A to activate MSEL 410A and MSEL 410B to cause transmission of DATA 412 stored in inverter pair 408A to transmit to the analog driver circuitry 442.

In some embodiments, DATA 412 transmits through a sense amplifier 440 before transmitting to the analog driver circuitry 442. The sense amplifier 440 acts to sense a logical state of the DATA 412 and may amplify the sensed logical state into an interpretable logical state (e.g., by increasing signal amplitude) for adjoining circuitry. The interpretable logical state may be based at least in part on a threshold voltage of MS 226 of the analog driver circuitry 442. For example, a bit transmitted to node 446 outputs as having a larger voltage value at node 448, caused by transmission through the sense amplifier 440 and based at least in part on a voltage difference between a Vreference signal 248 and a Vreference signal 246 representing any suitable voltage value common to a display system (e.g., display system 52).

After DATA 412 is amplified, the amplified DATA 412 transmits to the analog driver circuitry 442 as a CSimage.data signal 247 to activate or deactivate the MS 226. For example, in some embodiments, the MS 226 deactivates in response to transmitted logical high DATA 412 (e.g., transmitted as the CSimage.data signal 247) and activates in response to transmitted logical low DATA 412. In this way, the voltage value of the digital data transmitted as the CSimage.data signal 247 corresponds to a bias voltage of the MS 226, or a voltage value that operates the MS 226 to change state. Upon activation of the MS 226, a driving current, generated by analog driver circuitry 442 based at least in part on a voltage difference between a Vreference signal 450 and a Vreference signal 451, transmits through the LED 230 enabling the sub-pixel 72 to emit light. Thus, in the way described, DATA 412 stored in the memory circuitry 400B may drive light emission from pixel circuitry (e.g., sub-pixels, pixels).

Figure 19:
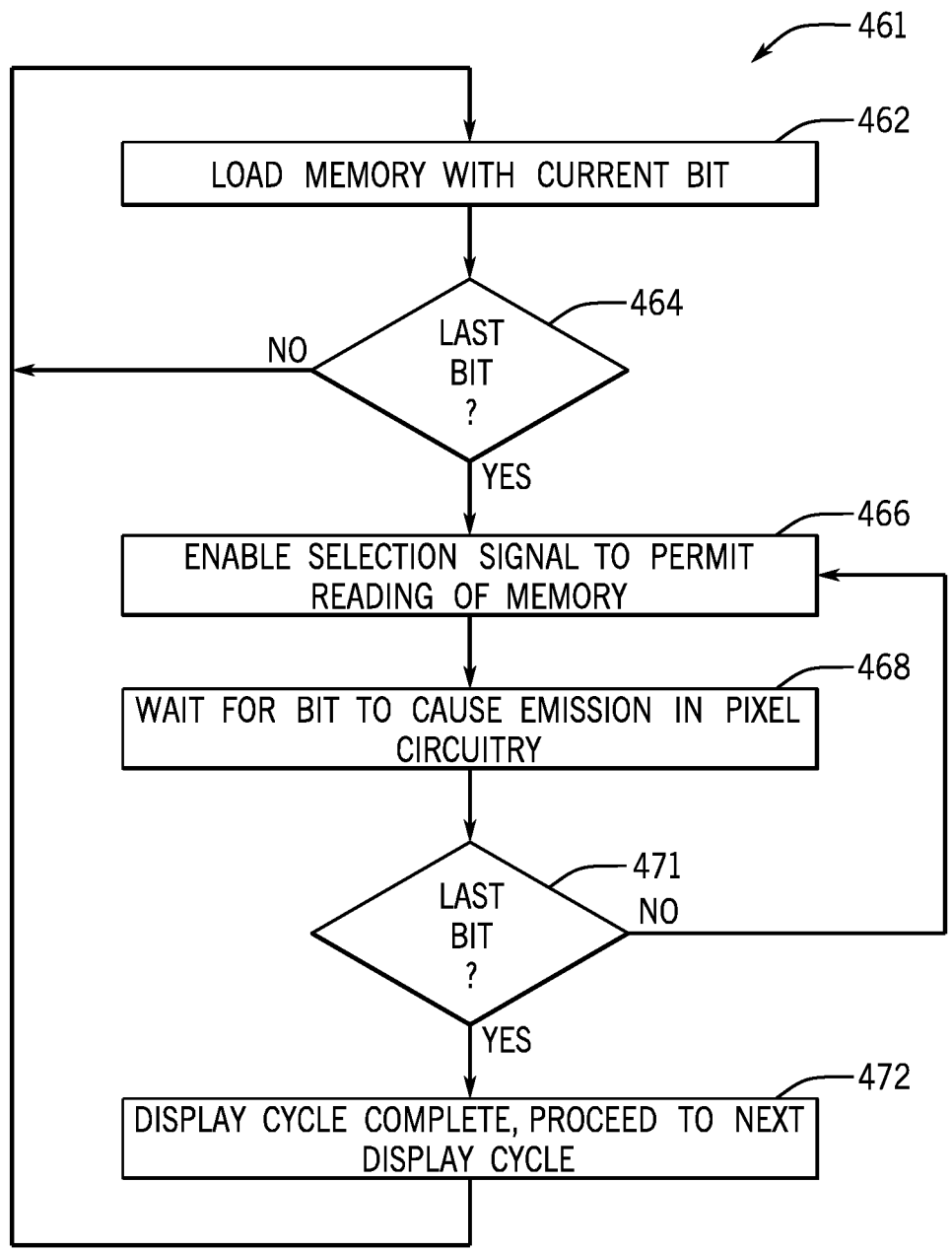
FIG. 19 is a process for operating the sub-pixel of FIG. 18, in accordance with an embodiment.

To summarize operation of the sub-pixel 72 embodiment of FIG. 18 and of FIG. 17, an example of a process 461 for controlling operation of a sub-pixel 72 coupled to memory circuitry 400 is described in FIG. 19. Generally, the process 461 includes loading memory with a current bit (block 462), determining if the current bit is the last bit to be loaded into memory (block 464), in response to the current bit not being the last bit, loading the memory with a next current bit (block 462), and in response to the current bit being the last bit, enabling selection signal to permit reading of a bit from the memory (block 466), waiting for the bit to cause emission in pixel circuitry (block 468), and determining if the bit is a last bit to be read from memory (block 471). In response to the bit being the last bit, completing the display cycle (block 472) and in response to the bit not being the last bit, enabling a next selection signal to permit reading of a next bit from the memory (block 466). In some embodiments, the process 461 may be implemented at least in part by executing instructions stored in a tangible, non-transitory, computer-readable medium, such as one or more storage devices 14, using processing circuitry, such as the processing core complex 12. Additionally or alternatively, the process 461 may be implemented at least in part based on circuit connections formed in display controlling circuitry, such as a row driver 60, a column driver 62, and/or a timing controller 54.

Thus, in some embodiments, a row driver 60 may load memory circuitry 400 with a current bit (block 462). As is described above, the row driver 60 selectively enables a respective switching element, such as MWR 406B or MWR 406D, to enable bitwise loading of the current bit of DATA 412 into the memory circuitry 400. Upon the enabling of MWR 406, a bit corresponding to a current bit of DATA 412 transmits for storage, such as, in an inverter pair 408 where the value of the current bit is continually inverted until the bit is selected for transmission.

After loading the current bit into memory, the row driver 60 may determine if the current bit is a last bit (block 464). The last bit represents a final bit of DATA 412 (e.g., a last bit to be stored in memory circuitry 400). Thus, checking if the current bit is the last bit checks if all of the DATA 412 has transmitted from a column driver 62 for storage. A variety of techniques may be implemented to determine if a current bit is a last bit including, for example, maintaining a separate count to track a current bit position with respect to a final bit position.

In response to the current bit not being the last bit, the row driver 60 may load the memory circuitry 400 with a next current bit (block 462). As described above, the row driver 60 enables a next respective switching element to enable bitwise transmission of a next bit of DATA 412 into memory circuitry 400 as the next current bit. Thus, the process 461 repeats until the last bit of DATA 412 is stored into the memory circuitry 400.

However, in response to the current bit being the last bit, the row driver 60 may enable a selection signal to transmit a bit from the memory (block 466). When the current bit is the last bit, the row driver 60 determines the target data to store in the memory circuitry 400 has completed loading into memory—thus, at this point, the row driver 60 transmits the stored DATA 412 bit-by-bit, or bitwise, to the analog driver circuitry 442 to cause light emission from the sub-pixel 72 at a level, or luminosity, corresponding gray to the DATA 412. In some embodiments, the row driver 60 transmits stored bits in an order from least significant bit to most significant bit, however any suitable order for the memory circuitry 400 and the display system 52 may be used. To cause transmission, the row driver 60 enables a Sel signal 415 corresponding to the target bit from the memory circuitry 400 for reading. Upon the enabling of the Sel signal 415, the target bit transmits to the sense amplifier 440 and/or to the analog driver circuitry 442 to cause light emission.

Next, the row driver 60 may wait a programmed time period for the transmitted bit from memory to cause light to emit from the sub-pixel 72 (block 468). While the row driver 60 waits, the bit stored in the inverter pair 408 transmits to the MS 226. Upon activation of the MS 226, analog driver circuitry 442 permits a driving current to transmit through a LED 230 causing light emission from the sub-pixel 72. As previously described with FIG. 8, a bit-plane clock 106 may act to modulate widths of light emission to correspond to a significance of the bit from memory to the overall perceived gray level. The row driver 60 may use the bit-plane clock 106 to modulate light emission from the sub-pixel 72, for example, through modulating overall emission of the sub-pixel 72 (e.g., via enabling the Emit_en signal 420) and/or through modulating the time period that a bit is selected to transmit from the memory circuitry 400 (e.g., via enabling for a time period corresponding to significance of bit the Sel signal 415 to activate MSEL 410). It is noted that in some embodiments the row driver 60 does not wait and continues to determine if the bit read from the memory circuitry 400 was the last bit of the stored DATA 412.

After reading the bit, the row driver 60 may determine if the bit the last bit of the stored DATA 412 (block 471). The row driver 60 determines if the last bit has been read and/or transmitted to analog driver circuitry 442. A row driver 60 may mange this determination through a variety of ways, for example, maintaining a counter that increments in tandem with enabling of Sel signal 415 to indicate when the row driver 60 has read an expected number of bits from the memory circuitry 400.

If the bit is the last bit, the row driver 60 may complete the display cycle (block 427). The display cycle may include the whole process 461 such that upon reaching block 427, the row driver 60 has emitted the gray level of light corresponding to the DATA 412. Upon completing the display cycle, the row driver 60 may be ready to accept new DATA 412 corresponding to a same or different gray level for emission.

However, in response to the bit not being the last bit, the row driver 60 may enable a next selection signal to permit reading of a next current bit from the memory (block 466). The row driver 60 may manage the enabling of the next selection signal in a variety of ways, for example, maintaining a separate count to track a current transmitted bit position with respect to a final transmitted bit position. In any case, the row driver 60 determines the Sel signal 415 to enable (e.g., the Sel signal 415 corresponding to the bit to be transmitted next from the memory circuitry 400). When the row driver 60 determines which Sel signal 415 to enable, the row driver 60 enables the Sel signal 415 causing activation of a MSEL 410 corresponding to a target bit for transmission. The row driver 60 may repeat transmitting bits of the stored DATA 412 until a last bit is reached. Upon reaching the last bit, the row driver 60 completes the emission cycle and may prepare for a next emission cycle (block 427).

For FIG. 18 and FIG. 19, the sub-pixel 72 embodiments described have analog driver circuitry 442 with a global anode. An additional embodiment of a sub-pixel 72 may have analog driver circuitry 442 with a global cathode.

Figure 20:
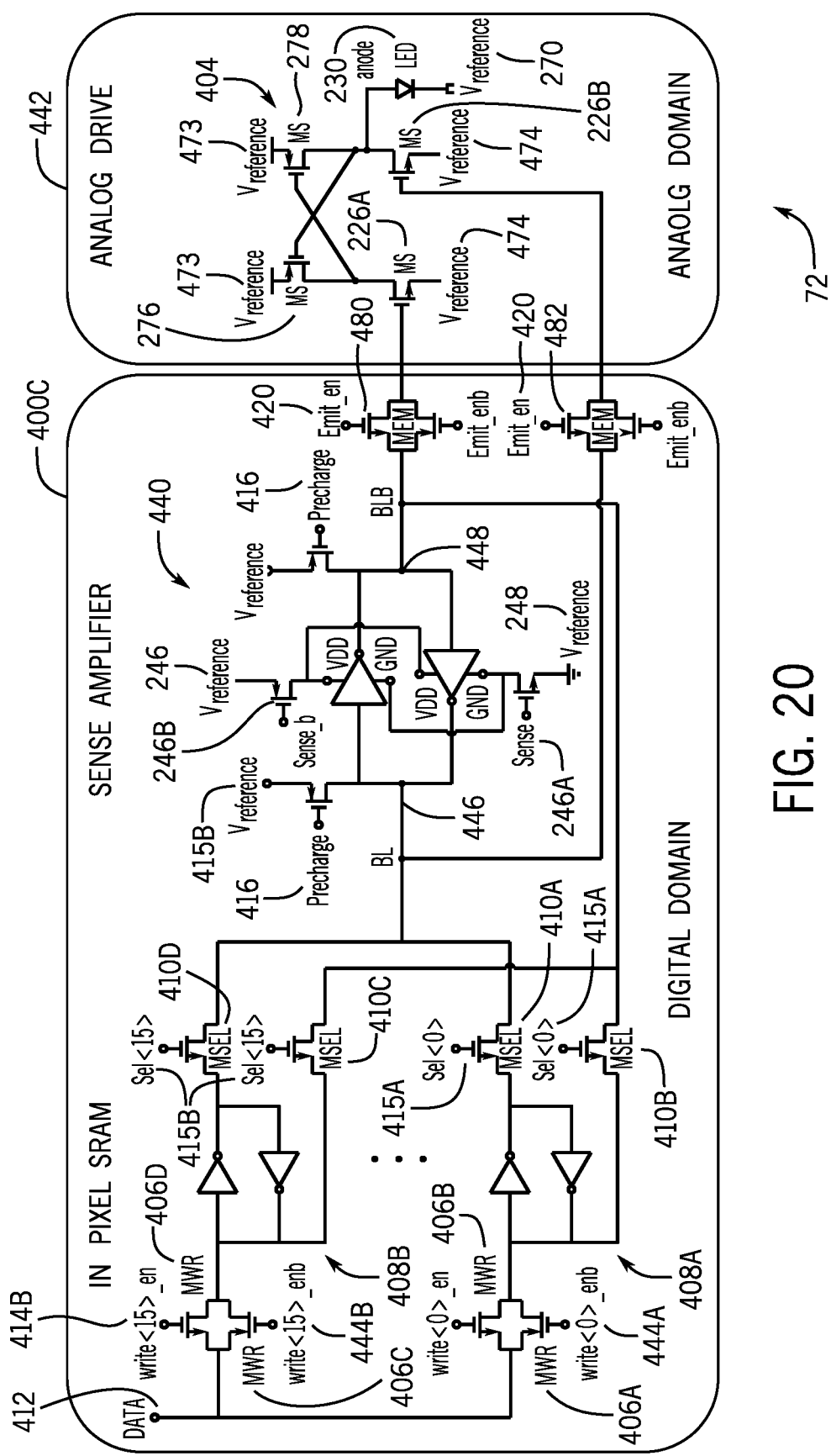
FIG. 20 is a circuit diagram of an embodiment of the sub-pixel of FIG. 18 implementing a global cathode, in accordance with an embodiment.

A sub-pixel having a global cathode including memory circuitry 400C, analog driver circuitry 442 having light-emitting circuitry 404 is shown in FIG. 20. It should be appreciated that the sub-pixel 72 is intended to be illustrative and not limiting. For example, while the memory circuitry 400C is shown as storing sixteen bits of digital data through bitwise transmission of data, any suitable memory circuit may be used, such as circuitry to store more than or less than sixteen bits of digital data and/or circuitry to permit parallel transmission of data.

In the depicted embodiment, the cathode of a LED 230 is coupled to a reference voltage (Vreference) signal 470 and the anode of the LED 230 is coupled to a reference voltage (Vreference) signal 473 through MS 226A, MS 226B, MS 276, and MS 278. As explained earlier, after DATA 412 is stored in the memory circuitry 400C and, in some embodiments, after precharging circuitry via Precharge signals 416, the row driver 60 may enable Emit_en signal 420 to cause light emission. Upon activation of MEM 480 and MEM 482, a stored DATA 412 bit transmits through the sense amplifier 440 and the amplified bit transmits to the MEM 480 while an inverted version of the stored DATA 412 bit transmits to MEM 482 without amplification. The inverted bit and the amplified bit are used as control signals to activate the MS 226A and 226B, effectively acting like the CSimage.data signal 247 from previous discussions. Upon activation of the MS 226A and MS 226B, analog driver circuitry 442 generates a driving current based at least in part on the voltage difference between Vreference signal 473 and Vreference signal 470 to transmit through a LED 230 to cause light emission.

In a similar fashion as the global anode embodiment, the global cathode sub-pixel 72 may create different gray levels through following a binary pulse width modulation scheme. The binary pulse width modulation scheme may use a bit-plane clock in part to control the control signals outputted from the row driver 60. In this way, the Emit_en signal 420 may be enabled for shorter time periods for bits of lesser significance (e.g., least significant bit of DATA 412) on the perceived gray level and may be enabled for longer time periods for bits of greater significance (e.g., most significant bit of DATA 412) on the perceived gray level. In some embodiments, a Sel signal 415 may be modulated to cause light to emit from the sub-pixel 72 according to different gray levels.

Figure 21:
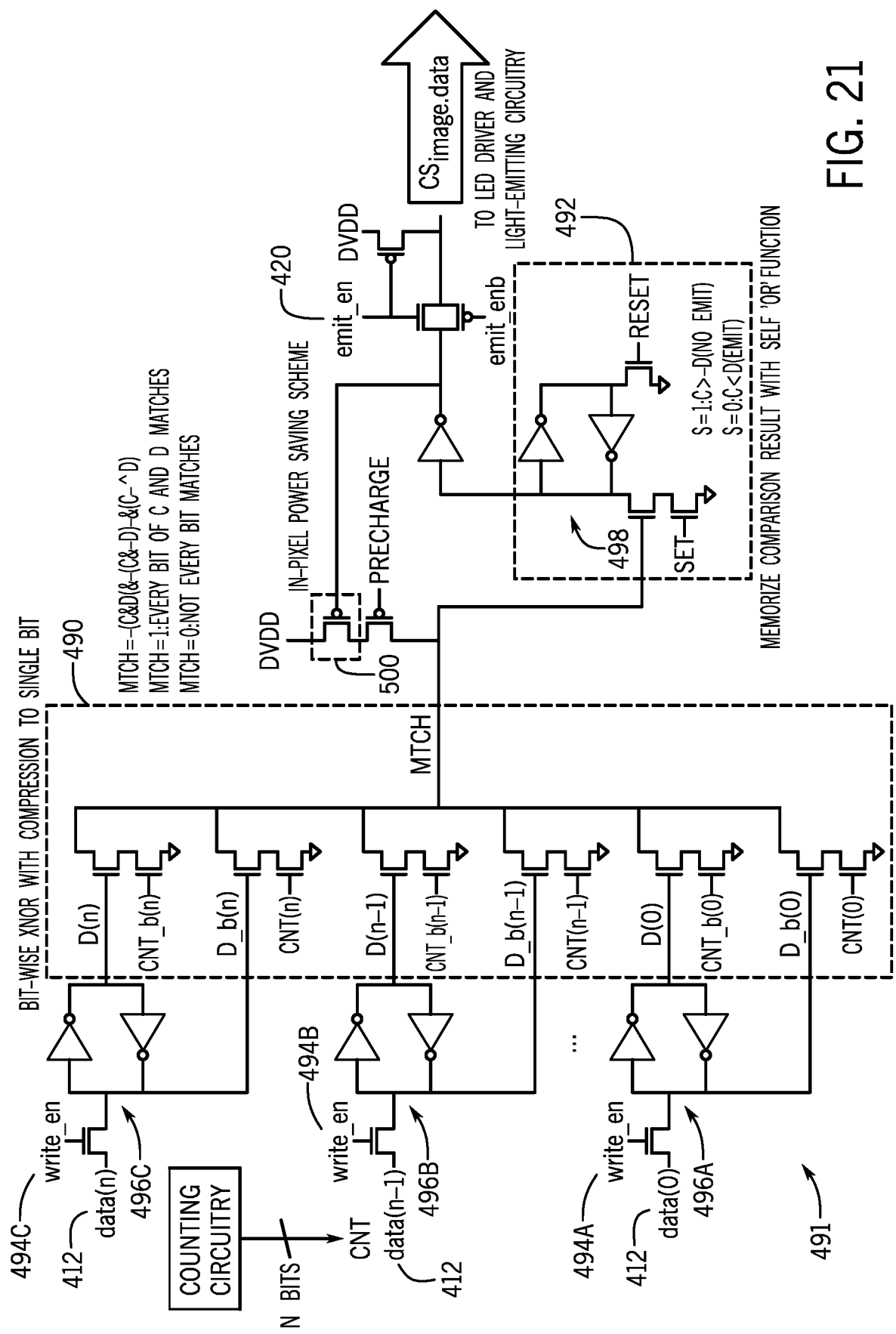
FIG. 21 is a circuit diagram of an embodiment of the memory circuitry of FIG. 13, in accordance with an embodiment.

As described in FIG. 9, using memory-in-pixel techniques and a comparator may enable a row driver to create a single pulse width modulation emission scheme. Accordingly, an embodiment of a sub-pixel 72 including a comparator 490, memory circuitry 491, and memory circuitry 492 is shown in FIG. 21. It should be appreciated that the sub-pixel 72 is intended to be illustrative and not limiting. For example, while the memory circuitry 492 is shown as being coupled to LED driver circuitry and to light-emitting circuitry of the sub-pixel 72, the memory circuitry 492 may couple to any suitable light-emitting circuitry and/or driving circuitry.

In the depicted sub-pixel 72, DATA 412 of size n bits is received into the memory circuitry 491 following a similar process as described earlier, that is, a row driver 60 operates to enable a write_en signal 494 to cause transmission of DATA 412 into the inverter pairs 496. In some embodiments, the row driver 60 operates in tandem with a column driver 62 to cause parallel transmission of all bits associated with DATA 412 into the inverter pairs 496 by enabling write_en signals 494 at the same time. Additionally or alternatively, the row driver 60 may cause bitwise transmission of bits associated with DATA 412 through selectively enabling write_en signals 494, for example, loading a bit into inverter pair 496A by selectively enabling write_en signal 494A to cause transmission of the first bit of DATA 412.

Once DATA 412 is stored in the inverter pairs 496, the comparator 490 uses stored DATA 412 bits and bits transmitted from counting circuitry (e.g., counter 130) to perform a comparison between the two sets of bits. As a reminder, in the single pulse width modulation emission scheme, counting circuitry, like the counter 130, increments up to a maximum gray level on the rising edge of a clocking signal, like a gray level clock 134, where light emission occurs from the sub-pixel 72 until the counting circuitry counts up to a number equaling and/or exceeding a number represented by stored DATA 412. In this way, the comparator 490 performs a compression of all of the bits of DATA 412 into a single bit indicative of if the DATA 412 is the same as the count transmitted from counting circuitry. Thus, the comparator 490 performs a bitwise XNOR compression to a single bit having an embodiment of memory circuitry 491 and memory circuitry 492, where an output from the comparator 490 is a logical low (e.g., "0") value unless every bit matches. If every bit matches, the comparator 490 outputs a logical high value. The output from the comparator 490 is stored in memory circuitry 492, where the value is retained in the inverter pair 498 until the row driver 60 enables an emit_en signal 420 to cause emission of the stored comparator 490 output to the LED driver and light-emitting circuitry to drive light emission as previously described. It is noted that CNT_b[n:0] corresponds to an inverse of the CNT[n:0] and is used to compare an inverted output from inverter pairs 496 to an inverted bit of CNT[n:0].

It should be appreciated that in some embodiments counting circuitry may decrement, a comparator 490 may output a logical low value if every bit matches, or any combination thereof. In other words, a variety of valid embodiments may apply described memory-in-pixel techniques. Furthermore, an optional transistor 500 may be included in a sub-pixel 72 to provide power-saving benefits from precharging a common output (e.g., MTCH) node of the comparator 490 thereby making the circuitry more responsive to changes in the output from the comparator 490.

Figure 22:
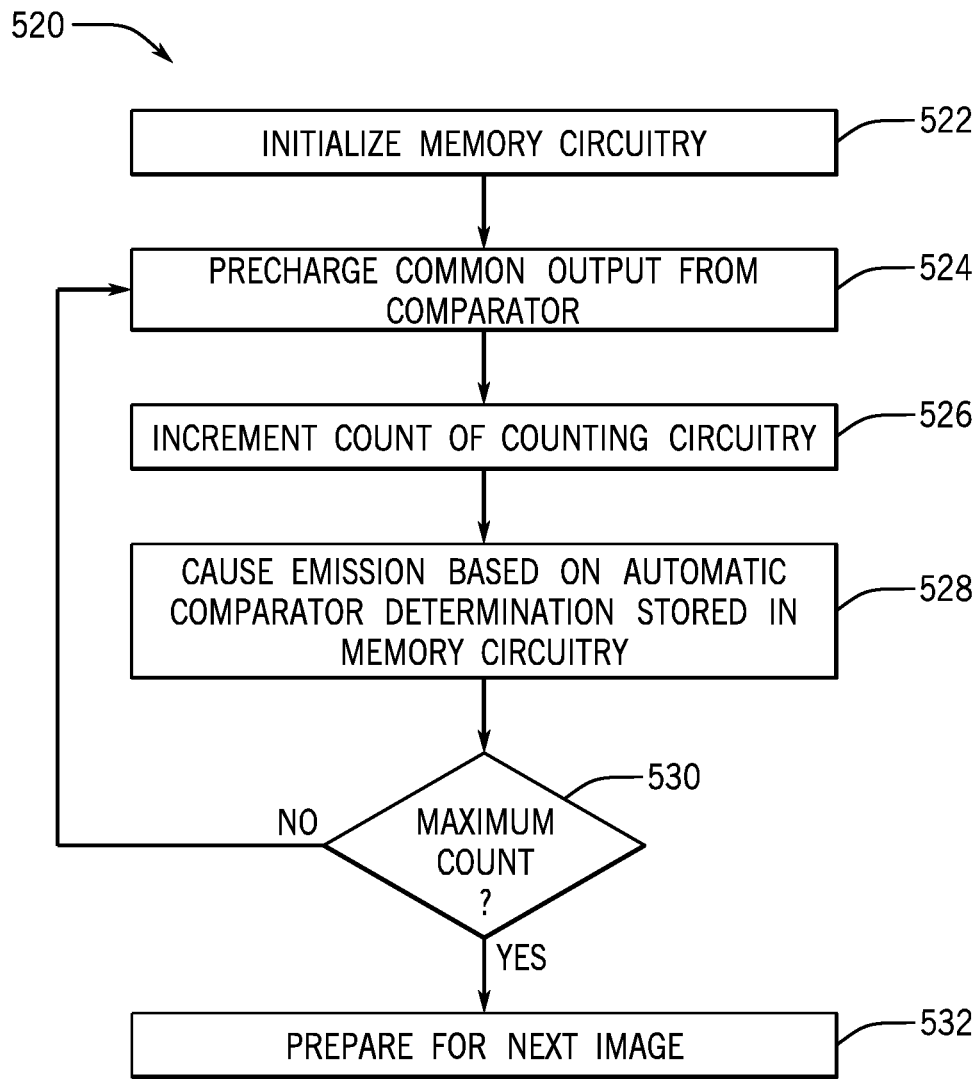
FIG. 22 is a process for operating the memory circuitry of FIG. 21, in accordance with an embodiment.

To elaborate on operation of the sub-pixel 72 depicted in FIG. 21, a process 520 for operating a sub-pixel 72 having a comparator 490 and memory circuitry 491 is described in FIG. 22. Generally, the process 520 includes initializing memory circuitry (block 522), precharging common output from comparator (block 524), incrementing count of counting circuitry (block 526), causing emission based on automatic comparator determination stored in memory circuitry (block 528), determining if counting circuitry has reached a maximum count (block 530). In response to the counting circuitry reaching the maximum count, preparing for next image (block 532), and in response to the counting circuitry not reaching the maximum count, precharging the common output from the comparator (block 524). In some embodiments, the process 520 may be performed at least in part by executing instructions stored in a tangible, non-transitory, computer-readable medium, such as one or more storage devices 14, using processing circuitry, such as processing core complex 12. Additionally or alternatively, the process 461 may be implemented at least in part based on circuit connections formed in display controlling circuitry, such as a row driver 60, a column driver 62, and/or a timing controller 54.

Thus, in some embodiments, a row driver 60 may initialize memory circuitry 492 (block 522). To initialize the memory circuitry 492, the row driver 60 may enable a control signal to force a node of the memory circuitry 492 to a low voltage value. Taking FIG. 21 for example, to initialize the memory circuitry 492, a row driver may enable an S reset (S_rst) signal to reset a voltage value of a node (e.g., S node) of the memory circuitry 492. Initializing the node of the memory circuitry 492 enables the light-emitting circuitry to emit until the comparator outputs a logical high to stop light emission from the sub-pixel 72 (e.g., in response to the gray level stored in memory being reached by the counting circuitry). In other words, for one or more sub-pixels 72 implementing a comparator 490, sub-pixels 72 may start light emission together at the same time but stop light emission at different times—where the respective duration of light emission corresponds to a target gray level for the respective sub-pixel 72.

The row driver 60 may precharge a comparator 490 after initializing the memory circuitry 492 (block 524). To precharge the comparator 490, the row driver 60 may enable a precharge signal to cause a voltage to boost the circuitry, thus enabling the sub-pixel 72 to be more responsive to changes in output from the comparator 490. To precharge the comparator 490, the row driver 60 may enable a "Precharge" signal that works in conjunction with an inverse emit_en signal 420 to cause a voltage (e.g., DVDD) to transmit through to the comparator 490 (e.g., the MTCH node of the comparator 490) to boost the circuitry. Although specific circuitry is depicted that operates to precharge the comparator 490 in response to the Precharge signal, it should be appreciated that a variety of valid circuitry arrangements may be used to facilitate precharging the comparator 490.

After precharging the comparator 490, the row driver 60 may increment a count of counting circuitry (block 526). The row driver 60 may increment counting circuitry, for example, in response to a clocking signal timing the incrementing. After incrementing the counting circuitry, the sub-pixel 72 automatically determines if the count of the counting circuitry equals or exceeds a value represented by the stored DATA 412. This occurs because the individual bits of the count and the individual bits of the DATA 412 are respectively transmitted to the comparator 490, where the comparator 490 outputs a logical high value if all of the bits match or a logical low value if even one bit does not match. The comparator 490 output transmits for storage, or memorization, in inverter pair 498 of the memory circuitry 492, where the value is stored until the row driver 60 enables emission via enabling of emit_en signal 420.

After incrementing the count of counting circuitry, the row driver 60 causes emission based on the output from the comparator 490 determination stored in the memory circuitry 492 (block 528). The row driver 60 causes emission through enabling the emit_en signal 420. As described earlier, upon the enabling of emit_en 420, the value transmits from the inverter pair 498 to the LED driver and light-emitting circuitry of the sub-pixel to cause light emission, for example, from a LED 230 or any suitable light-emitting circuitry. The value transmitted from the memory circuitry 492 may activate or deactivate switching circuitry of the LED driver and light-emitting circuitry responsible for causing light emission.

Upon the row driver 60 causing emission based on the output from the comparator 490, the row driver may determine if the count of the counting circuitry is a maximum count (block 530). Counting circuitry may count from a minimum to a maximum value, for example, from 0 to 255. Thus, when a maximum value, or a maximum count, is reached by counting circuitry, the row driver 60 may perform certain processing steps to restart the count.

In response to the maximum count not being reached, the row driver 60 restart the process 520 by precharging the common output from the comparator 490 (block 524). Thus, from there, the process 520 continues as described to cause the row driver 60 to transmit another output from the comparator 490 indicative of if the stored DATA 412 equals or exceeds a count represented by the counting circuitry.

However, in response to the maximum count being reached, the row driver 60 prepares for the next image (block 532). To do this, the row driver 60 prepares to receive new DATA 412 corresponding to the target gray level of the sub-pixel 72 used to communicate a next image. Different embodiments of sub-pixels 72 may prepare in varying ways. For example, the sub-pixel 72 from FIG. 21, may enable one or more write_en signals 494 to facilitate in loading of new DATA 412 into the memory circuitry 491. In some embodiments, preparing for a next image includes restarting a count of the counting circuitry such that at block 526 the counting circuitry increments to zero and the counting may restart. It should be appreciated that in embodiments where counting circuitry is a series of flip-flops coupled together to form a counter, such as the counter 130, restarting the counting circuitry to zero is unnecessary as the counting circuitry automatically restarts itself to zero based on the digital logic properties of the circuitry.

Several emission schemes, such as binary pulse width modulation and single pulse width modulation, have been described with respect to general theory of operation, specific example memory circuitry, and specific example pixel circuitry to enable use of the emission scheme to generate a perceived gray level of light emitted from a sub-pixel. An additional emission scheme may be performed by using memory-in-pixels techniques—a binary pulse width modulation reordering emission scheme.

Figure 23:
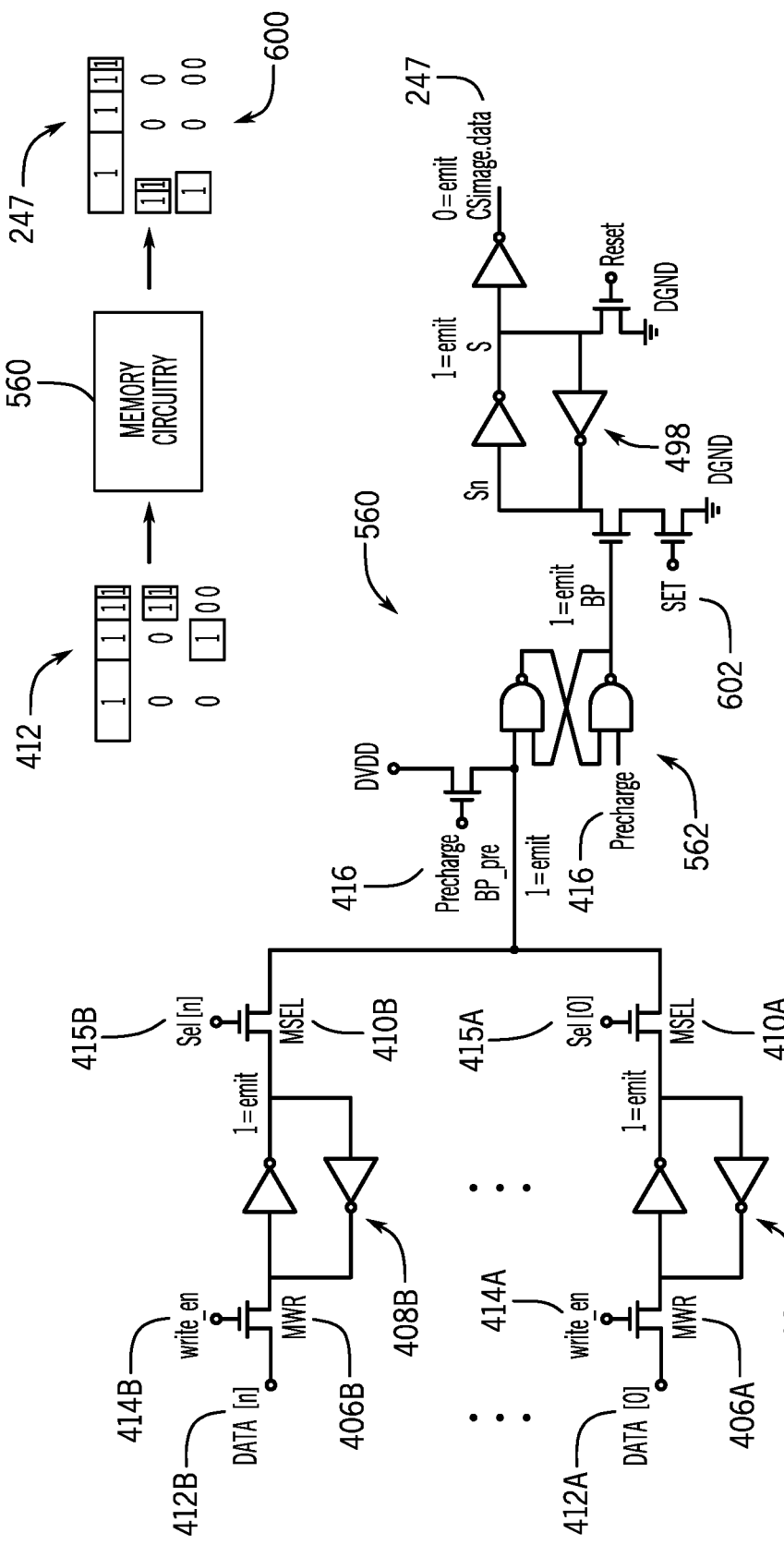
FIG. 23 is a circuit diagram of an embodiment of the memory circuitry of FIG. 13, in accordance with an embodiment.

To help illustrate, memory circuitry 560 having one or more MWRs 406, one or more MSELs 410, inverter pairs 408, inverter pair 498, and a switch/reset (SR) latch 562 is shown in FIG. 23. A row driver 60 may work in cooperation with a column driver 62 to provide DATA 412 to the memory circuitry 560 for storage prior to transmission to a light-emitting portion of a pixel as a CSimage.data signal 247, for example, by enabling control signals to permit the column driver 62 to store DATA 412 in memory circuitry 560.

Generally, a row driver 60 may operate the memory circuitry 560 to emit multiple bits of data from memory at the same time to the same node, for example, node BP_pre. In this way, the row driver 60 may modulate emission times to rearrange bit order represented by DATA 412. For example, if DATA 412 equals 0010, the row driver 60 may operate the memory circuitry 560 to cause emission to follow 1-0-0-0 such that the emission time for the "1" occurs first and is not emitted after the time period corresponding to "00." This rearranging may improve appearances of visual artifacts on an electronic display 18 while still causing the same gray level as "0010" to emit from the sub-pixel.

Elaborating further on the reordering associated with the binary pulse width modulation reordering emission scheme, FIG. 24A shows a bit-plane graph 580, FIG. 24B shows an error graph 588, FIG. 24C shows a bit-plane graph 582, FIG. 24D shows an error graph 590, FIG. 24E shows a bit-plane graph 584, FIG. 24F shows an error graph 592, FIG. 24G shows a bit-plane graph 586, and FIG. 24H shows an error graph 594, where FIG. 24 as a whole illustrates the effects reordering on total error. FIG. 24A-FIG. 24H represent simulated performance of an electronic display 18 implementing the binary pulse width modulation emission scheme with and without reordering for a six-bit binary number representing a target gray level for a sub-pixel and/or a pixel.

The bit-plane graph 580 shows an original sequence of the binary pulse width modulation emission scheme without any reordering for gray levels represented by six bits, where for all the bit-plane graphs 580, 582, 584, and 586 have a light portion 595 corresponding to light emission and a dark portion 596 corresponding to no light emission. The bit-plane graph 580 is caused by a row driver 60 operating a sub-pixel 72 to emit light via binary pulse width modulation (e.g., LED 230 is driven to emit light in response to binary representations of least to most significant bits without reordering, such that 0101 emits light following 1-0-1-0). Each square of a bit-plane graph shows a relative significance of a particular bit in a particular position shown in terms of a bit-plane used to cause a particular gray level ranging from a minimum gray level 598 (corresponding to an all dark portion 596 for all bit-plane values) to a maximum gray level 599 (corresponding to an all light portion 595 for all bit-plane values). For example, block 597, representing a most significant bit of bit-plane graph 580, is a logical high for gray levels from 32 to 64, and is a logical low for gray levels from 0 to 32. This is consistent with six-bit binary representations of those decimal values. Further, all bit planes are logical low and the gray level of 0 and all are logical high at the gray level of 64. These binary states correspond to the numerical representations of the gray level in binary, for example, to make a gray level of 0, one expects that all bit-planes are logical low, or 000000. Thus, bit-plane graphs may visually represent a relative importance of a bit to representing gray levels (e.g., in bit-plane graph 580, the state of the sixth bit changes the gray level value in a more dramatic way than a first, or least significant, bit).

When sub-pixels 72 are operated to emit light following a binary pulse width modulation emission scheme without reordering, total error counts are high (e.g., 322) as shown in bit-plane graph 580 and error graph 588. It may be desired to lower the total error counts through reordering because errors manifest on an electronic screen of an electronic display 18 as, for example, dynamic false contouring, color breakup, and/or flickering of light emitted from one or more pixel.

As reordering occurs and as the most significant bits are reordered to emit first to cause gray levels of the bit-plane graphs, as seen with bit-plane graph 582 and bit-plane graph 584, the bit-plane pattern trends towards looking like the ideal bit-plane shown in bit-plane graph 586. In addition, error decreases as reordering occurs as shown with error graph 588, error graph 590, error graph 592, and error graph 594. Perceived image quality may improve from decreasing error counts via the reordering of the bit-planes. The ideal case (e.g., bit-plane graph 586) shows how the bit-plane graph 586 trends to a gradual bit-plane change as gray level increases and how the total error trends to a number of total states represented by the bit-plane (e.g., 6 bits corresponds to 64 total states, following the relationship: number of states=$2^n$, where n is the number of bits) through increasing a number of reorderings.

Referring back to FIG. 23 to elaborate on how a row driver 60 operates memory circuitry 560 to perform a binary pulse width modulation reordering emission scheme, the row driver 60 enables and/or disables control signals to coordinate transmission of reordered DATA 412 from memory circuitry 560. For example, the row driver 60 may selectively enable and/or disable Sel signals 415 to transmit respective bits from inverter pairs 408. In some embodiments, the row driver 60 may selectively enable and/or disable the Sel signals 415 in response to a bit-plane clock 106 that defines emission periods for the bit positions of DATA 412.

At a high level and for the case of ideal reordering, the row driver 60 may operate the memory circuitry 560 to transmit DATA 412 in an order of most significant bit to least significant bit as the CSimage.data signal 247 to cause light emission from the sub-pixel 72, unless a bit of DATA 412 is a logical low. If a DATA 412 bit is a logical low, the row driver 60 effectively operates the memory circuitry 560 to skip the logical low emission period and to emit light according to a next logical high emission period. Upon transmission of all logical high bits represented in DATA 412, the row driver 60 pauses for an equivalent duration to the total emission period of the logical lows, or in some embodiments, proceeds to process new DATA 412 for emission. For example, referring to emission reordering example 600, if DATA 412 equals 1111, CSimage.data signal 247 transmits from memory circuitry 560 as "1111" having the same total emission period as "1111," while if DATA 412 equals "0011," transmitted CSimage.data signal 247 from memory circuitry 560 equals "1100" with respective bits having the same emission period as "0011," and if DATA 412 equals "0100," the data is recorded into "1000" for transmission as CSimage.data signal 247. Ultimately, a single pulse width of light emission is created from data corresponding to a binary pulse width modulation emission scheme.

During reordering, the row driver 60 may operate the memory circuitry 560 to either emit a bit or to ignore a bit if the stored bit in memory is zero. The row driver 60 may operate in several different operational modes based on the number of reorderings the row driver 60 is to perform. For example, in the case of one reordering, the row driver 60 may have two operational modes while in the case of three reorderings, the row driver 60 may have eight operational modes.

The row driver 60 may determine which operational mode to operate in based at least in part on a comparison of a current emission time to a quadrant time. The row driver 60 may compare a current time to predefined time frames defining the operational mode (e.g., a first operational mode corresponds to a first length of emission). These different operational modes may define how the row driver 60 is to prioritize image data to cause emission. For example, for a one reordering example, a row driver 60 in a first operational mode may permit light emission according to the bit-plane (e.g., bit-plane meaning how a pixel is normally operated to emit light in response to binary states of image data used to operate the switch 104) if a first most significant bit equals the binary state "0," however if the first most significant bit equals the binary state "1," the row driver 60 may permit light emission regardless of the light emission defined by the bit-plane to cause reordering of the bit-plane to occur.

For each operational mode, regardless of the number of reorderings, the row driver 60 may perform similar control actions. The row driver 60 in each operational mode operates to iterate through each bit of DATA 412 starting with the least significant bit (e.g., DATA[0] 412A) and proceeding to the bit prior to the most significant bit corresponding to the number of reorderings (e.g., DATA[n−1] 412 for one reordering, DATA[n−2] 412 for two reorderings). For each iteration, starting with DATA[0], the row driver 60 resets the S node, precharges the memory circuitry 560, enables the Sel signal 415B permitting transmission of the DATA[n] 412B bit to SR latch 562, and enables the Sel signal 415 corresponding to a current iteration of the least significant bit, such that either the most significant bit or the current iteration of the least significant bit transmits as CSimage.data signal 247.

A row driver 60 may operate memory circuitry 560 differently based on the operational mode. For example, if the row driver 60 operates in the first operational mode, the row driver 60 additionally precharges the memory circuitry 560 between enabling of the Sel signal 415B permitting transmission of the DATA[n] 412B bit to SR latch 562, and enables the Sel signal 415 corresponding to a current iteration of the least significant bit. Additionally or alternatively, for operational modes other than the first operational mode, the row driver enables the Sel signal 415B, enables other Sel signals 415 corresponding to a number of most significant bits equal to the number of reorderings (e.g., Sel signals 415 for DATA[n] 412B and for DATA[n−1] 412 for two reorderings, Sel signals 415 for DATA[n] 412B, DATA[n−1] 412, and DATA[n−2] 412 for three reorderings), and ends by enabling the Sel signal 415 corresponding to a current iteration of the least significant bit (e.g., DATA[0] 412A for first iteration, DATA[1] 412 for second iteration, DATA[2] 412 for third iteration).

Thus, for an example of two reorderings, the row driver 60 may operate in four different operational modes for stored DATA 412 having six bits. For the first operational mode (e.g., corresponds to a first quarter of gray level values between zero and the gray level threshold, 16), the row driver 60 may reset the S node, precharge (e.g., enable Precharge signal 416), enable Sel[6] 415 and enable SET signal 602, precharge, enable Sel[5] 415 and enable SET signal 602, precharge, and enable the Sel[n] 415 (e.g., for a first iteration, n=0, Sel[0] 415A is enabled) in addition to the SET signal for each bit of DATA 412, incrementing the value of n from zero each iteration until reaching DATA[4] 412. For the second operational mode (e.g., corresponds to a second quarter of gray level values between gray level threshold, 16, and two times the gray level threshold, 32), the row driver 60 may reset the S node, precharge, enable Sel[6] 415B and enable SET signal 602, precharge, enable Sel[5] 415, and enable the Sel[n] 415 in addition to the SET signal for each bit of DATA 412, incrementing the value of n from zero each iteration until reaching DATA[4] 412. For the third operational mode (e.g., corresponds to a third quarter of gray level values between two times the gray level threshold, 32, and three times the gray level threshold, 48), the row driver 60 may reset the S node, precharge, enable Sel[6] 415B, enable Sel[5] 415 and enable SET signal 602, precharge, enable Sel[6] 415B, and enable the Sel[n] 415 in addition to the SET signal for each bit of DATA 412, incrementing the value of n from zero each iteration until reaching DATA[4] 412. For the fourth operational mode (e.g., corresponds to a fourth quarter of gray level values between three times gray level threshold, 48, and four times the gray level threshold, 64), the row driver 60 may reset the S node, precharge, enable Sel[6] 415B, enable Sel[5] 415, and enable the Sel[n] 415 in addition to the SET signal for each bit of DATA 412, incrementing the value of n from zero each iteration until reaching DATA[4] 412.

To explain differently, FIG. 25 includes a bit-plane graph 604 representative of a binary pulse width modulation emission scheme with two reorderings implemented with three color channels. As depicted, the bit-plane graph 582, which corresponds to the two reorderings, is represented in the bit-plane graph 604 over time and with three color channels of one pixel 70. The row driver 60 may time emissions in terms of quadrants, where, for a two-reordering case, one quadrant 606 may approximately correspond to one-fourth of emission time (e.g., ½", where n is equal to the number of reorderings). These quadrants 606 may parallel the previously described operational modes. As the time increases, the electronic display 18 may change emission priority—in other words, higher emission priority may be given to the two most significant bits of image data for a particular pixel 70 during emission than is given to the other bits. The electronic display 18, in some embodiments, may manage emission based on a comparison of the most significant bits to a value represented by a counter, incrementing up from binary state "00" to binary state "11" on an edge (e.g., rising or falling edge) a clocking signal (e.g., where one period of the clocking signal corresponds to the duration of one quadrant). Thus, in these embodiments, in terms of the sub-pixels 72 of the pixel 70, for the first quadrant 606A, if the two most significant bits (MSBs) equal binary state "00," the sub-pixel 72 may emit according to the bit-plane 608 (e.g., according to binary data as stored in memory 78 represented by the, but if the two most significant bits equal binary states "11," "01," and/or "10," the sub-pixel emits light for the duration of the channel's emission period (e.g., a first color channel corresponds to time duration 609) of the first quadrant 606, as generally summarized in output logic outline 610.

To summarize the other three quadrants, the sub-pixel 72, while operating in a second quadrant 606B, emits light according to the bit-plane 608 if the two most significant bits equal binary state "01," emits light if the two most significant bits equal binary state "10" and/or "11," and does not emit light if the two most significant bits equal binary state "00." While operating in a third quadrant 606C, the sub-pixel 72 emits light according to the bit-plane 608 if the most significant bits equal binary state "10," emits light if the two most significant bits equals "11," and does not emit light if the two most significant bits equal "00," and/or "01." Additionally, while operating in a fourth quadrant 606D, the sub-pixel 72 emits light according to the bit-plane 608 if the two most significant bits equal binary state "11," and does not emit light if the two most significant bits equal "00," "01," and/or "10." Thus, in this way, the sub-pixel 72 is operated to reorder light emission corresponding the two most significant bits such that the light emission of the two most significant bits occurs before light emission according to the bit-plane 608.

Figure 26:
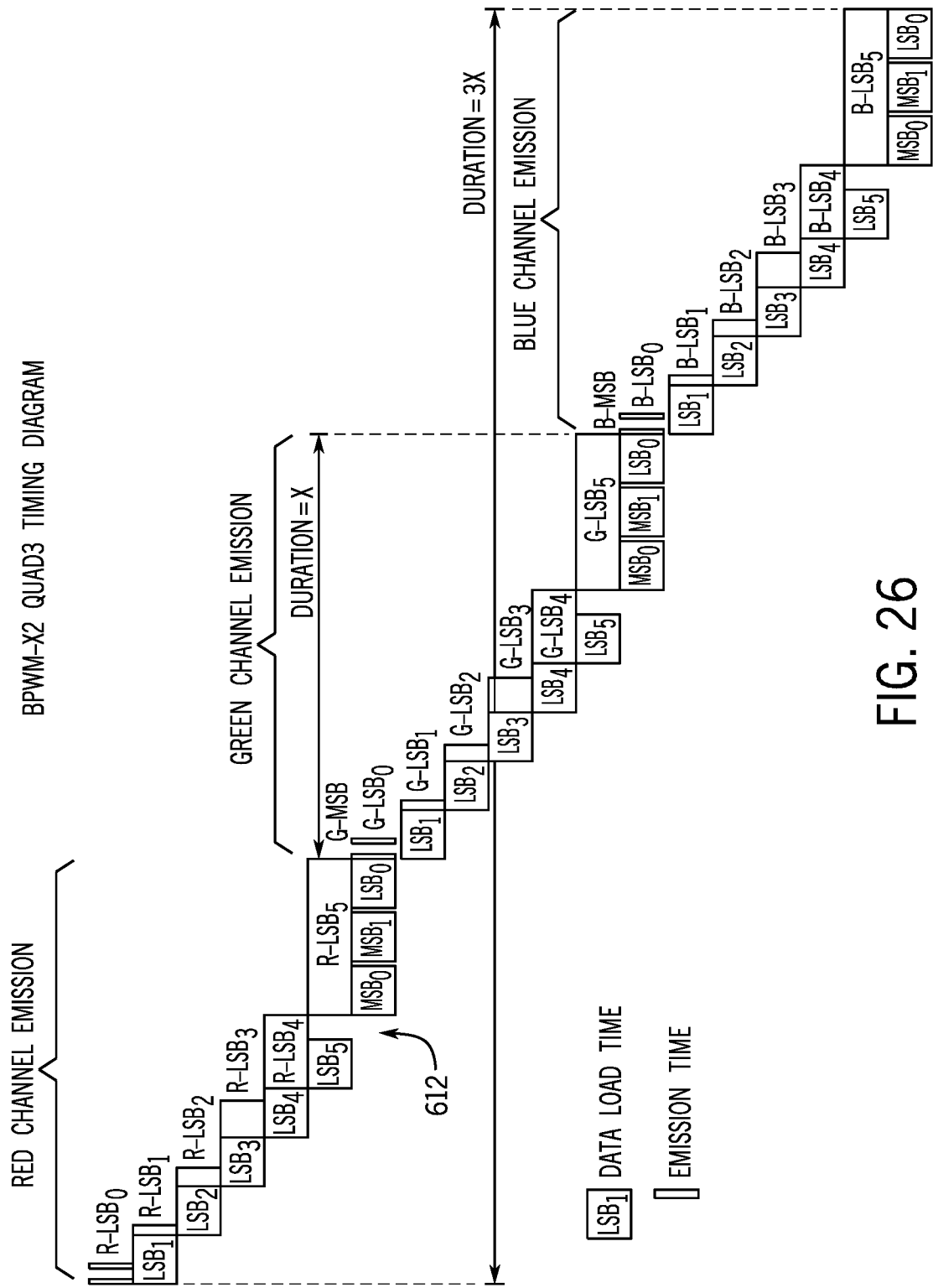
FIG. 26 is a timing diagram illustrating a loading and emission process associated with a third quadrant of the bit-plane graph of FIG. 25, in accordance with an embodiment.

To help provide content, FIG. 26 depicts timing diagram of the binary pulse width modulation emission scheme with two reorderings implemented with the three color channels. This timing diagram shows the relationship between the loading of digital data into the memory 78 that occurs substantially simultaneously to other actions performed by the row driver 60. For example, data loading of the green channel's most significant bits occurs at a time 612 of the emission of the red channel's least significant bit. Comparing FIG. 26 to FIG. 25, just as was described for the fourth quadrant 606D, the row driver 60 permits the sub-pixel 72 to emit light according to the bit-plane represented by data stored in and transmitted from the memory 78. As is indicated on the timing diagram, the total emission period for all three color channels is approximately equal to three time times the channel-specific emission period.

Figure 27:
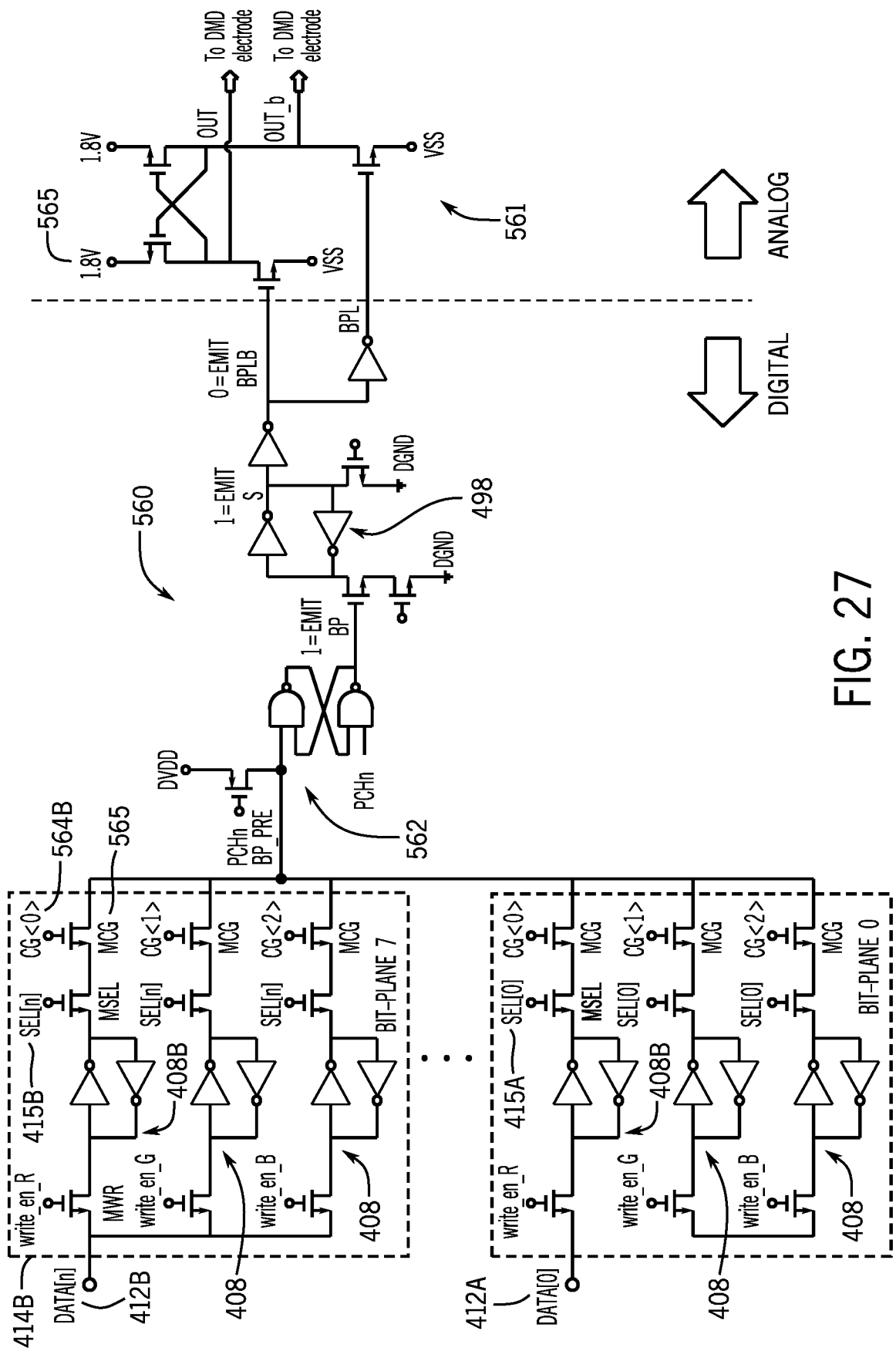
FIG. 27 is a circuit diagram of an embodiment of the memory circuitry of FIG. 23 implemented for use in a digital mirror display, in accordance with an embodiment.

An example embodiment of a pixel operated by a row driver 60 to follow a binary pulse width modulation reordering emission scheme including memory circuitry 560, MWRs 406, MSELs 410, inverter pairs 408, inverter pair 498, a SR latch 562 coupled to analog driver circuitry 561 is shown in FIG. 27. This figure is meant to be example and not limiting, for example, a variety of pixel circuitry and analog driving circuitry may be used in conjunction with memory circuitry 560 and memory-in-pixel techniques.

FIG. 27 shows an example of memory circuitry 560 as applied to a digital mirror display (DMD).

Generally, the depicted memory circuitry 560 operates to receive DATA 412 corresponding to a target gray level for a color channel of the pixel 70 corresponding to the memory circuitry 560. As illustrated, the memory circuitry 560 includes different color groups of memory for each color channel. In this embodiment, the pixel 70 has memory circuitry for each color channel instead of unique sub-pixels 72 for each color channel (e.g., R-G-B). A row driver 60 may operate the color channels via enabling a color group (CG) signal 564. Upon activation of a CG transistor (MCG) 565, stored DATA 412 transmits towards the analog driver circuitry 561. The row driver 60 may permit one color channel to transmit at a time. Thus, the depicted memory circuitry 560 facilitates color sequential output from individual memory circuitry to shared output circuitry coupled to a DMD electrode.

A row driver 60 may operate the depicted memory circuitry 560 similar to memory circuitry 560 of FIG. 23. Thus, for an example of two reorderings, the row driver 60 may operate in four different operational modes, where the operational mode is selected based on the gray level value of DATA 412. After writing DATA 412 to the inverting pairs 408, the row driver 60 operates memory circuitry 560 to transmit stored DATA 412 to SR latch 562 a bit at a time to drive a DMD electrode through analog driver circuitry 561. The row driver 60 may reorder DATA 412 to create a single pulse width modulated signal from a binary pulse width modulation emission data by selectively enabling and/or disabling CG signals 564 (e.g., enabling 564B to transmit red data corresponding to bit-plane 7) by driving memory circuitry 560 with different operational modes.

For example, and as described above, for a first operational mode (e.g., corresponding to gray levels between zero and the gray level threshold), the row driver 60 may reset the S node, precharge, enable Sel[n] 415B and enable SET signal 602, precharge, enable Sel[n−1] 415 and enable SET signal 602, precharge, and enable Sel[0] 415A. The row driver may repeat the first operational mode for each bit of DATA 412, incrementing from a first bit, DATA[0] 412A until reaching DATA[n−2] (e.g., where 2 corresponds to a number of reordering). The row driver 60 may operate as described in discussions for FIG. 23 while in the second, third, and fourth operational modes.

Figure 28:
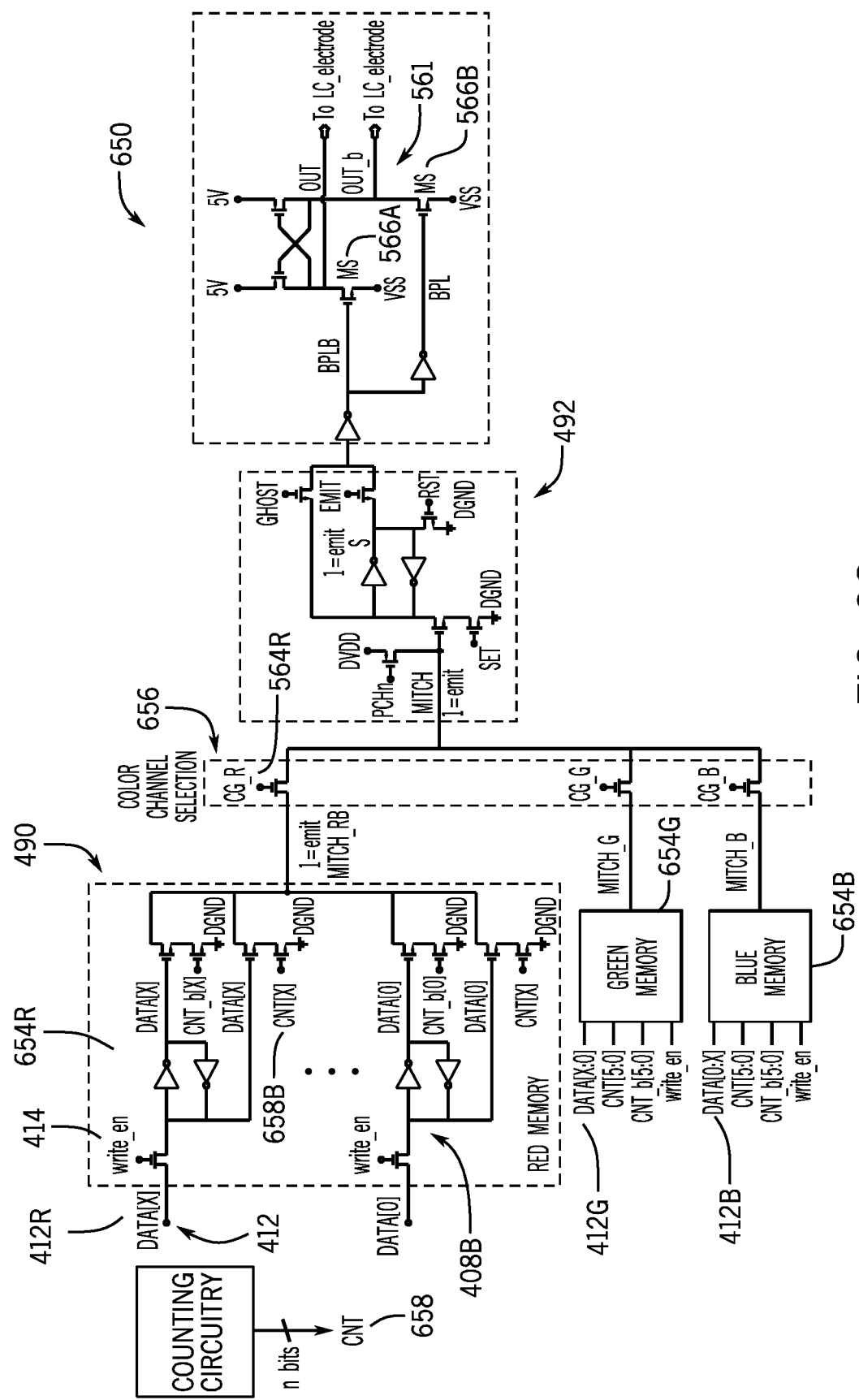
FIG. 28 is a circuit diagram of an embodiment of the pixel of FIG. 25 for use in a liquid crystal display, in accordance with an embodiment.

Similar to FIG. 27, an example embodiment of a pixel 650 operated by a row driver 60 to follow a single pulse width modulation emission scheme including memory circuitry 654, color channel selection transistors 656, inverter pair 498, analog driver circuitry 561, and a comparator 490 electrically coupled to light-emitting circuitry (not pictured) is shown in FIG. 28. This figure is meant to be example and not limiting, for example, any suitable pixel circuitry may be used in conjunction with memory circuitry and memory-in-pixel techniques, such as, any combination of additional and/or alternative embodiments of suitable switching elements (e.g., depicted MOSFETs). FIG. 28 is included to show an example of a pixel 650 as applied to a liquid crystal display (LCD) and operation of the memory circuitry 654 and the comparator 490 may generally follow the process depicted and described with FIG. 22.

Generally, the pixel 650 receives DATA 412 during a data writing process managed by a row driver 60 enabling a write_en signal 414 to permit writing of DATA 412 bits into memory, for example, inverter pairs 408. During the data writing process, the pixel 650 receives gray level digital data for the red color channel (DATA) 412R, gray level digital data for the green color channel (DATA) 412G, and receives gray level digital data for the blue color channel (DATA) 412B, where the pixel 650 receives the DATA 412 in a series data transmission and/or in a parallel data transmission to each of the memory circuitry 654. Upon DATA 412 being written into the memory of the pixel 650, the comparator 490 performs an automatic comparison of DATA 412 from memory to a count transmitted from counting circuitry, such as, counter 130 and/or any suitable counting method. Using the same methods described with comparator 490 from FIG. 21, the comparator 490 transmits a "1" if the DATA 412 and the count 658 from counting circuitry are the same (e.g., matches all bits) or transmits a "0" if not equal (e.g., one or more bits do not match). The row driver 60 transmits a CG signal 564 to a respective transistor of the color channel selection transistors 656 to enable a color channel for color sequential emission, for example, either red, green, or blue color channel for emission via the shared output stage. Upon the row driver 60 enabling transmission from a color channel, the MTCH bit transmits through to memory circuitry 492 for storage. The row driver 60 may enable the EMIT signal to permit light emission according to the stored MTCH bit, as previously described. Additionally or alternatively, the row driver 60 may enable a GHOST signal that at least in part causes no emission to occur, regardless of the stored MTCH bit in memory circuitry 492. To emit light, the row driver 60 enables the EMIT signal, causing the stored MTCH bit to transmit to analog driver circuitry 561 coupled to a high reference voltage and a low reference voltage. The stored MTCH bit transmits to the analog driver circuitry 561 either activating and/or deactivating MS 566 coupled to a LC electrode responsive to the reference voltages (e.g., MS 566A, MS 566B). The reference voltages, though depicted as 5[V] and VSS, may be any suitable voltage used to drive the LC electrode upon activation of MS 566.

Following structure described above, the pixel 650 may be operated to emit according to a single pulse width modulation emission scheme. Different embodiments may be operated by a row driver 60 to emit according to the different emission schemes. For example, a color channel of the pixel 650 may be operated according to the binary pulse width modulation emission scheme generally if the digital data transmitted to the pixel 650 changes and the comparator 490 is removed.

As has been discussed throughout this disclosure, it should be understood that memory-in-pixel techniques are valid for a variety of embodiments and display technologies. It should also be understood that for each reference voltage discussed, or disclosed in the figures, additional or alternative reference voltages may be used. Additionally or alternatively, it is noted that although described as reducing or eliminating a reliance on using a frame buffer, memory-in-pixel techniques may be used in tandem with a frame buffer in some embodiments. Furthermore, although memory circuitry has been described as storing six bits, twelve bits, eight bits, and/or sixteen bits, it should be appreciated that any suitable memory structure may be used to store any suitable number of bits.

Figure 29:
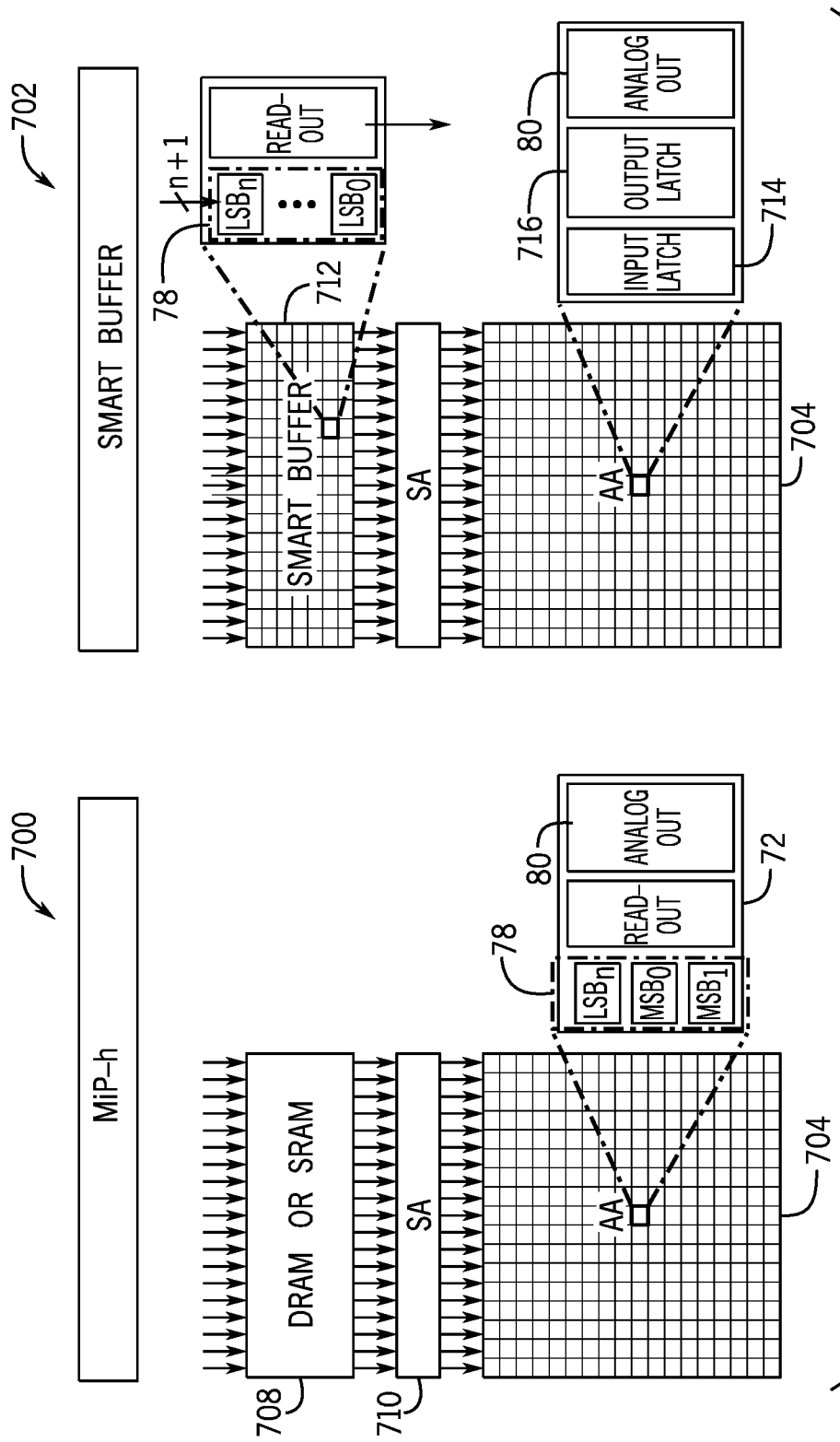
FIG. 29 is a block diagram comparing the display system of FIG. 5 with a display system having a smart buffer outside of an active area of the electronic display, in accordance with an embodiment.

As briefly discussed in FIG. 21, slight adjustments to the memory-in-pixel techniques may be generally applied to permit moving the memory 78 into a smart buffer, as opposed to or in addition to including the memory 78 in the sub-pixel 72 itself. FIG. 29 shows this generally with a memory-in-pixel architecture electronic display 700 and a smart buffer architecture electronic display 702. The memory-in-pixel architecture electronic display 700 includes, as depicted, memory 78 in each sub-pixel 72 located in an active area 704 of the electronic display 18, where the active area 704 includes all the light-emitting components of the electronic display and communicative couplings to support data transmission to the light-emitting components. In the memory-in-pixel architecture electronic display 700, digital data is transmitted from memory 708 (e.g., DRAM or SRAM memory) to each respective sub-pixel 72 for localized buffering in the memory 78. In some embodiments, the digital data transmits from the memory 708 to a source area 710 before transmission into the memory 78 for localized buffering (e.g., buffering within the sub-pixel 72). However, substantially similar memory as memory 78 may be included in a smart buffer 712 of the smart buffer architecture electronic display 702 to still eliminate, or at least reduce, a reliance upon a frame buffer but additionally remove the memory 78 from the active area 704. By moving the memory 78 into a smart buffer 712, the row driver 60 may use operate an input latch 714 and an output latch 716 to arbitrate light emission from each sub-pixel 72 via analog out circuitry, for example, the driver 80. Here, the smart buffer 712 may represent any suitable buffer memory disposed in an integrated circuit of the electronic display 18 but outside of the active area of the electronic display 18.

Figure 30:
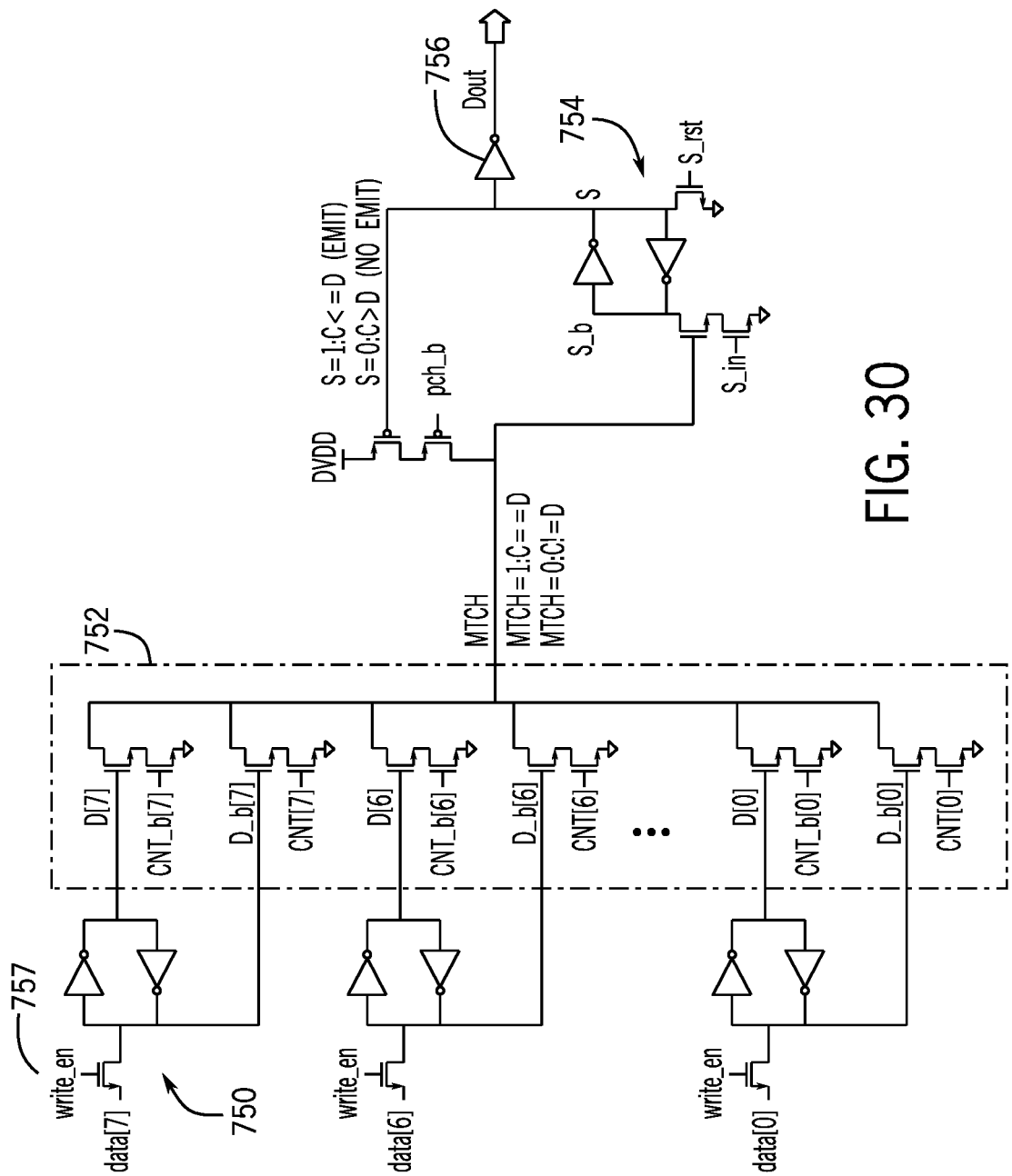
FIG. 30 is a circuit diagram of an embodiment of the memory circuitry of FIG. 13 for use in the smart buffer of FIG. 29, in accordance with an embodiment.

FIG. 30 shows an example of the smart buffer embodiment of the memory 78 circuitry including memory circuitry 750, a comparator 752, memory circuitry 754, and an output inverter 756. This circuit functions similarly to memory circuitry shown in FIG. 21, where the smart buffer of FIG. 30 receives digital data in response to a write enabled (write_en) control signal 757 permitting the writing of the digital data to the memory circuitry 750 (e.g., inverter pair). Thus, the general operation of the memory circuitry 754 and the comparator 752 may generally follow the process depicted and described with FIG. 22. The smart buffer of FIG. 30 may have a memory 78 circuit for each sub-pixel 72 of the active area 704. The digital data value may be stored in the memory circuitry 750 until a new value of digital data is written into the smart buffer for the particular sub-pixel 72.

When the digital data is transmitted into the memory circuitry 750, the comparator 752 determines if all bits of the digital data match an output (CNT/CNT_b) from counting circuitry. Similar to previously described embodiments, the counting circuitry counts to permit light emission according to the grey level represented by the digital data. The comparator may output a logical zero, "0," as the MTCH bit until the digital data matches the count—at which point, the comparator outputs a logical one, "1" as the MTCH bit. The MTCH bit generally transmits to the memory circuitry 754 to be stored while the value of the inverted MTCH bit transmits onto the output inverter 756 and ultimately onto a corresponding sub-pixel to cause and/or stop light emission.

Figure 31:
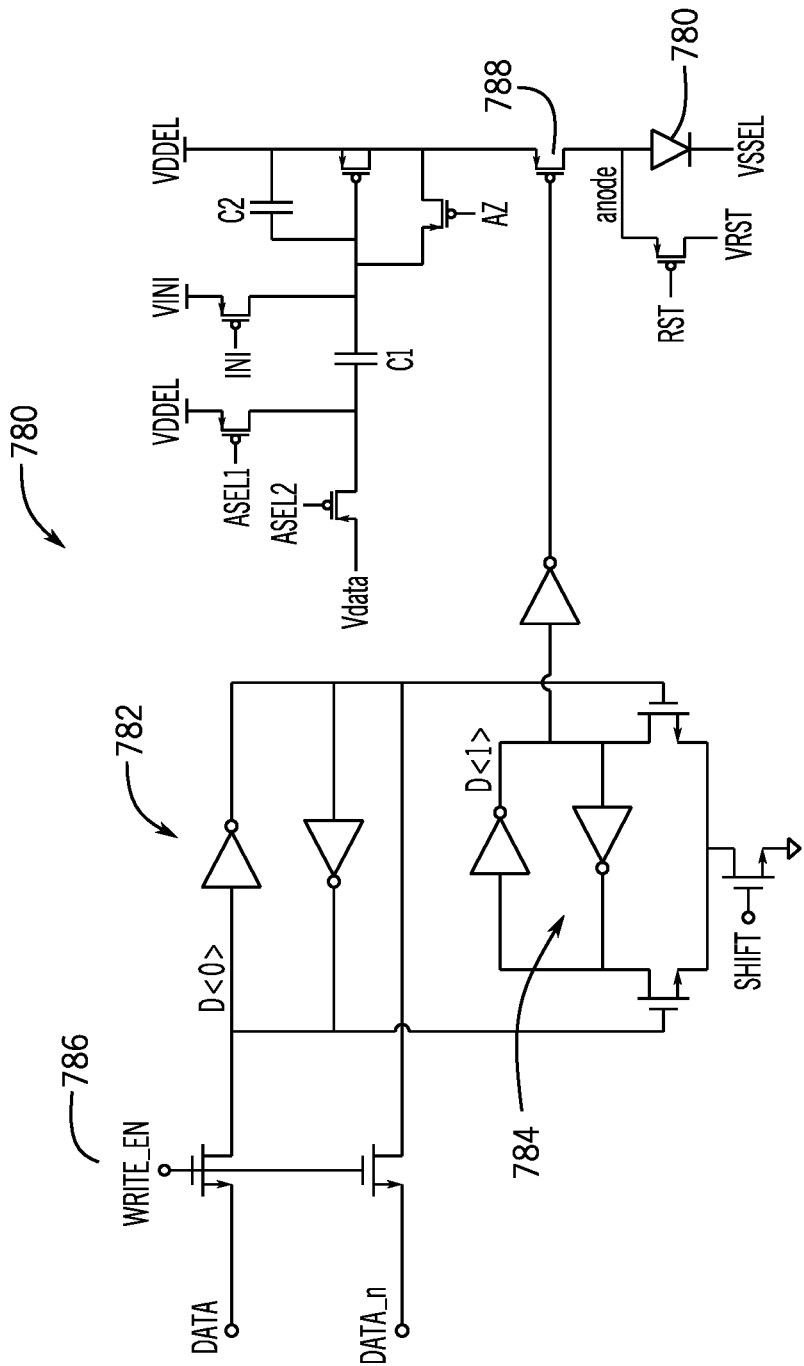
FIG. 31 is a circuit diagram of a third embodiment of sub-pixel of the pixel array of FIG. 6 for use in the display system having the smart buffer of FIG. 29, in accordance with an embodiment.

Continuing on with the transmission path of the MTCH bit, FIG. 31 depicts pixel circuitry 780 that may be used in conjunction with the smart buffer circuitry of FIG. 30. The pixel circuitry 780 includes an input latch 782 (e.g., inverter pair) and an output latch 784 (e.g., inverter pair) that are both operated to latch digital data transmitted from a smart buffer, for example the smart buffer 712, in response to a write_enabled (write_en) control signal 786. Upon latching, the digital data may be automatically transmitted to a gate of a driving transistor 788. Similar to previously discussed, the driving transistor 788 is activated in response to the digital data, depending on the value of the digital data, and causes a driving current to transmit through light-emitting circuitry, for example, a light-emitting diode 790, of the pixel circuitry 780.

Accordingly, technical effects of the present disclosure include techniques for implementing memory in one or more pixels of an electronic display to improve processing techniques of image data for presentation. The techniques include systems and methods for receiving image data, storing the image data in memory in the pixel, and transmitting the image to a driver circuit to operate a light-emitting element of a pixel to emit light. Furthermore, any suitable pixel circuitry implementing memory-in-pixel techniques may be used to execute different emission schemes including a binary pulse width modulation emission scheme, binary pulse width modulation reordering emission scheme, a single pulse width modulation emission scheme, and a pulse density modulation emission scheme, while still benefitting from decreasing bandwidths used to communicate a same image as without using memory-in-pixel techniques. These pixel circuits enabling the emission schemes may couple to a pixel circuit having a hybrid drive to increase a responsiveness to electrical signals of an LED.

The techniques described herein may be applied and integrated with a variety of display technologies and should not be limited to the specific embodiments depicted and/or described herein. For example, pixels with memory are shown as having a light-emitting diode as a light-modulating device, however, the memory-in-pixels techniques may be generally applied to different pixel circuitry to support a variety of display technologies that use a variety of light-modulating devices. In this way, suitable pixel circuitry supporting light emission via a light-emitting diode, a digital mirror display, an organic light-emitting diode, or circuitry supporting a liquid crystal display, a plasma display, or a dot-matrix display may each have memory in the pixel to achieve at least improvements to data transmission bandwidths and ease of programming the pixels.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display, comprising:
   an active area comprising a row of pixels, wherein the row of pixels comprises a first sub-pixel and a second sub-pixel, and wherein the first sub-pixel is configured to emit light in response to first image data; and
   a controller configured to transmit the first image data to the first sub-pixel at a first time and configured to transmit second image data to the second sub-pixel at a second time;

wherein the first sub-pixel comprises:
  a first current source configured to generate a first current;
  a first organic light-emitting diode configured to emit the light in response to the first current;
  a first memory configured to digitally store the first image data received from the controller; and
  first driver circuitry configured to receive a first control signal generated based at least in part on the first image data stored in the first memory, wherein the first driver circuitry is configured cause the first organic light-emitting diode to emit the light at least in part by transmitting the first current to the first organic light-emitting diode in response to the first control signal.

2. The electronic display of claim 1, wherein the controller is configured to transmit the first image data via a data line of the active area to the first memory of the first sub-pixel.

3. The electronic display of claim 1, wherein the controller is configured to transmit the first image data via a data line of the active area to multiplexing circuitry, and wherein the controller is configured to control the multiplexing circuitry to arbitrate transmission of the first image data into the first memory of the first sub-pixel.

4. The electronic display of claim 3, wherein the controller is configured to program the first memory associated with a first color channel of the first image data at a first time via enabling a first multiplexing control signal to cause the first memory of the first sub-pixel to be programmed, and wherein the controller is configured to program the first memory associated with a second color channel of the second image data at a second time via enabling a second multiplexing control signal to cause a second memory of the second sub-pixel to be programmed.

5. The electronic display of claim 1, wherein the controller is configured to program the first memory of the first sub-pixel with the first image data, wherein the first image data is associated with a first color channel and is programmed at a first time, wherein the controller is configured to program the first memory of the first sub-pixel with the second image data, and wherein the second image data is associated with a second color channel and is programmed at a second time.

6. The electronic display of claim 1, wherein the first memory of the first sub-pixel is configured to operate as an in-display frame buffer for the first sub-pixel in the electronic display.

7. The electronic display of claim 1, wherein the first memory of the first sub-pixel is configured to receive a counter signal and the first image data, wherein the first memory of the first sub-pixel is configured to operate a switch by transmitting the first control signal, wherein the first control signal is generated based at least in part on the counter signal and the first image data, and wherein the first control signal causes the first organic light-emitting diode to emit the light according to a binary pulse width modulation emission scheme.

8. The electronic display of claim 1, wherein the first memory of the first sub-pixel comprises a comparator configured to receive a signal indicative of a number and the first image data, and wherein the comparator is configured to generate the first control signal based at least in part on the first image data and the signal indicative of the number to cause the first organic light-emitting diode to emit the light according to a single pulse width modulation emission scheme.

9. The electronic display of claim 1, wherein the first memory comprises an adder configured to sum the first image data to a defined value of an accumulator during a summation process, and wherein a carry bit from the summation process is configured to generate the first control signal used to operate a switch to cause the first organic light-emitting diode to emit the light according to a pulse density modulation emission scheme.

10. The electronic display of claim 1, comprising display driver circuitry configured to program the first memory at a time different from a second memory of the second sub-pixel.

11. The electronic display of claim 1, wherein the first memory comprises a register, and wherein each sub-pixel of the row of pixels is configured to receive a signal indicative of a count of a counter and the first image data, wherein the register outputs the first control signal in response to the signal indicative of the count of the counter and the first image data, and wherein the first control signal causes the first organic light-emitting diode to emit light according to a binary pulse width modulation emission scheme.

12. The electronic display of claim 1, wherein each sub-pixel of the row of pixels comprises a respective comparator.

13. The electronic display of claim 1, comprising an adder configured to sum the first image data to a defined value of an accumulator configured to couple to the adder during a summation process, wherein the first control signal comprises a carry bit from the summation process and causes the first organic light-emitting diode to emit light according to a pulse density modulation emission scheme.

14. The electronic display of claim 1, wherein the first memory is configured to act as a frame buffer to store the first image data for a time period before permitting the first image data to be used to cause light to be emitted from the first organic light-emitting diode.

15. The electronic display of claim 1, wherein the first sub-pixel corresponds to a first color channel, wherein the first image data comprises image data of the first color channel for the first sub-pixel, wherein the second sub-pixel corresponds to a second color channel, wherein the second sub-pixel comprises:
  a second memory configured to store a second image data comprising image data of the second color channel for the second sub-pixel; and
  second driver circuitry configured to receive a second control signal generated based at least in part on the second image data stored in the second memory, wherein the second driver circuitry is configured to cause a second organic light-emitting diode to emit the light at least in part by transmitting a second current from a second current source in response to the second control signal; and
wherein the controller is configured to transmit the first image data to the first memory at a different time than used to transmit the second image data to the second memory.

16. The electronic display of claim 15, wherein the first sub-pixel is configured to be programmed with the first image data at a first time, wherein the second sub-pixel is configured to be programmed with the second image data at a second time, and wherein the first time occurs earlier than the second time.

17. The electronic display of claim 16, wherein the first image data is configured to be transmitted to the first sub-pixel through multiplexing circuitry operating in response to a first multiplexing control signal transmitted at the first time, and wherein the first image data is configured to stop transmission to the first sub-pixel in response to the multiplexing circuitry receiving a second multiplexing control signal transmitted at the second time.

18. The electronic display of claim 15, wherein the first memory is configured to operate with smart buffer memory as a frame buffer for the first sub-pixel.

19. The electronic display of claim 15, wherein the second driver circuitry comprises a comparator configured to compare signals indicative of a count and the second image data to generate the second control signal.

20. The electronic display of claim 15, wherein the second driver circuitry comprises a comparator configured to receive the second image data from the second memory and an output from a counter, wherein the output from the counter is configured to correspond to a time difference representative of increments of a gray level associated with the first color channel, and wherein the second control signal comprises an output from the comparator.

* * * * *